(12) United States Patent
Matsubara et al.

(10) Patent No.: US 6,567,012 B1
(45) Date of Patent: May 20, 2003

(54) REMOTE CONTROL DEVICE

(75) Inventors: Manabu Matsubara, Kobe (JP); Minoru Yoshimura, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 09/548,348

(22) Filed: Apr. 12, 2000

(30) Foreign Application Priority Data

Apr. 14, 1999 (JP) .......................................... 11-106965

(51) Int. Cl.$^7$ .............................................. G08C 19/00
(52) U.S. Cl. .......................... 340/825.72; 340/825.76; 340/825.74
(58) Field of Search .................. 340/825.72, 5.62, 340/5.63, 5.72, 825.69, 825.74, 5.61, 5.64, 825.76

(56) References Cited

U.S. PATENT DOCUMENTS

| | | | |
|---|---|---|---|
| 5,146,215 A | | 9/1992 | Drori ........................ 340/5.22 |
| 5,619,191 A | * | 4/1997 | Lambropoulos et al. ..................... 340/825.69 |
| 5,864,297 A | * | 1/1999 | Sollestre et al. ....... 340/825.31 |
| 5,933,090 A | * | 8/1999 | Christenson ........... 340/825.69 |
| 6,078,264 A | * | 6/2000 | Nose et al. ............ 340/825.31 |
| 6,130,622 A | * | 10/2000 | Hussey et al. ......... 340/825.31 |
| 6,163,271 A | * | 12/2000 | Yoshizawa et al. .... 340/825.31 |
| 6,181,254 B1 | * | 1/2001 | Vogele ................... 340/825.69 |
| 6,249,673 B1 | * | 6/2001 | Tsui ............................ 455/95 |
| 6,366,198 B1 | * | 4/2002 | Allen et al. ................. 340/426 |
| 6,396,389 B1 | * | 5/2002 | Nakano et al. ............ 340/5.72 |

* cited by examiner

Primary Examiner—Brian Zimmerman
Assistant Examiner—Nam V Nguyen
(74) Attorney, Agent, or Firm—Oliff & Berridge, PLC

(57) ABSTRACT

A transmission code 15 consisting of a transmitter ID code 16 and a operation switch control code 17 is transmitted through actuation of operation switches A and B of a transmitter 1. In a program mode of a receiver 4, a function selection code corresponding to the thus-received transmitter ID code is entered by utilization of courtesy switches 26 and 27 mounted on doors, and the thus-entered function selection code is set in a first memory location 37 in a rewritable manner. In an operation mode of the receiver 4, when a match exists between the transmitter ID code transmitted from the transmitter 1 and the contents of the first memory location 37, a function selection code is read. Operation information corresponding to the control code is read from the second memory location 38, and the operations of the lock mechanisms 5, 6, and 7 are controlled on the basis of the operation information.

14 Claims, 33 Drawing Sheets

TRANSMITTER

FIG. 17-1

FUNCTION SELECTION CODE 00   38

| 1 | LOCK/UNLOCK |
|---|---|
| 2 | TRUNK RELEASE |
| 3 | PANIC OPERATION |
| 4 | NONE |

FIG. 17-2

FUNCTION SELECTION CODE 01   38

| 1 | TRUNK RELEASE |
|---|---|
| 2 | LOCK/UNLOCK |
| 3 | PANIC OPERATION |
| 4 | NONE |

FIG. 17-3

FUNCTION SELECTION CODE 10   38

| 1 | LOCK/UNLOCK |
|---|---|
| 2 | NONE |
| 3 | PANIC OPERATION |
| 4 | NONE |

FIG. 17-4

FUNCTION SELECTION CODE 11   38

| 1 | NONE |
|---|---|
| 2 | LOCK/UNLOCK |
| 3 | NONE |
| 4 | PANIC OPERATION |

FIG. 38-1

FUNCTION SELECTION CODE 00

| 1 | LOCK/UNLOCK |
|---|---|
| 2 | TRUNK RELEASE |
| 3 | PANIC OPERATION |
| 4 | NONE |
| 5 | NONE |
| 6 | NONE |

FIG. 38-2

FUNCTION SELECTION CODE 01

| 1 | TRUNK RELEASE |
|---|---|
| 2 | LOCK/UNLOCK |
| 3 | PANIC OPERATION |
| 4 | NONE |
| 5 | NONE |
| 6 | NONE |

FIG. 38-3

FUNCTION SELECTION CODE 10

| 1 | LOCK/UNLOCK |
|---|---|
| 2 | NONE |
| 3 | PANIC OPERATION |
| 4 | NONE |
| 5 | TRUNK RELEASE |
| 6 | NONE |

FIG. 38-4

FUNCTION SELECTION CODE 11

| 1 | NONE |
|---|---|
| 2 | LOCK/UNLOCK |
| 3 | NONE |
| 4 | PANIC OPERATION |
| 5 | NONE |
| 6 | TRUNK RELEASE |

REMOTE CONTROL DEVICE

BACKGROUND OF THE INVENTION

1. Field of the Invention

The present invention relates to a remote control device for controlling operations of a device to be controlled in which a receiver receives a transmission code signal of electromagnetic wave transmitted from a transmitter. More specifically, the present invention relates to; for example, a multifunction system for controlling operations of numerous types of one or more devices to be controlled, in order to, for example, lock or unlock a door of a vehicle such as an automobile, to unlock a trunk of a vehicle, or to activate a vehicle burglar alarm of a vehicle.

2. Description of the Related Art

There has already been put into practical use a device which enables a user to remotely control locking/unlocking of a vehicle's doors by actuation of a button of a transmitter. According to a certain existing technology, a transmitter is equipped with a single button. When the button is actuated, the transmitter sends only an ID code, which is a transmitter identification code unique to the transmitter. A receiver determines whether or not the received ID code matches a code which has been stored in the memory of the receiver beforehand. When a match is determined to exist between the codes, a predetermined single function of a device to be controlled is activated. The predetermined single function of the device to be controlled corresponds to execution of only unlocking of a lock mechanism of a vehicle door or the lock mechanism performing a locking operation and an unlocking operation alternately when the ID code is received repeatedly. Since the transmitter controls only a single function, the technology involves the disadvantage of inferior convenience.

According to another existing technology intended for solving such a drawback, a transmitter is equipped with a plurality of buttons. When one of the buttons is actuated, a transmitter identification code unique to the transmitter and a control code corresponding to the actuated button are transmitted. Upon determination of a match between the ID code transmitted from the transmitter and the code stored in memory beforehand, a receiver controls the operation of the device to be controlled, on the basis of a corresponding control code uniquely allocated to the actuated button. For example, in the case of a transmitter equipped with two buttons, the locking or unlocking of a door lock mechanism is controlled through actuation of one button. Further, a lock mechanism of a vehicle trunk is unlocked by actuation of the other button, to thereby release the trunk. In this way, multi-functionality is attained.

A problem which has arisen in the latter technology is that the functions of devices to be controlled have been uniquely allocated respectively to the plurality of buttons of the transmitter in advance; for example, one of the transmitter's buttons is uniquely allocated to the function of locking/unlocking doors, and the other button is uniquely allocated to a trunk release function. The user cannot allocate desired functions to respective buttons, and is thus forced to endure inferior operability.

SUMMARY OF THE INVENTION

An object of the present invention is to provide a remote control device which enables the user to arbitrarily allocate a plurality of types of operations of devices to be controlled to a single or a plurality of operation switches of a transmitter.

Another object of the present invention is to provide a remote control device which enables the user to arbitrarily allocate a plurality of types of operations of devices to be controlled respectively to a plurality of operation modes of a single operation switch of a transmitter; for example, a period of time during which a button is to be pressed or a single operation or the number of operations to be performed within a predetermined period of time.

According to a first aspect of the present invention, there is provided a remote control device for controlling a plurality of operations in a multifunction system, the device comprising:

a transmitter having an operation switch, the transmitter for transmitting a transmission code including a transmitter ID code unique to the transmitter and a control code assigned to the operation switch or corresponding to an operation of the operation switch; and a receiver for receiving the transmission code, the receiver comprising:

first memory means for storing the transmitter ID code and one of a plurality of function selection codes corresponding to the transmitter ID code;

second memory means for correspondingly and previously setting and storing the control code and operation information to be remotely controlled for each of the plurality of function selection codes, in which the operation information corresponding to the control code differs for each of the plurality of function selection codes;

function selection code input means for inputting the function selection code;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond to the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information corresponding to the control code of the function selection code read from the first memory means; and the receiving control means performs an operation based on the operation information read from the second memory means.

According to a second aspect of the present invention, in the remote control device, the transmitter comprises a plurality of operation switches, and a plurality of control codes respectively allocated to the plurality of operation switches are transmitted.

According to a third aspect of the present invention, in the remote control device, the transmitter comprises at least one operation switch, the transmitter transmits the control code corresponding to operation of the operation switch or corresponding to a time during which the operation switch is operated or the number of times that the operation switch is operated.

According to a fourth aspect of the present invention, in the remote control device, the transmitter comprises a plurality of operation switches and the transmitter transmits the control code corresponding to one of combinations of the operation switches operated simultaneously.

According to a fifth aspect of the present invention, in the remote control device, the transmitter comprises a plurality of operation switches, the transmitter transmits the control code corresponding to one of combinations of the plurality of operation switches operated simultaneously and corresponding to a time during which the operation switches are operated or the number of times that the operation switches are operated.

According to a sixth aspect of the present invention, in the remote control device, the function selection code input means comprises:

detection means for detecting an operation of an object to be operated by an operator and to be provided in a vehicle in advance; and count output means for counting the number of signals output from the detection means within a predetermined code input time and outputting a count result as the function selection code.

According to a seventh aspect of the present invention, in the remote control device, the detection means for detecting the operation of the object to be operated corresponds to one selected from the group consisting of:

a courtesy switch for detecting the opening and closing action of a vehicle door;

an ignition switch for applying power to an ignition circuit of a spark ignition internal combustion engine;

a lock switch for detecting that a door lock mechanism has been locked or unlocked;

a switch for detecting the orientation of angular displacement of a removable key which is subjected to angular displacement in accordance with the locking/unlocking operation of the lock mechanism;

a brake switch for detecting pressing of a vehicle brake pedal; and a switch to be operated in order to illuminate/extinguish vehicle light.

According to an eighth aspect of the present invention, in the remote control device, the function selection code input means detects an operation of the mode setting means switchably setting one of the program mode and the operation mode, and the function selection means outputs the function selection code corresponding to the operation detected.

According to a ninth aspect of the present invention, in the remote control device, the function selection code input means outputs the function selection code corresponding to the transmission code transmitted from the transmitter when the receiver is in the program mode.

According to a tenth aspect of the present invention, there is provided a remote control device for controlling a plurality of control operations in a multifunction system, the device comprising:

a transmitter having an operation switch, the transmitter for transmitting a transmission code including a transmitter ID code unique to the transmitter and a control code corresponding to the operation of the operation switch; and a receiver for receiving the transmission code, wherein the receiver comprises:

first memory means for storing the transmitter ID code and a function selection code assigned to the transmitter ID code;

second memory means for correspondingly and previously setting and storing the control code, a transmission mode of the transmission code and operation information to be remotely controlled for each of the plurality of function selection codes, in which the operation information corresponding to the control code differs for each of the plurality of function selection codes;

junction selection code input means for inputting the function selection code;

measurement means for measuring the transmission mode of the transmission code;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond to the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information corresponding to the control code of the function selection code read from the first memory means and corresponding to the transmission mode measured by the measuring means; and the receiving control means performs an operation based on the operation information read from the second memory means.

According to an eleventh aspect of the present invention, in the remote control device, the transmission mode of the transmission code corresponds to a time during which the transmission code is transmitted or the number of times that the transmission code is transmitted.

According to a twelfth aspect of the present invention, in the remote control device, the transmitter comprises a plurality of operation switches, the transmitter transmits the control code assigned to each of the plurality of operation switches.

According to a thirteenth aspect of the present invention, in the remote control device, the transmitter comprises a plurality of operation switches, and the transmitter transmits a control code corresponding to one of combinations of the plurality of operation switches operated simultaneously According to a fourteenth aspect of the present invention, there is provided a remote control device for controlling a plurality of operations in a multifunction system, the device comprising:

a transmitter having an operation switch, the transmitter for transmitting a transmission code including a transmitter ID code unique to the transmitter; and a receiver for receiving the transmission code, wherein the receiver comprises:

first memory means for storing the transmitter ID code and a function selection code assigned to the transmitter ID code;

second memory means for correspondingly and previously setting and storing operation information to be remotely controlled and one of the duration of the transmission code and the number of times that the transmission code is received, for each of the plurality of function selection codes, in which the operation information corresponding to the one of the duration of the transmission code and the number of times differs for each of the plurality of function selection codes;

function selection input means for inputting the function selection code;

measurement means for measuring the duration of the transmission code received or the number of times the transmission code is received;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond to the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information of the function selection code read from the first memory mean and corresponding to an output of the measurement means; and the receiving control means performs an operation based on the operation information read from the second memory means.

In the remote control device, the transmitter may consist of a transmitter.

Preferably, the transmitter is equipped with one or more operation switches, such as push buttons. When the user presses one of the push buttons, the transmitter transmits the transmission code in the form of, for example, a radio signal, an ultrasonic-wave signal, or an electromagnetic wave signal such as light, infrared rays, or visible rays. The transmission code comprises a transmitter ID code unique to a transmitter (hereinafter often abbreviated as an "ID code") and a control code (hereinafter often abbreviated as a "button code"). The transmission code may include another code or signal.

The transmitter is formed into a compact device which can be carried while in a pocket. The transmitter modulates a RF carrier wave signal having, for example a predetermined carrier frequency, through use of a series of binary numerals consisting of a combination of logic value of "1" and logic value of "0." The thus-modulated RF carrier wave signal is transmitted.

The control code may be coded so as to individually correspond to the actuated operation switch or coded so as to correspond to a combination of a plurality of operation switches, for example two switches, to be operated simultaneously. In another embodiment, a control code may be coded so as to correspond to the mode of operation of the operation switch. For example, a control code is coded so as to correspond to, for example, (a) a period of time during which the operation switch is pressed continuously, (b) the number of times the operation switch is activated/deactivated within a preset period of time, or (c) a combination of operation switches which have been actuated within a preset period of time.

The receiver is provided in a vehicle, for example an automobile, and receives the transmission code transmitted from the transmitter. A coded signal would often be called a code herein. The receiver operates in a switching manner between a program mode and an operation mode. In a state in which the receiver is in a program mode, an operator, i.e., the user, actuates the operation switch of the transmitter, to thereby transmit a transmission code. The receiver receives the transmission code and stores, in first memory means, a transmitter ID code and a function selection code which are included in the transmission code. The function selection code has been entered by the user by way of function selection code input means of the receiver while the receiver is in a program mode.

In second memory means, a control code included in the transmission code transmitted from the transmitter and corresponding operation information assigned to each of the plurality of types of operations of a device to be remotely controlled are set and stored for each function selection code so as to constitute, for example, a table. The operation information corresponding to the control code stored in the second memory means may differ from one function selection code to another function selection code or may be the same. The first and second memory means may be embodied by means of independent memory devices or may be embodied by different storage regions within a single memory device.

Preferably, the function selection code corresponding to the transmitter ID code stored in the first memory means can be rewritten by function selection code input means. Accordingly, the operation information corresponding to the operation switch of the transmitter or the operation information corresponding to the mode of operation of the operation switch can be allocated to an arbitrary operation switch.

In a case where the receiver receives a transmission code from the transmitter while being switched to an operation mode, a determination is made as to whether or not a match exists between the transmitter ID code included in the thus-received transmission code and the transmitter ID code stored in the first memory means. If a match exists between the ID codes, a function selection code corresponding to the transmitter ID code is read from the first memory means. Further, operation information corresponding to the control code of the thus-read function selection code is read. On the basis of the thus-read operation information, the receiver operates the device to be controlled. In contrast, if it is determined that no match exists between the received transmitter ID code and the transmitter ID code stored in the first memory mean, the receiver does not perform any further operation, and hence the device to be controlled is not controlled.

The operation information representing an operation to be performed may correspond to either an operation for locking a vehicle door lock mechanism or an operation for unlocking the vehicle door lock mechanism. Alternatively, the operation information may correspond to an operation for iteratively performing locking and unlocking operations each time the receiver receives the transmission code. The operation information may also correspond to an operation for locking or unlocking a vehicle trunk. Alternatively, the operation information may correspond to an operation for activating warning means for preventing theft, for example a horn, or another operation.

Preferably, the transmitter iteratively and continuously transmits a transmission code over a period of time during which an operation switch is actuated. The transmitter may have one or more operation switches. In a case where the transmitter has a plurality of operation switches, control codes individually allocated to respective operation switches are produced. In another embodiment, a plurality of operation switches may be actuated simultaneously, and a control code may be produced so as to correspond to a combination of a plurality of operation switches which have been operated simultaneously.

The receiver assumes a program mode analogous to that mentioned previously. In a case where the receiver is in an operation mode, if it is determined that a match exists between the transmitter ID code included in the received transmission code and the transmitter ID code previously stored in the first memory means, a function selection code corresponding to the transmitter ID code stored in the first memory means is read. The duration of a continuation transmission code received by the receiver is compared by comparison means with a predetermined one type of period or with a plurality of types of predetermined periods. In the second memory means, a control code, the duration output from the comparison means, and operation information are stored for each function selection code so as to constitute a table. In accordance with the function selection code read from the first memory means, the control code stored in the second memory means and the operation information corresponding to the duration output from the comparison means are read from the second memory means, whereby the operation of the device to be controlled is controlled.

The transmission code signal transmitted from the transmitter over the period of time during which the operation switch is actuated may correspond to a transmission code signal which comprises a single transmitter ID code and a transmission code signal consisting of a single control code corresponding to the operated operation switch and which is iteratively and continuously transmitted in the manner as mentioned previously. In other embodiment, the transmission code signal to be transmitted over a period of operation time during which the operation switch is operated may comprise one or more transmitter ID codes and a control code which follows the transmitter ID code(s) and is iteratively and continuously transmitted until the operation period expires. In still another embodiment, the transmission code signal may be formed from a continuation signal which is continuous until actuation of the operation switch is terminated, such as a carrier wave signal, so as to follow one or more transmission codes consisting of a transmitter ID code and a control code. In other respects, the present invention is identical in configuration and operation with the inventions mentioned previously.

Preferably, a transmission code is transmitted each time an operation switch is actuated. For example, a transmission code is transmitted once or a plurality of times each time the operation switch is actuated. Alternatively, a transmission code is iteratively and continuously transmitted over a period of time during which the operation switch is actuated.

The receiver assumes a program mode analogous to that mentioned previously. In a case where the receiver is in an operation mode, if it is determined that a match exists between the transmitter ID code included in the received transmission code and the transmitter ID code previously stored in the first memory means, a function selection code is read from the first memory means. In the receiver, count means counts the number of times a transmission code is received at intervals through intermittent actuation of the operation switch within a predetermined period of time. In the second memory means, a control code, the number of times a control code is received, and operation information are stored for each function selection code so as to constitute a table. A control code defined by the thus-read function selection code and operation information corresponding to the number of times output from the count means are read, and the operation of a device to be controlled is controlled.

The transmitter may have one or more operation switches. In a case where the transmitter has a plurality of operation switches, a control code corresponding to a plurality of operation switches to be operated simultaneously may be produced. In other respects, the present invention is identical in configuration and operation with the inventions mentioned previously.

Preferably, a plurality of transmitter ID codes and corresponding function selection codes are correlated and stored in the memory of the receiver. The control code and corresponding operation information are stored so as to constitute a table for each function selection code.

Preferably, in the receiver, a plurality of transmitter ID codes and corresponding function selection codes are stored in memory. A control code and corresponding operation information are stored so as to constitute a table for each function selection code.

Preferably, the transmitter is equipped with a plurality of operation switches and transmits control codes allocated to the respective operation switches.

Preferably, control codes individually corresponding to respective switches of the transmitter are produced, thus constituting a transmission code.

Preferably, the transmitter is equipped with one or more operation switches. A control code corresponding to an operation switch and an operation time is transmitted.

A control code is produced so as to correspond to one or more operation switches of the transmitter and a period of time during which the operation switch is actuated.

Preferably, the transmitter is equipped with one or more operation switches. A control code corresponding to the operation switch and the number of times the operation switch has been actuated is transmitted.

Preferably, the transmitter is equipped with one or more operation switches. There is produced a control code corresponding to the number of times the operation switch is actuated within a predetermined period of time.

Preferably, the transmitter is equipped with one or more operation switches and transmits a control code corresponding to one of combinations of operation of operation switches to be operated simultaneously.

Of the plurality of operation switches provided on the transmitter, some operation switches are actuated simultaneously, and there is produced a control code corresponding to one of combinations of operation of the switches to be actuated simultaneously.

Preferably, the transmitter is equipped with a plurality of operation switches and transmits a control code corresponding to one of combinations of actuation of the operation switches to be actuated simultaneously, as well as corresponding to a period of time during which the operation switches are actuated.

Of the plurality of operation switches provided on the transmitter, some operation switches are actuated simultaneously, and there is produced a control code corresponding to one of combinations of operation of the switches to be actuated simultaneously as well as corresponding to a period of time during which the operation switches are actuated simultaneously.

Preferably, the transmitter is equipped with a plurality of operation switches and transmits a control code corresponding to one of combinations of actuation of the operation switches to be actuated simultaneously, as well as corresponding to the number of times the operations switches are actuated.

Of the plurality of operation switches provided on the transmitter, some operation switches are actuated simultaneously, and there is produced a control code corresponding to the number of times the operation switches are actuated simultaneously within a predetermined period of time.

Preferably, the transmitter is equipped with a single operation switch and iteratively and continuously transmits a transmission code over a period of time during which the operation switch is actuated. The transmission code may contain a transmitter ID code unique to the transmitter or another code or signal.

Preferably, the receiver can switchably operate either a program mode or an operation mode. In the program mode, the receiver measures a duration of a continuation transmission code transmitted from the transmitter. An operator, that is, the user, inputs and sets a transmitter ID code so as to correspond to the duration, through use of the function selection code input means. The thus-entered transmitter ID code is stored in the first memory.

In the operation mode of the receiver, in a case where it is determined that a match exists between the transmitter ID code contained in the received transmission code and the transmitter ID code stored in the first memory means, a function selection code corresponding to the transmitter ID code is read from the first memory means. The duration of the continuation transmission code output from the comparison means and corresponding operation information pertaining to a device to be controlled are stored so as to constitute a table for each of the thus-read function selection codes. The operation information corresponding to a signal output from the comparison means is read, and on the basis of the thus-read operation information the operation of a device to be controlled is controlled. In other respects, the present invention is identical in configuration and operation with the other inventions described previously.

The number of times a transmission code is received and corresponding operation information constitute a table for each function selection code.

Preferably, the transmitter is equipped with a single operation switch and transmits a transmission code each time the operation switch is actuated. The transmission code may be transmitted once or a plurality of times each time the operation switch is actuated. Alternatively, the transmission code may be iteratively and continuously transmitted over a period of time during which the operation switch is actuated.

Preferably, the receiver stores, in first memory, the function selection code entered by the user through use of the function selection code input means so as to correspond to the received transmitter ID code. In the operation mode, in a case where the receiver receives a transmission code including the transmitter ID code equal to that stored in the first memory means, the receiver reads a function selection code corresponding to the transmitter ID code stored in the first memory means. The count means counts the number of times the transmission code transmitted from the transmitter has been received at intervals through intermittent actuation of the operation switch within a predetermined period of time T151. Operation information corresponding to a count result output from the count means is read from the second memory means. On the basis of the thus-read operation information and the function selection code, the operation of a device to be controlled is controlled. The number of times the transmission code has been received and corresponding operation information are stored in the second memory means, thus constituting for example a table. In other respects, the present invention is identical in configuration and operation with the inventions mentioned previously.

Preferably, the function selection code input means has detection means for detecting the mode of operation of an article to be operated. The article to be operated has been provided in a vehicle beforehand and is actuated by the operator. The article to be operated corresponds to, for example, a door, an ignition switch, a door lock mechanism, a brake pedal, or a switch to be operated in order to illuminate/extinguish vehicle light. The count output means counts the number of signals output from the detection means, within the code input time which has been predetermined for the program mode of the receiver. A function selection code corresponding to the count result output from the count output means is output. During the program mode of the transmitter, the function selection code output from the count output means is stored in the first memory means so as to correspond to a transmitter ID code.

The function selection code input means detects the mode of operation of the mode setting switch used for effecting switching between a program mode and an operation mode, thereby outputting a function selection code corresponding to the thus-detected operation mode.

While the receiver is set in a program mode through actuation of the mode setting switch of the receiver, the mode setting switch is actuated, thus enabling entry of a function selection code corresponding to the operation mode. For example, in a case where the mode setting switch is configured so as to be manually turned on or off according to whether the receiver is in a program mode or an operation mode, the mode of operation of the mode setting switch may correspond to the number of times the mode setting switch is switched between ON and OFF within a predetermined code input time or a duration during which the mode setting switch remains ON or OFF. A function selection code corresponding to the number of times the mode setting switch is switched or corresponding to the duration is produced and is employed as a function selection code.

During the program mode of the receiver, the function selection code input means may output a function selection code corresponding to the transmission code output from the transmitter.

In a state in which the receiver is set in a program mode, the operation switch of the transmitter is actuated, to thereby transmit a transmission code. In response to the transmission code, a function selection code is output. The function transmission code may correspond to (a) a control code contained in the transmission code output from the transmitter, (b) a function selection code corresponding to a comparison result output from the comparison means as a result of comparison between the duration of the transmission code and a predetermined period of time, in a case where the transmitter iteratively and continuously transmits the transmission code over a period of time during which the operation switch of the transmitter is actuated, or (c) a function selection code corresponding to the count result output from the count means after the count means has counted the number of times the transmission code is received within a predetermined period of time, in a case where the transmitter transmits each time the operation switch is actuated.

BRIEF DESCRIPTION OF THE DRAWINGS

FIGS. 8-1 through 8-4 are schematic representations showing the configuration of a second memory location 38.

FIGS. 17-1 through 17-4 are tables showing the configuration of a second memory location 38 of the second embodiment.

FIGS. 29-1 through 29-3 are schematic representations showing the transmission code signal 15 transmitted from the transmitter 1 according to a ninth embodiment of the present invention.

FIGS. 38-1 through 38-4 are tables showing the configuration of the second memory location 38 in which a function selection code and operation information are stored in the form of a table while they are correlated with each other, according to a thirteenth embodiment of the present invention.

DETAILED DESCRIPTION OF THE PRESENT INVENTION

The present invention will be described in detail with reference to the accompanying drawings.

(First Embodiment)

Figure 1:
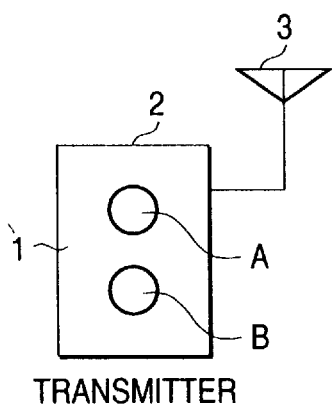
FIG. 1 is an illustration showing a compact and portable transmitter 1 according to a first embodiment of the present invention.

A first embodiment of the present invention will now be described by reference to FIGS. 1 through 11. FIG. 1 shows a compact portable transmitter 1 according to the first embodiment of the present invention. A housing 2 of the transmitter 1 is provided with a plurality of operation switches (for example, two buttons A and B) and an antenna 3 for transmitting a transmission signal. The antenna 3 includes an antenna element accommodated in the transmitter 1 (for example, a conductor pattern of a wiring board). The transmitter 1 may transmit a radio signal by way of the antenna 3. In another embodiment of the transmitter 1, the transmitter 1 may employ ultrasonic waves, or light such as infrared rays or visible rays. A transmission code 15 (see FIG. 3 to be described later) corresponding to a coded digital signal is emitted from the transmitter 1. In response to the transmission code 15, a receiver 4 (see FIG. 6 to be described later) provided in a vehicle, such as an automobile, controls locking or unlocking of door lock mechanisms 5 and 6, unlocks a trunk lock mechanism 7, thereby unlocking a trunk, or activates a horn 8 serving as alarm sounding means, to thereby prevent theft of a vehicle.

Figure 2:
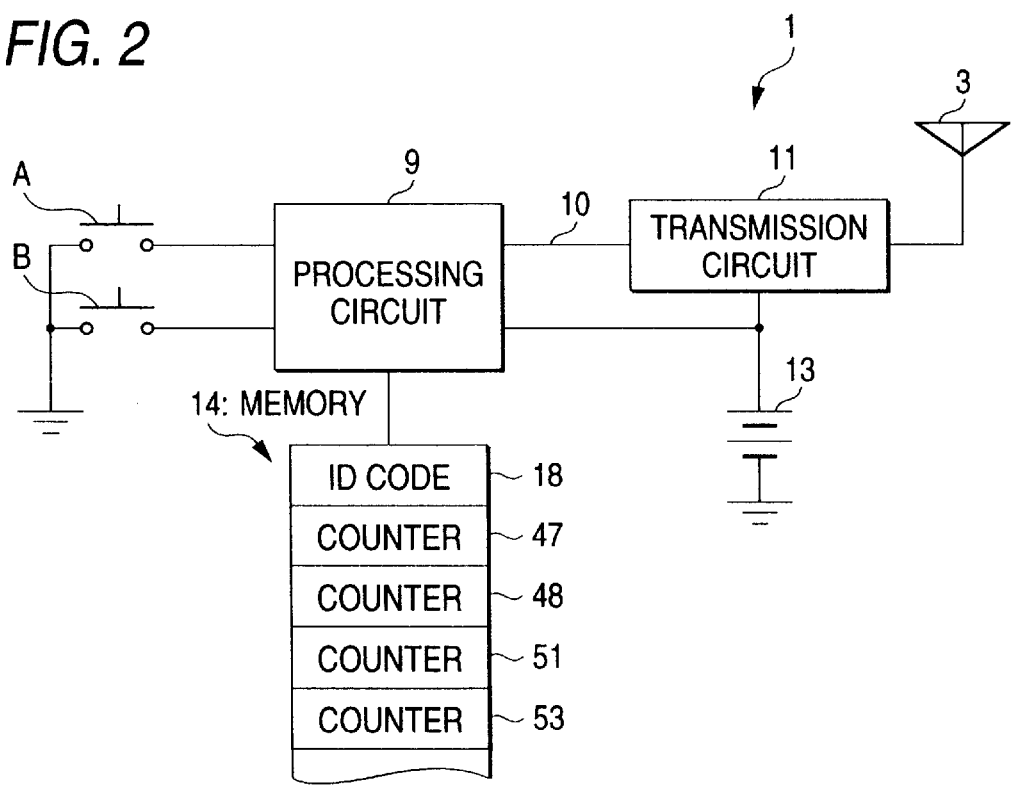
FIG. 2 is a block diagram showing the electrical configuration of the transmitter 1 shown in FIG. 1.

FIG. 2 is a block diagram showing the electrical configuration of the transmitter 1 shown in FIG. 1. When the push buttons A and B are in a non-pressed state, the buttons remain inactive. Upon being pressed, the push buttons A and B are switched to an active state. A signal output from either the button A or B is delivered to a processing circuit 9 materialized by a microcomputer. The transmission code 15, which is a coded digital signal and is generated by the processing circuit 9, is delivered to a transmission circuit 11 by way of a line 10. In the transmission circuit 11, a high-frequency carrier signal is modulated by the coded digital signal, and the thus-modulated signal is transmitted from the antenna 3 after the power of the modulated signal has been amplified. Power is supplied to the processing circuit 9 and the transmission circuit 11 from a portable battery 13. The processing circuit 9 is connected to memory 14.

Figure 3:
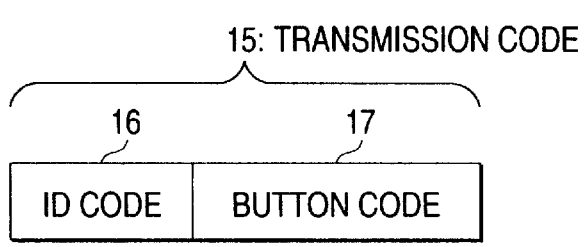
FIG. 3 is an illustration showing a transmission signal 15 which is a coded digital signal produced by and output from a processing circuit 9.

FIG. 3 shows the transmission code 15 which is a coded digital signal and is generated and output from the processing circuit 9. The transmission code 15 comprises an ID code 16 serving as a transmitter ID code, and a button code 17 which consists of two bits and corresponds to a control code representing a desired function. As mentioned above, the transmission code 15 modulates a carrier signal in the transmission circuit 11, and the thus-modulated carrier signal is transmitted from the antenna 3. The single transmission code 15 has a transmission period of 20 μsec, for example.

The transmitter ID code 16 corresponds to a code unique to the transmitter 1 and is set in a storage region of the memory 14. When either the push button A or the push button B is actuated, the processing circuit 9 outputs the transmitter ID code 16 together with the button code 17.

Figure 4:
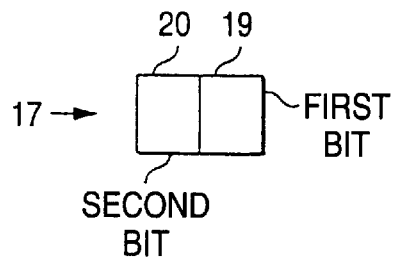
FIG. 4 is an illustration showing the configuration of a button code 17.

FIG. 4 is an illustration showing the configuration of the button code 17. The button code 17 comprises a first bit 19 and a second bit 20. When the push button A is pressed, the second bit 20 assumes a logic value of "1." In contrast, when the push button A is not pressed, the second bit 20 assumes a logic value of "0." When the button B is pressed, the first bit 19 assumes a logic value of "1." When the button B is not pressed, the first bit 19 assumes a logic value of "0." Eventually, the processing circuit 9 produces the button codes 17 such as those provided in Table 1.

TABLE 1

| PUSH BUTTON | | BUTTON CODES 17 | |
| --- | --- | --- | --- |
| A | B | SECOND BIT 20 | FIRST BIT 19 |
| ON | OFF | 1 | 0 |
| OFF | ON | 0 | 1 |
| OFF | OFF | 0 | 0 |

Figure 5:
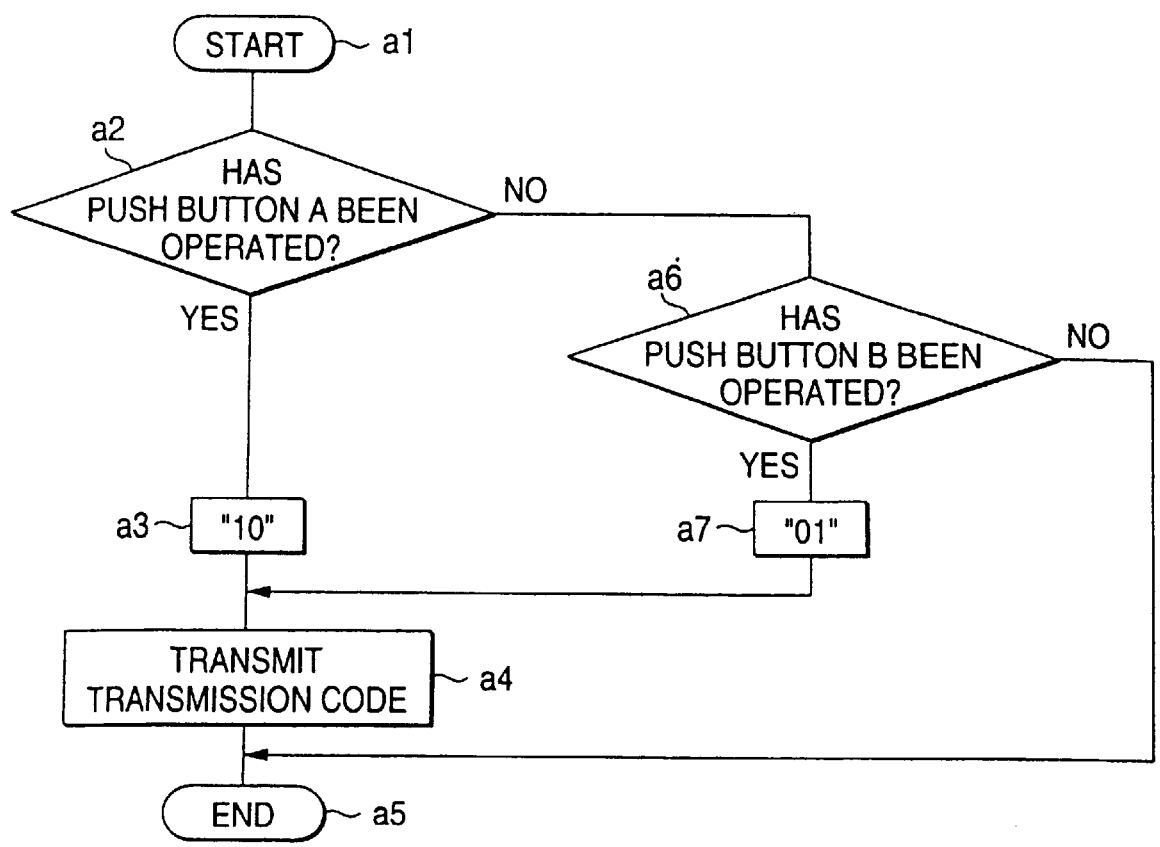
FIG. 5 is a flowchart for describing the operation of the processing circuit 9 of the transmitter 1.

FIG. 5 is a flowchart for describing the operation of the processing circuit 9 of the transmitter 1. Processing proceeds from step a1 to step a2, where a determination is made as to whether or not the push button A is pressed. If the push button A has been actuated, the processing circuit 9 produces "10" as the button code 17 and delivers the transmission code 15 to the transmission circuit 11 together with the transmitter ID code 16 by way of the line 10.

If in step a2 the push button A is determined to not be pressed and in step a6 the push button B is determined to be actuated, "01" is produced as the button code 17 in step a7, and the button code 17 is delivered to the transmission circuit 11 together with the transmitter ID code 16 way of the line 10. In step a4, the transmission circuit 11 modulates a carrier signal through use of the transmission code 15 and transmits the thus-modulated carrier signal from the antenna 3. In step a5, a round of processing operations is completed. The processing circuit 9 may be arranged so as to produce the transmission code 15 once or to consecutively produce the transmission code 15 a predetermined number of times when the push button A is actuated. Alternatively, the processing circuit 9 may produce the transmission code 15 repeatedly and consecutively over the period of time during which the push button A or B is actuated.

Figure 6:
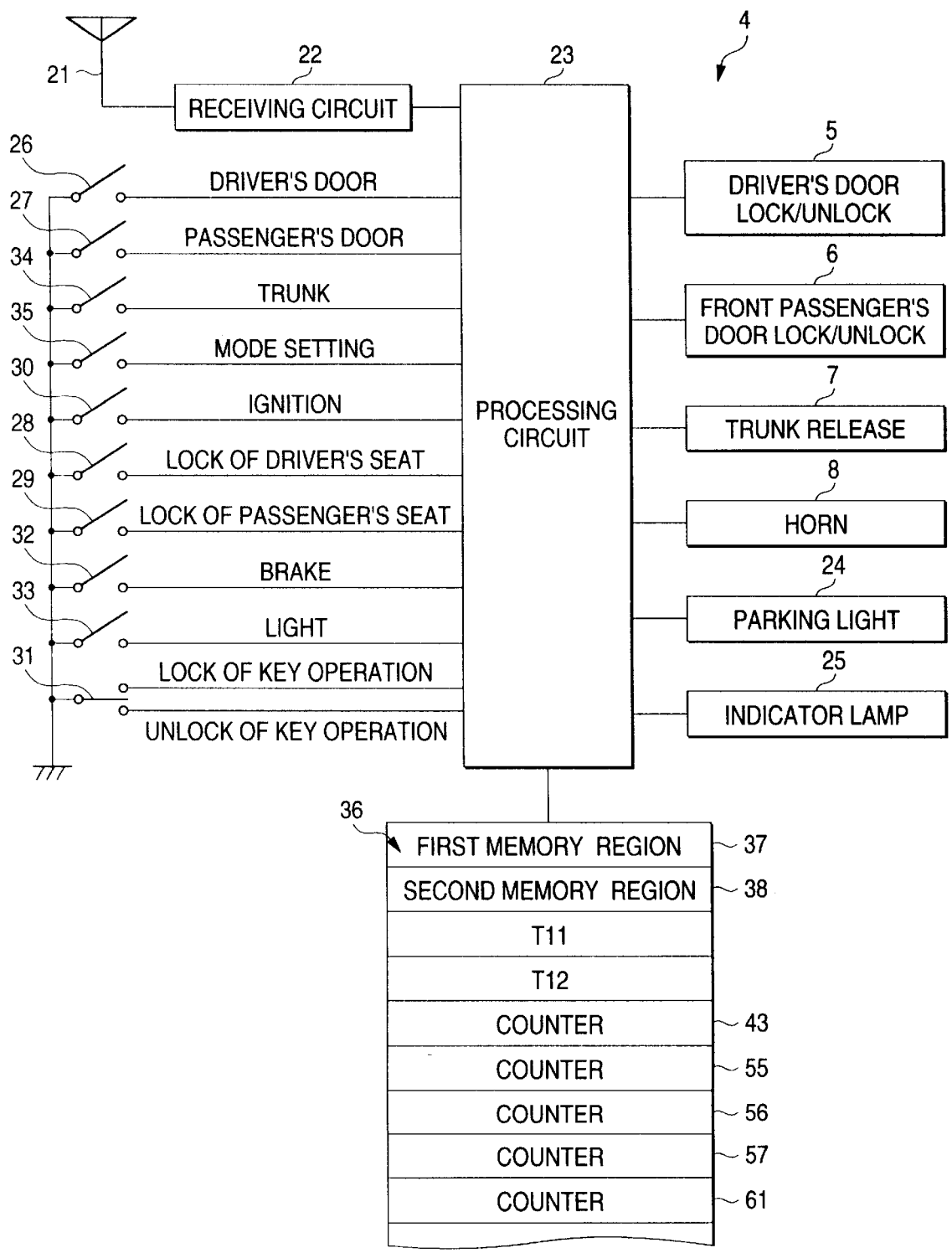
FIG. 6 is a block diagram showing the configuration of a receiver 4.

FIG. 6 is a block diagram showing the configuration of the receiver 4. The transmission code 15 transmitted from the antenna 3 of the transmitter 1 is received and amplified by a receiving circuit 22 by way of an antenna 21 of the receiver 4. The thus-received transmission code 15 is delivered to a processing circuit 23 embodied by a microcomputer. As mentioned previously, the processing circuit 23 controls locking or unlocking of the door lock mechanisms 5 and 6, unlocking of the trunk lock mechanism 7, or activates the horn 8. Further, the processing circuit 23 controls illumination or extinction of a parking light 24 and an indicator lamp 25 which is provided on an instrument panel and which illuminates and provides an indication during a program mode. The door lock mechanism 5 is provided for a driver's door, and the door lock mechanism 6 is provided for a front passenger door.

The processing circuit 23 receives a signal output from a courtesy switch 26 for detecting opening/close of a driver's door and a signal output rom a courtesy switch 27 for detecting the opening/close of the front passenger door. Further, the processing circuit 23 receives a signal output from a lock switch 28 for detecting that the lock mechanism 5 of the driver's door is locked/unlocked and a signal output from a lock switch 29 for detecting that the lock mechanism 6 of the front passenger door is locked/unlocked. The processing circuit 23 receives a signal for detecting an ON/OFF state of an ignition switch 30 which supplies power to an ignition circuit of a spark ignition internal combustion engine for driving a vehicle. A switch 31 is provided within a key cylinder of the driver's door and detects the angular orientation of a removable key which is subjected to angular displacement in accordance with the locking/unlocking operation of the lock mechanisms 5 and 6. A signal output from the switch 31 is delivered to the processing circuit 23.

Further, the processing circuit 23 receives a signal output from a brake switch 32 for detecting actuation of a vehicle's brake pedal and a signal output from a light switch 33 which is activated for illuminating or extinguishing headlamps. Further, there is provided a trunk courtesy switch 34 which becomes active when the trunk cover is closed, and a signal output from the switch 34 is delivered to the processing circuit 23.

The receiver 4 is provided with a mode setting switch 35 for enabling manual switching between a program mode and an operation mode of the processing circuit 23. A signal output from the mode setting switch 35 is delivered to the processing circuit 23. For example, when the mode setting switch 35 is activated, the processing circuit 23 is set to a program mode. In contrast, if the mode setting switch 35 is deactivated, the processing circuit 23 is set to an operation mode. Here, the operation mode is a mode for a control corresponding to the transmitter by receiving the transmission code from the transmitter. The program mode is a mode for freely assigning control functions to the button of the transmitter by an user. In usual, the mode is set to the operation mode. The processing circuit 23 is connected to memory 36. The memory 36 comprises a first memory location 37 constituting first memory means; a second memory location 38 constituting second memory means; memory locations for storing constants T11 and T12; and counter regions 43, 55 to 57, and 61. The first and second memory locations 37 and 38 are originally formed from separate memory devices. More specifically, the first memory location 37 is implemented by a reloadable ROM (E$^2$PROM), and the second memory location 35 and the memory locations for storing constants T11 and T12 are implemented by ROM. Further, the counter region 43 is implemented by RAM. For convenience of illustration, these elements are illustrated in FIG. 6 as if they were included in the single memory 36.

Figure 7:
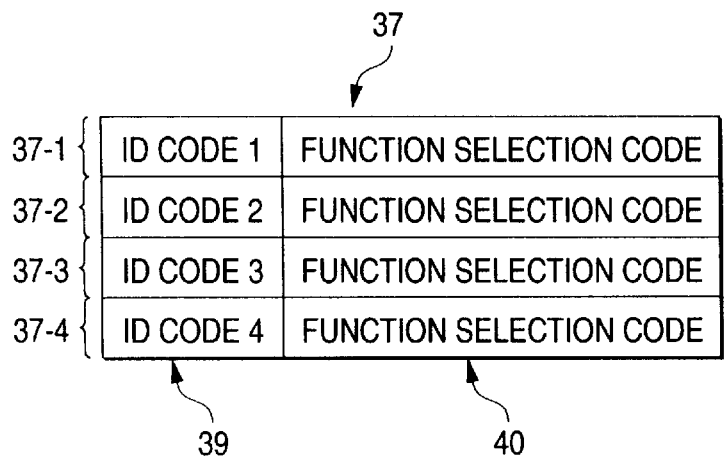
FIG. 7 is a schematic representation showing the configuration of a first memory location 37.

FIG. 7 shows the configuration of the first memory location 37. The first memory location 37 comprises ID code storage regions 39 for storing a plurality of ID codes ID1 to ID4, and storage regions 40 for storing function selection codes assigned to the respective ID codes ID1 to ID4. In the present embodiment, there are provided a maximum of four storage regions 39. Each of the four storage regions 39 has a storage capacity sufficient for storing the respective ID codes ID1 to ID4. Further, each of the storage regions 40 has a storage capacity sufficient for storing a function selection code including two bits. The ID code storage regions 39 and the storage regions 40 constitute a table including the ID codes ID1 to ID4 and the function selection codes. This table is set in the first memory location 37.

Figures 1, 8:
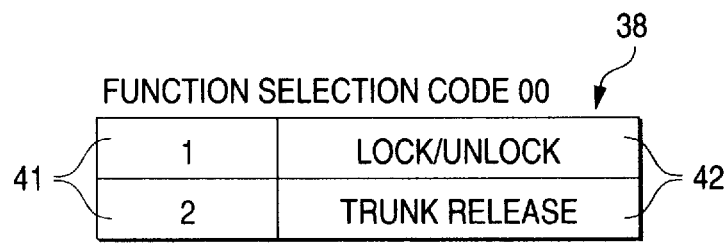
Figures 2, 8:
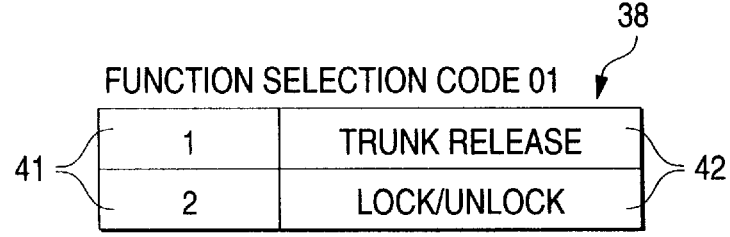
Figures 3, 8:
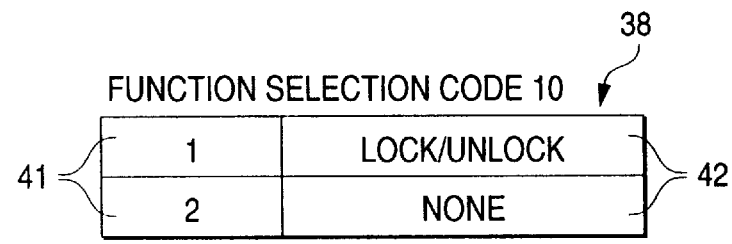
Figures 4, 8:
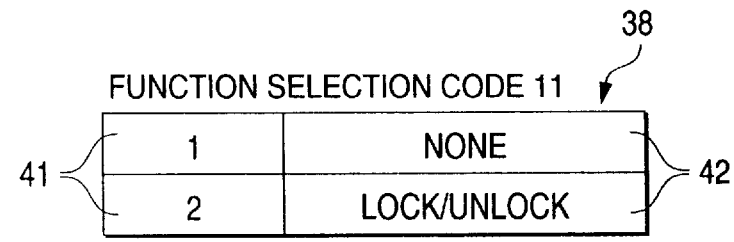

FIGS. 8-1 to 8-4 show the configuration of the second memory location 38. The second memory location 38 is assigned four function selection codes 00, 01, 10, and 11, which in Table 2 are correlated with their corresponding Figures. As shown in FIGS. 8-1 to 8-4, for each of the function selection codes 00, 01, 10, and 11, storage regions 41 and 42 are provided, to thereby constitute a pair.

TABLE 2

| FUNCTION SELECTION CODE | FIG. 8 |
|---|---|
| 00 | (1) |
| 01 | (2) |
| 10 | (3) |
| 11 | (4) |

Functions 1 and 2 stored in the storage region 41 are allocated to the respective operation information items stored in the storage regions 42, thus forming a table. As shown in Table 3, the functions 1 and 2 stored in the storage region 41 are allocated to the respective received button codes 17.

TABLE 3

| BUTTON CODE 17 | FUNCTIONS SHOWN IN. FIG. 8 |
|---|---|
| 10 | 1 |
| 01 | 2 |

A term "LOCK/UNLOCK" provided in FIGS. 8-1 to 8-4 designates information about locking or unlocking the lock mechanism 5 or 6. As will be described in connection with FIG. 11, in a case where function 1 or 2 assigned to LOCK/UNLOCK information is selected, if at least one door is in an unlocked state, the processing circuit 23 lock all the doors. If at least one door is in a locked state, the processing circuit 23 unlocks all the doors. A term "TRUNK RELEASE" provided in FIGS. 8-1 and 8-2 designates information about locking or unlocking the trunk lock mechanism 7.

Figure 9:
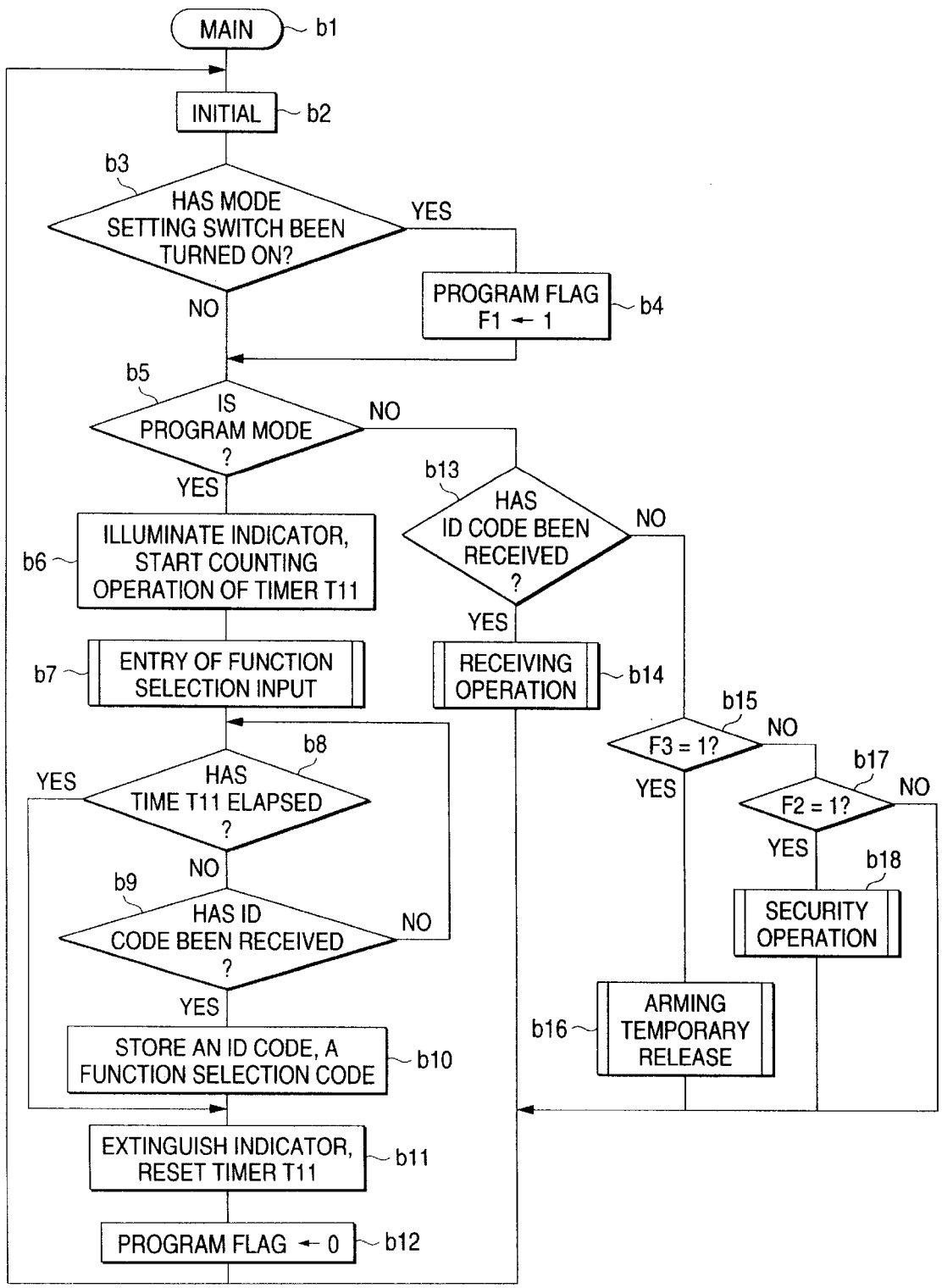
FIG. 9 is a flowchart showing the overall operation of a processing circuit 23 of the receiver 4.

FIG. 9 is a flowchart showing the overall operation of the processing circuit 23 of the receiver 4. Processing proceeds from step b1 to step b2. When power is turned on; namely, when the receiver 4 is connected to an unillustrated vehicle battery, the processing circuit 23 is initialized. In step b3, a determination is made as to whether or not the mode setting switch 35 is in an ON state; that is, whether or not a program mode is set. If the mode setting switch 35 is in an ON state, processing proceeds from step b3 to step b4 in order to execute a program mode, and a program flag F1 is set to a logic value of "1," whereby the program flag F1 is set. In step b5, a determination is made as to whether or not the current operation mode of the receiver 4 is a program mode; that is, whether or not the program flag F1 assumes a logic value of "1."

If the program flag F1 assumes a logic value of "1," processing proceeds to step b6. An indicator lamp 25 is illuminated, to thereby indicate that the receiver 4 is in a program mode. Further, the mode setting switch 35 is actuated at this time, whereupon a timer T11 starts a counting operation. In the present specification, for convenience of comprehension, a timer and a period of time to be counted (hereinafter referred to simply as a "count period") by the timer are designated by the same reference numeral. In step b7, the function selection code described in connection with FIG. 8 is entered. The input operation performed in step b7 will be described in connection with FIG. 10. The function selection code is entered during the period of a time-of-day counting operation performed by the timer T11. For instance, the count period T11 of the timer T11 is 30 seconds. In step b8, a determination is made as to whether or not the count T11 has elapsed. If the count period T11 has elapsed, processing proceeds to step b11, in which the indicator lamp 25 is extinguished and the timer T11 is reset, thereby stopping the counting operation. In step b12, the program flag F1 is reset to logic value of "0."

If in step b8 the count period T11 is determined to not have elapsed, in step b9 the transmitter ID code 16 constituting the transmission code 15 is transmitted from the transmitter 1, and a determination is made as to whether or not the receiving circuit 22 has received the transmitter ID code 16.

If the transmitter ID code 16 has been received by the receiving circuit 22, processing proceeds to step b10. In step b10, the thus-received transmitter ID code 16 and the function selection code input in step b7 are stored in the storage region 39 and the storage region 40 of the first memory location 37 shown in FIG. 7 in the form of a table structure. As mentioned previously, the transmitter ID code 16 allocated to the transmitter 1 and the entered function selection code can be stored in a rewritable manner in the form of a table structure.

The pair consisting of a transmitter ID code and a function selection code is stored in a first region 37-1 to a fourth regions 37-4 of the first memory location 37 in sequence given every time a new transmitter is programmed. When a transmitter is first programmed, a pair consisting of a transmitter ID code allocated to the transmitter and an input function selection code is stored in the first region 37-1. When another transmitter is programmed, a pair consisting of a transmitter ID code allocated to the transmitter and an input function selection code is stored in the second region 37-2. In a like manner, every time a new transmitter is programmed, a pair consisting of a transmitter ID code allocated to the transmitter and an input function selection code is stored in the third region 37-3 and the fourth region 37-4, in this sequence. In a case where a new transmitter is programmed while four transmitter ID codes are stored in the first memory location 37, the oldest data pertaining to the first region 37-1 are deleted, and the data stored in the second region 37-2 through the fourth region 37-4 are transported to the first region 37-1 through the third region 37-3, and a new pair consisting of a transmitter ID code and an input function section code is stored in the fourth region 37-4. In this way, the most current four transmitter ID codes and their corresponding input function selection codes are stored in the first memory location 27.

Figure 11:
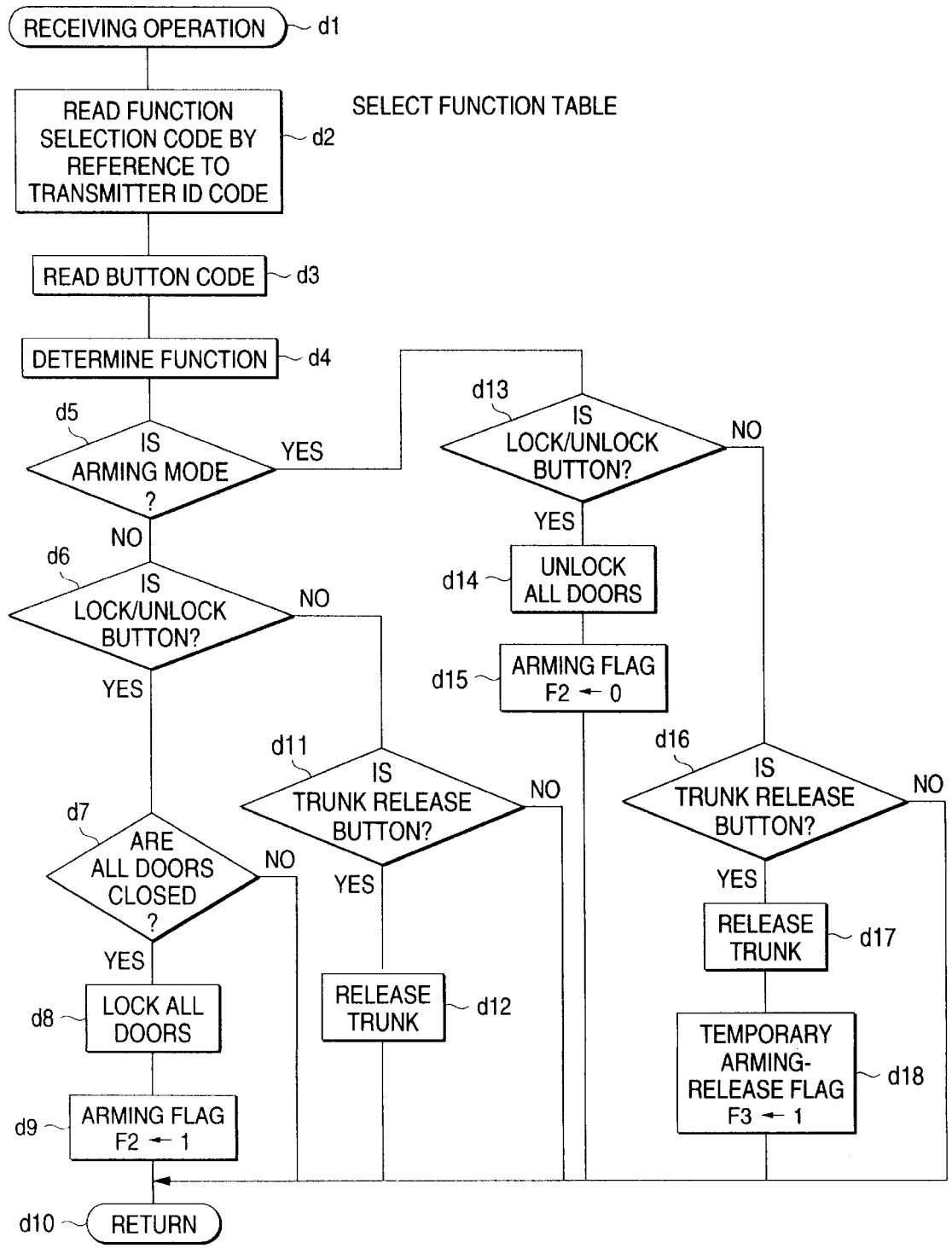
FIG. 11 is a flowchart for describing a receiving operation to be performed in step b14 shown in FIG. 9.

After completion of the program mode, the mode setting switch 35 is turned off, thereby bringing the processing circuit 23 into an operation mode. Processing proceeds from step b3 to step b13 by way of step b5. In step b13, the receiving circuit 22 receives the transmitter ID code 16 included in the transmission code 15 transmitted from the transmitter 1. A determination is made as to whether or not the thus-received transmitter ID code 16 matches any one of the transmitter ID codes ID1 to ID4 stored in the storage regions 39 of the first memory location 37, by comparing the received transmitter ID code 16 with the transmitter ID codes ID1 to ID4 in sequence from the fourth region 37-4 to the first region 37-1 shown in FIG. 7. If a match exists between the received transmitter ID code 16 and any one of the transmitter ID codes stored in the storage regions 39 of the first memory location 37, in step b14 a receiving operation, which will be described later in connection with FIG. 11, is performed, so that the receiver 4 performs an arming operation for effecting a locking or unlocking operation or an alarming operation.

Figure 13:
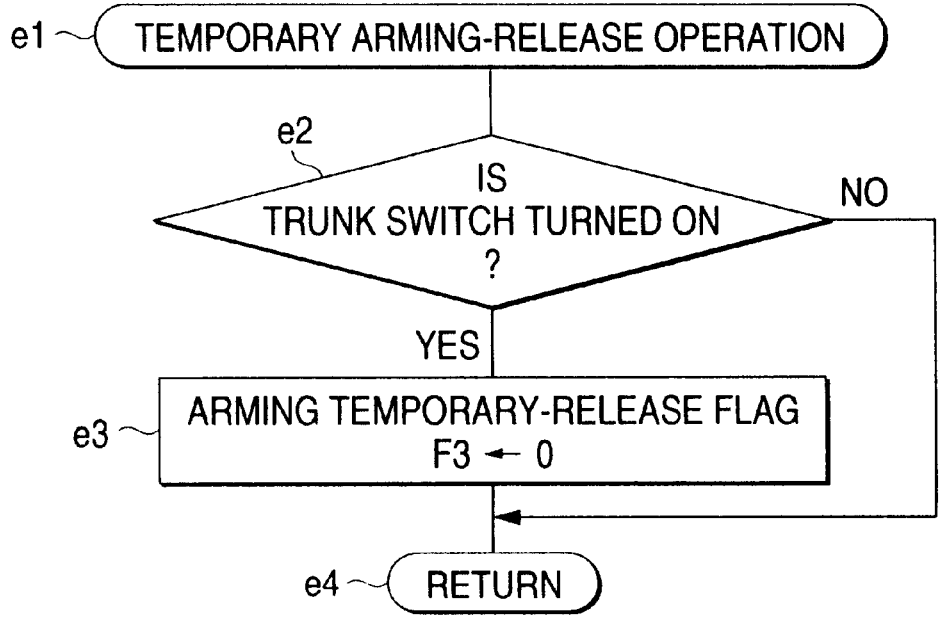
FIG. 13 is a flowchart for describing a temporary arming-release operation.

If in step b13 no match is determined to exist between the received transmitter ID code 16 and any one of the transmitter ID codes ID1 to ID4 stored in the storage regions 39 of the first memory location 37, processing proceeds to step b15. In step b15, a determination is made as to whether or not flag F3 assumes a logic value of "1." In a case where the flag F3 assumes a logic value of "1," the receiver 4 is in a temporary arming-release mode. In this mode, an arming operation for causing the horn 8 to produce a warning is temporarily released. When the receiver 4 is in a temporary arming-release mode, in step b16 a temporary arming-release operation, which will be described in connection with FIG. 13, is performed.

Figure 12:
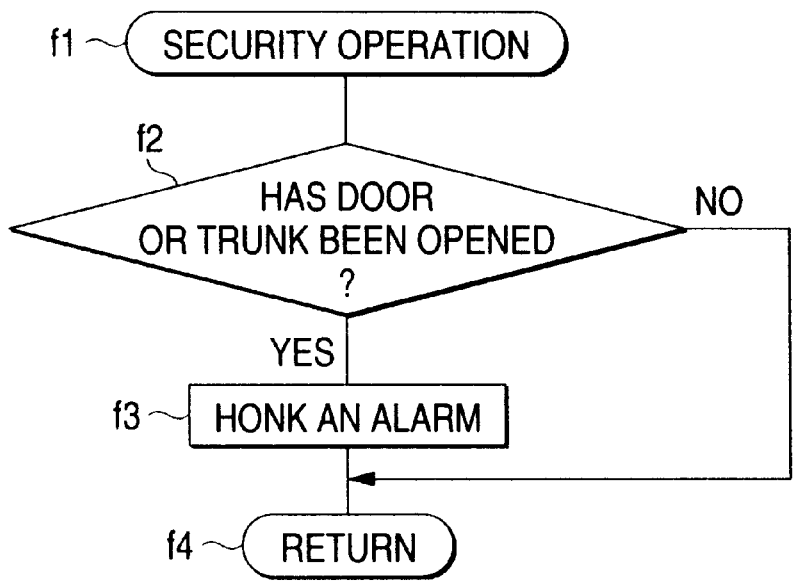
FIG. 12 is a flowchart for describing a security operation which is one of operations to be performed in an arming mode.

In step b15, if the flag F3 is determined to assume not a logic value of "1" but a logic value of "0," processing proceeds to step b17, where a determination is made as to whether or not a flag F2 assumes a logic value of "1." In a case where the flag F2 assumes a logic value of "1," the receiver 4 is in an arming mode, in which the horn 8 produces a warning. If the flag F2 assumes a logic value of "1," processing proceeds from step b17 to step b18, where a security operation to be described later in connection with FIG. 12 is performed.

Figure 10:
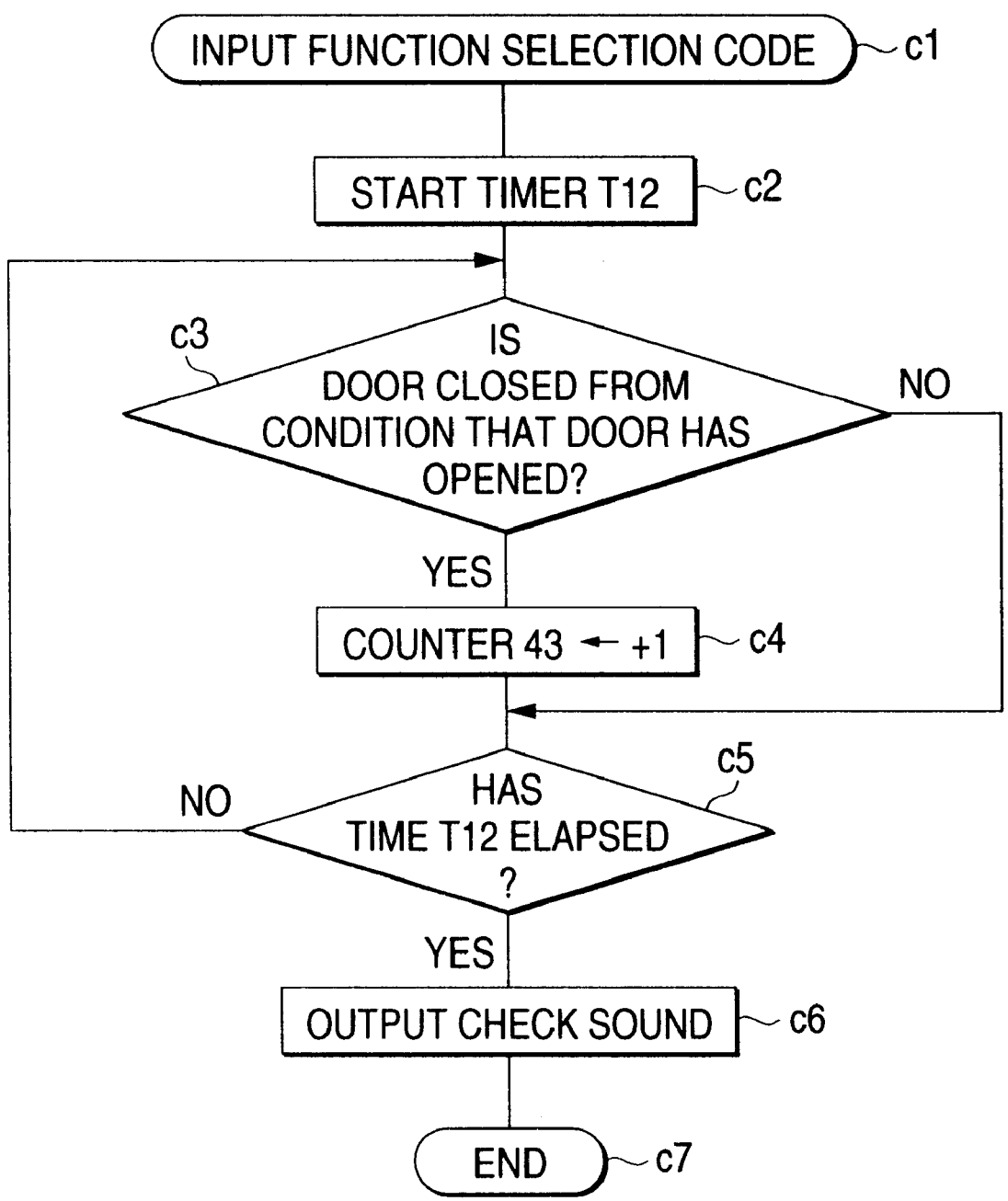
FIG. 10 is a flowchart for describing entry of a function selection code to be performed in step b7 shown in FIG. 9.

FIG. 10 is a flowchart for describing the function code input operation relating to step b7 shown in FIG. 9. Processing proceeds from step c1 to step c2, where a timer T12 starts a counting operation. In step c3, a determination is made as to whether or not the user (i.e., an operator) has manually opened/closed a driver's door or a front passenger door one or more times, so that the number is counted how many times the driver's door or the front passenger door is closed from the condition that the door has opened. The opening/closing action of the door is detected by means of any one of the courtesy switches 26 and 27. These doors correspond to the equipment provided for a vehicle beforehand and articles to be actuated by an operator. The courtesy switches 26 and 27 detect the operated state of the articles to be actuated; i.e., the operating states of the doors. Every time the opening/closing action of the door is detected by any one of the courtesy switches 26 and 27, in step c4 a counter 43 counts the number of signals output from the courtesy switches 26 and 27. In step c5, a determination is made as to whether or not a count period T12 of the timer T12 has elapsed. Here, the count period T12 of the timer 12 is set to five seconds.

When the count period T12 of the timer T12 has elapsed, in step c6 the horn 8 emits a beep sound for notifying the user. In step c7, a round of operations for inputting a function selection code is completed.

As shown in Table 4, count values 0 to 3 effected by the counter 43 are stored in the storage regions 40 of the first memory location 37 shown in FIG. 7, in the form of binary function selection codes.

TABLE 4

| COUNT VALUES | FUNCTION SELECTION CODES |
| --- | --- |
| 0 | 00 |
| 1 | 01 |
| 2 | 10 |
| 3 | 11 |

In step b9 shown in FIG. 9, the transmitter 1 transmits the transmission code 15, and the receiving circuit 22 receives the transmission code 15. The transmitter ID code 16 included in the thus-received transmission code 15 is stored in the storage region 39 so as to pair up with a corresponding input function selection code. When the door is not opened or closed in step c3, processing proceeds to step c5. If the door is not opened or closed at all during the count period T12, a function selection code "00" corresponding to a count value "0" shown in Table 3 is derived. In the case of a count value of "1," a function selection code "01" is derived. In the case of a count value of "2," a function selection code "10" is derived. Further, in the case of a count value of "3," a function selection code "11" is derived. The counter 43 constitutes count output means for use in inputting a function selection code.

In another embodiment, in place of the courtesy switches 26 and 27 for detecting the opening or closing action of the vehicle door, there may be employed the ignition switch 30 for supplying power to an ignition circuit of a spark ignition internal combustion engine; the lock switch 28 for detecting that the lock mechanism 5 is locked/unlocked and the lock switch 29 for detecting that the lock mechanism 6 is locked/unlocked; the switch 31 for detecting the angular orientation of a removable key which is subjected to angular displacement in accordance with the locking/unlocking operation of the lock mechanisms 5 and 6; or the light switch 33 to be actuated in order to illuminate/extinguish the vehicle light 24 or the brake switch 32 for detecting actuation of a vehicle's brake pedal. In such a case, a function selection code is determined on the basis of the number of times the switch has been activated.

In the present embodiment, an operation switch for activating a turn-signal indicator for indicating the traveling direction of a vehicle may also be employed. The present embodiment may also be embodied such that equipment to be actuated by the operator (i.e., the user) and provided for a vehicle beforehand is actuated by the operator and such that detection means having a switch or another configuration detects the actuating operation.

In another embodiment, in step c3 shown in FIG. 10 the mode setting switch 35 may be arranged to be turned on/off in order to enable entry of a function selection code. Alternatively, a function selection code corresponding to the on/off operation time in lieu of the number of times the mode setting switch 35 has been activated may be derived as a substitute for the counting operation of the counter 43 to be performed in step c4 shown in FIG. 10.

In another embodiment, the number of times either the push button A or B of the transmitter 1 has been pressed, or the push buttons A and B have been pressed simultaneously for entering a function selection code may be employed in lieu of the number of times the mode setting switch 25 has been actuated. Alternatively, the transmission code 15 including the button code 17 assigned to the push button A or B or the operating mode of the push button A or B is transmitted from the transmitter 1 by means of pressing either the push button A or B of the transmitter 1, or by means of pressing the push buttons A and B simultaneously. In lieu of the counting action of the counter 43 in step c4, a function selection code corresponding to the thus-received button code 17 may be generated on the basis of the button code 17 received by the receiving circuit 22.

FIG. 11 is a flowchart for describing a receiving operation to be performed in step b14 shown in FIG. 9. While the processing circuit 23 is set in an operation mode by means of actuation of the mode setting switch 35, the receiving circuit 22 receives the transmission code 15 from the transmitter 1. If a match exists between the transmitter ID code 16 included in the transmission code 15 and a predetermined one or more types of transmitter ID codes stored in the storage region 39 of the first memory location 37, in step d2 a function selection code corresponding to the thus-matched transmitter ID code is read from the storage region 40.

In step d3, operation information corresponding to the button code 17 included in the transmission code 15, which has been transmitted from the transmitter 1 and received by the receiving circuit 22, is read from the storage region 42 which constitutes a table in conjunction with a corresponding storage region 41 of the second memory location 38. In step d4, the operation of a device to be controlled provided in a vehicle is determined by the thus-read operation information.

In an operation mode shown in FIG. 11, a function selection code allocated to the transmitter ID code 16 included in the transmission code 15 output from the transmitter 1 assumes a value of, for example, "00." Therefore, the following description is based on the assumption that the table shown in FIG. 8-1 is selected. In a case where the button code 17 of the transmission code 15 transmitted from the transmitter 1 assumes a value of "01" in response to actuation of the push button A, function "1," i.e., a LOCK/UNLOCK function, is determined, as illustrated in Table 3.

As shown in, for example, FIGS. 8-1 to 8-4, the device to be controlled (that is, means to be controlled) corresponds to the locking/unlocking of the door lock mechanism 5, the locking/unlocking operation of the door lock mechanism 6, or a trunk release operation; that is, unlocking of the trunk lock mechanism 7.

In step d5, a determination is made as to whether or not the current operation mode of the receiver 4 is an arming mode, which is one of the operation modes of the receiver 4; that is, whether or not the arming flag F2 assumes a logical value of "1." In the arming mode, all the doors and the trunk are closed and locked. In a case where the temporary arming-release flag F3 to be described later assumes a logic value of "0" at this time, in the event that at least one of the doors and the trunk is opened by a thief, the horn 8 produces a warning, thus preventing car theft, as shown in FIG. 12 to be described later.

In step d5 shown in FIG. 11, if the current operation mode of the receiver 4 is not an arming mode; that is, if the arming flag F2 is determined to assume a logic value of "0," processing proceeds to step d6, where a determination is made as to whether or not the function corresponding to the actuated push button is locking/unlocking of the door lock mechanism 5 or 6. If in step d6 the button code 17 is determined to assume a logic value of "1" shown in FIG. 8-1, in step d7 a determination is made as to whether or not all the doors including the driver's door and a front passenger door, are closed, through use of the courtesy switches 26 and 27. In a case where all the doors are closed, in step d8 all the doors are locked by the door lock mechanisms 5 and 6. In step d9, the arming flag F2 is set to a logic value of "1," thus bringing the receiver 4 into an arming mode.

In the arming mode, as mentioned above, the arming flag F2 assumes a logic value of "1." If at least one of the doors is determined to be open by way of the courtesy switches 26 and 27 being in the arming mode, or if opening of the trunk is determined by the switch 34 for detecting opening/closing action of the trunk, the horn 8 produces a warning. In step d10, a round of operations is completed.

In a case where in step d7 the opening of one of the plurality of vehicle doors is detected by way of the courtesy switches 26 and 27, processing proceeds from step d7 to step d10, so that the receiver 4 remains released from the arming mode.

In a case where in step d5 the current operation mode of the receiver 4 is determined to be an arming mode; that is, the arming flag F2 is determined to assume a logic value of "1," processing proceeds to step d13. As mentioned previously, the function selection mode "00" shown in FIG. 8-1 is read in step d13, and the button code 17 transmitted from the transmitter 1 assumes a value of "10." From Table 3, the selected function code is determined to assume "1." If at this time the function is determined to be LOCK/UNLOCK operation pertaining to the door lock mechanisms 5 and 6, in step d13 all the vehicle doors are unlocked by the door lock mechanisms 5 and 6. In step d15, the arming flag F2 is set to a logic value of "0," thereby releasing the receiver 4 from an arming mode. So long as the arming flag F2 is set to a logic value of "0," the horn 8 does not produce a warning, even when the courtesy switches 26 and 27 detect opening of a door or when the switch 34 detects opening of the trunk.

Processing proceeds to step d11 when in step d5 the current operation mode of the receiver 4 is determined to not be an arming mode; that is, when the arming flag F2 is determined to assume a logic value of "0," as well as when in step 6 the button code 17 is determined to not assume a value of, for example "10," which represents that the selection function does not correspond to a value of "1" shown in FIG. 8-1; more specifically, when the button code 17 is determined to not correspond to LOCK/UNLOCK operation information about the door lock mechanisms 5 and 6.

In step d11, a determination is made as to whether or not the button code 17 assumes a value of, for example "01," and whether or not the function allocated to the button code 17 corresponds to a value of "2" shown in FIG. 8-1; that is, trunk release information representing unlocking of the trunk lock mechanism 7. If the button code 17 is determined to correspond to trunk release information, processing proceeds to step d12, where the trunk is unlocked by the trunk lock mechanism 7. In contrast, if the function allocated to the function button code 17 is determined not to correspond to a value of "2" shown in FIG. 8-1, processing proceeds to step d10.

In a case where in step d5 the current operation mode of the receiver 4 is determined to be an arming mode and where in step d13 the button code 17 is determined not to assume a value of, for example "10," and whether or not the function allocated to the button code 17 corresponds to a value of "1" shown in FIG. 8-1; that is, the door LOCK/UNLOCK operation information, processing proceeds to step d16. In step d16, a determination is made as to whether or not the received button code 17 assumes a vale of, for example "01," and whether or not the function allocated to the button code 17 corresponds to a value of "2" shown in FIG. 8-2; that is, trunk release information representing unlocking of the trunk lock mechanism 7. If the determination is correct; that is, when the function allocated to the button code 17 corresponds to a value of "2" shown in FIG. 8-1, processing proceeds to step d17, where The trunk is unlocked by the trunk lock mechanism 17. In step d18, the temporary arming-release flag F3 is set to a logic value of "1," and the receiver 4 is temporarily released from the arming mode. In a case where the receiver 4 is in an arming mode and where the temporary arming-release flag F3 assumes a logic value of "0," the horn 8 is forcefully inhibited from producing a warning even when the courtesy switches 26 and 27 detect opening of at least one door or when the trunk switch 34 detects opening of the trunk.

FIG. 12 is a flowchart for describing a security processing operation which is an operation in an arming mode. In a case where in step d9 shown in FIG. 11 the arming flag F2 assumes a logic value of "1" and where the temporary arming-release flag F3 assumes a logic value of "0," processing proceeds from step f1 to step f2. In step f2, there is made a determination as to whether or not a door is opened while the courtesy switches 26 and 27 are in a deactivated state and whether or not the trunk is opened while the trunk switch 34 is in a deactivated state. If in step f2 a door or the trunk is determined to have been opened, processing proceeds to step f3, where the horn 8 produces a warning for a duration of, for example, 60 seconds, thus ensuring the security of a vehicle against theft. In contrast, in a case where in step f2 no door or trunk is determined to be open; that is, all the doors and the trunk are determined to remain closed, processing proceeds to step f4.

FIG. 13 is a flowchart for describing an operation for temporarily releasing the receiver 4 from an arming mode. The temporary arming-release operation shown in FIG. 13 is achieved when in step d18 shown in FIG. 11 the temporary arming-release operation flag F3 assumes a logic value of "1." Processing proceeds from step e1 to e2. If the closing of the trunk is detected by the trunk switch 34, processing proceeds to step e3, where the temporary arming-release flag F3 is set to a logic value of "0." As a result, the receiver 4 is brought into a state in which arming is continuous.

In a case where in step e2 the trunk lock mechanism 7 still remains in an unlocking state, the trunk remains opened, and the trunk switch 34 is in a deactivated state, processing proceeds to step e4. Accordingly, the temporary arming-release flag F3 keeps assuming a logical value of "1."

(Second Embodiment)

A second embodiment of the present invention will be described by reference to FIGS. 14 through 18. The second embodiment is analogous to the first embodiment, and like reference numerals or reference numerals suffixed with "a" are assigned to corresponding elements. The configuration of a transmitter 1 of the second embodiment is analogous to that of the transmitter 1 of the first embodiment described in connection with FIGS. 1 and 2. In the second embodiment, the button codes 17 included in the transmission code 15 transmitted from the transmitter 1 are produced so as to correspond to respective types of actuation of the push buttons A and B; specifically; when the push button A has been pressed for less than two seconds; when the push button A has been pressed for two seconds or more; when the push button B has been pressed for less than two seconds; and the push button B has been pressed for two seconds or more.

Figure 14:
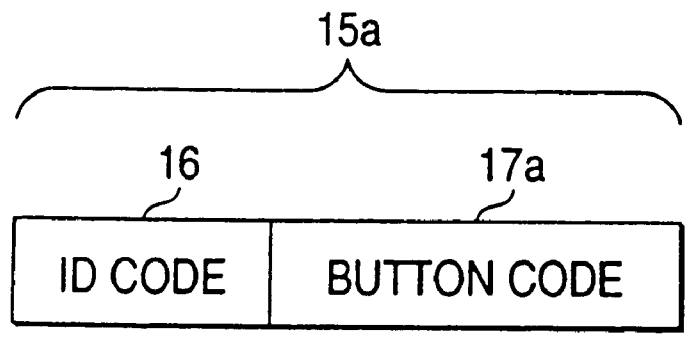
FIG. 14 is a schematic representation showing a transmission code signal 15a transmitted from the transmitter 1 of the second embodiment.

FIG. 14 schematically shows the transmission code 15a transmitted from the transmitter 1 of the second embodiment. The transmission code 15a comprises an ID code 16 and 3 bits of button code 17a.

Figure 15:
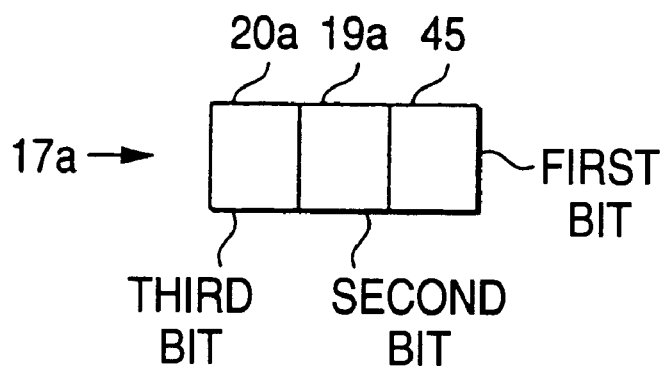
FIG. 15 is a schematic representation showing a button code 17a shown in FIG. 14.

FIG. 15 shows the button code 17a shown in FIG. 14. The button code 17a consists of a first bit 45, a second bit 19a, and a third bit 20a. When the push button A or B of the transmitter 1 has been pressed for more than two seconds, the first bit 45 assumes a logic value of "1." When the push button A or B has been pressed for less than two seconds, the first bit 45 assumes a logic value of "0." When the push button B has been pressed, the second bit 19a assumes a logic value of "1." In contrast, when the push button B has not been pressed, the second bit 19a assumes a logic value of "0." When the push button A has been pressed, the third bit 20a assumes a logic value of "1." When the push button A has not been pressed, the third bit 20a assumes a logic value of "0." The button codes 17a assigned to the respective operations of the push buttons A and B are shown in Table 5.

TABLE 5

| PUSH BUTTON | | BUTTON CODE 17a | | |
|---|---|---|---|---|
| A | B | THIRD BIT 20a | SECOND BIT 19a | FIRST BIT 45 |
| LESS THAN two seconds | | 1 | 0 | 0 |
| | LESS THAN two seconds | 0 | 1 | 0 |
| two seconds OR MORE | | 1 | 0 | 1 |
| | two seconds OR MORE | 0 | 1 | 1 |

Figure 16:
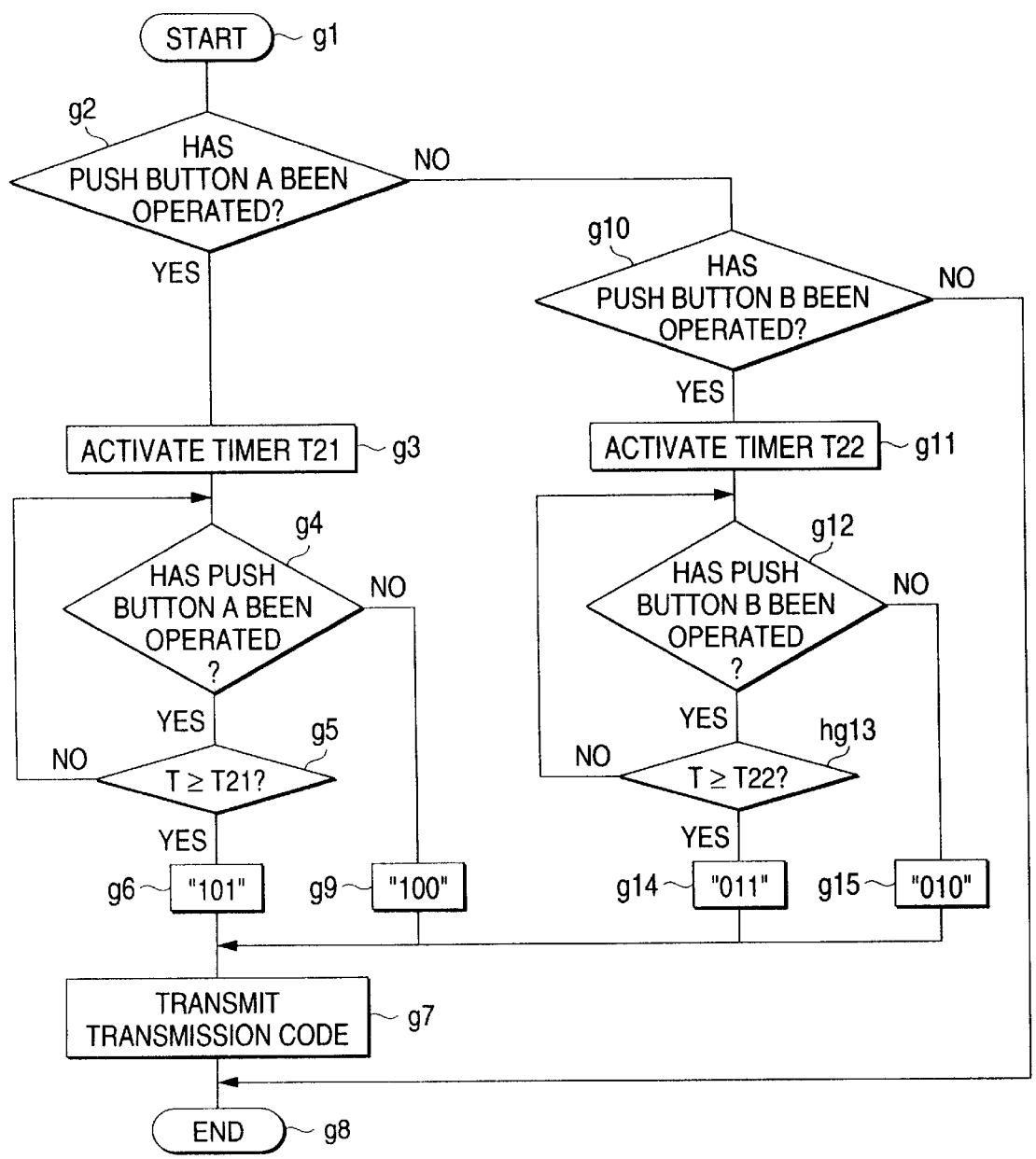
FIG. 16 is a flowchart for describing the operation of the processing circuit 9 of the transmitter 1 of the second embodiment (see FIG. 2).

FIG. 16 is a flowchart for describing the operation of a processing circuit 9 of the transmitter 1 according to the second embodiment (see FIG. 2). Processing proceeds from step g1 to step g2, where a determination is made as to whether or not the push button A has been pressed. In a case where the push button A has been pressed, in step g3 a timer T21 starts a time-of-day counting operation. In step g4, a determination is made as to whether or not the push button A has been pressed continuously. If the push button A has been pressed continuously, in step g5 a determination is made as to whether or not the time T counted by the timer T21 is greater than a preset count period T21 (T≧T21). If T≧T21 is determined at time g5, this indicates that the push button A has been pressed for more than T21. As a result, in step g6 a value of "101" is produced as a button code 17a. In a case where the push button A has been pressed for less than T21 (T<T21), processing proceeds from g4 to g9, where a value of "100" is produced as the button code 17a.

When in step g2 the push button A is determined to not have been pressed, in step g10 a determination is made as to whether or not the push button B has been pressed. In a case where the push button B has been pressed, another timer T22 starts a time-of-day counting operation. In step g12, a determination is made as to whether or not the push button B has been pressed continuously. In a case where the push button B has been pressed continuously, in step g13 a determination is made whether or not the time T during which the push button B has been pressed is greater than a count period T22 of the timer T22 (T≧T22). If T≧T22 is determined in step g13, in step g14 a value of "011" is produced as the button code 17a. For example, T21 and T22 may assume a length of two seconds.

In a case where the push button B has been pressed for less than T22 (T<T22), processing proceeds from step g12 to g15, where a value of "010" is produced as the button code 17a.

In step g7, the button codes 17a produced in steps g6, g9, g14, and g15 constitute the transmission code 15a by combination with the transmitter ID code 16 shown in FIG. 14. The transmission circuit 11 transmits a carrier wave modulated by the transmission code 15a.

The configuration of the receiver 4 according to the second embodiment is analogous to that of the receiver 4 of the first embodiment shown in FIG. 6, and the configuration of the first memory location 37 of the memory 36 is the same as that shown in FIG. 7.

FIGS. 17-1 to 17-4 show the configuration of the second memory location 38 according to the second embodiment. Tables shown in FIGS. 17-1 to 17-4 are stored in Table 6 so as to correspond to the respective function selection codes.

TABLE 6

| FUNCTION SELECTION CODE | FIG. 17 |
| --- | --- |
| 00 | FIG. 17-1 |
| 01 | FIG. 17-2 |
| 10 | FIG. 17-3 |
| 11 | FIG. 17-4 |

In each of the tables corresponding to the respective function selection codes shown in FIGS. 17-1 to 17-4, functions 1 to 4 are allocated to the respective button codes 17a as shown in Table 7. In the present embodiment, panic operation information is assigned to the function "3" of each of the tables shown in FIGS. 17-1 to 17-3, as well as to the function "4" of the table shown in FIG. 17-4. During the period of the panic operation, the horn 8 is activated for only a preset period of time T23.

TABLE 7

| BUTTON CODES 17A | FUNCTIONS SHOWN IN FIGS. 17-1 TO 17-4 |
| --- | --- |
| 100 | 1 |
| 010 | 2 |
| 101 | 3 |
| 011 | 4 |

The processing circuit 23 of the second embodiment performs the overall processing operation shown in FIG. 9 and the operation for inputting a function selection code shown in FIG. 10 in the same manner as does the processing circuit 23 of the first embodiment.

Figure 18:
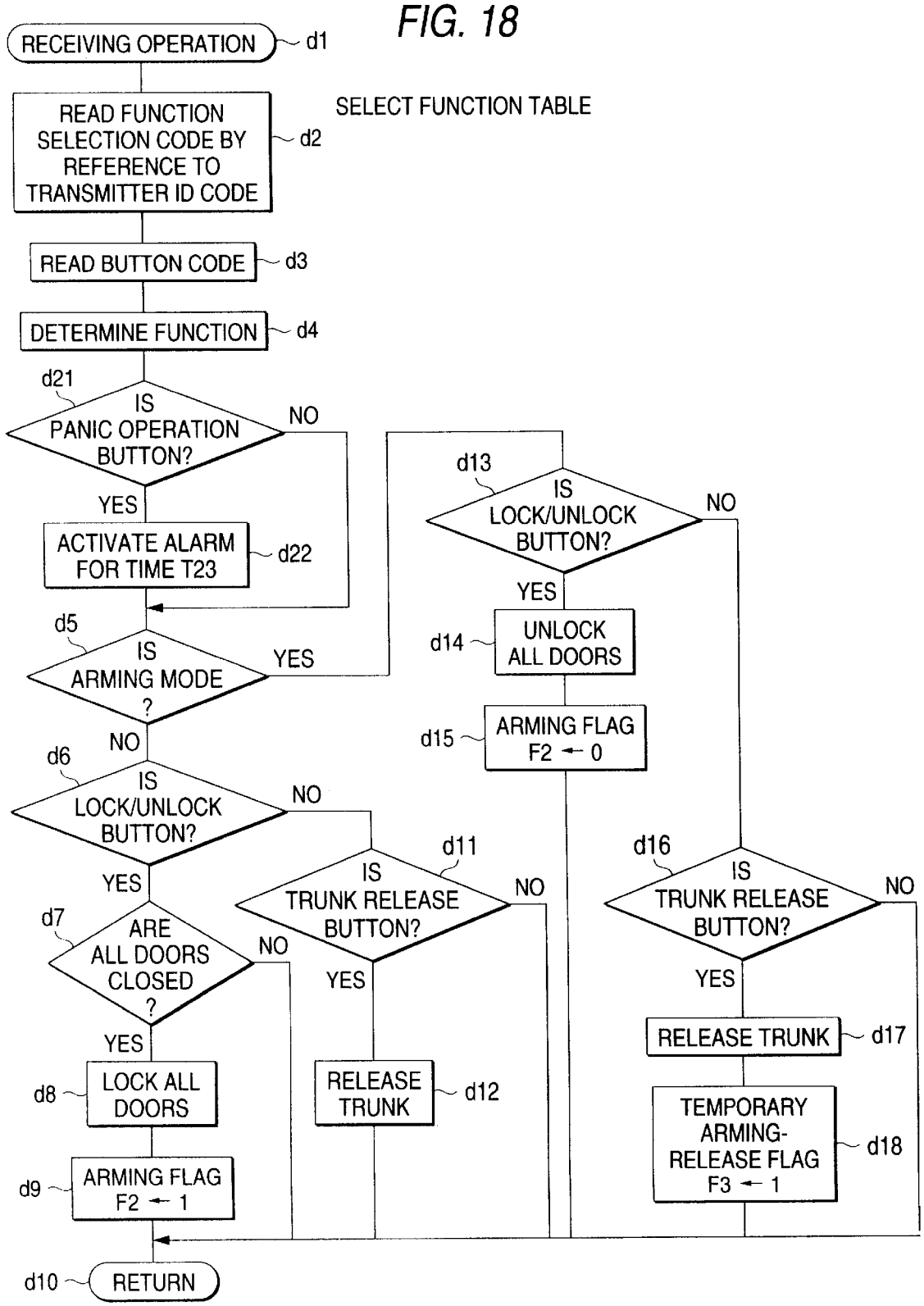
FIG. 18 is a flowchart for describing a receiving operation of a processing circuit 23 of the receiver 4 of the second embodiment.

FIG. 18 is a flowchart for describing the receiving operation of the processing circuit 23 of the receiver 4 according to the second embodiment. The processing operation shown in FIG. 18 corresponds to the processing operation shown in FIG. 11. Steps d1 to d18 shared between the flowcharts shown in FIGS. 11 and 18 are assigned the same reference numerals. It is to be noted that in the second embodiment steps d21 and d22 pertaining to a panic operation are newly added to the flowchart shown in FIG. 11. In step d4, a function selection code corresponding to the transmitter ID code 16 included in the transmission code 15 transmitted from the transmitter 1 is read from the first memory location 37. In a case where the function selection code assumes a value of "00," the table stored in the second memory location 38 shown in FIG. 17-1 is selected. The button code 17a included in the transmission code 15 transmitted from the transmitter 1 corresponds to a value of "010" shown Table 7. Hence, the button code 17a represents the function "3" of the function selection code "00" shown in FIG. 17-1. In step d21, a panic operation is read as operation information.

When the panic operation is read, in step d22 the horn 8 is activated continuously for only a preset period T23. Here, T23 may assume 60 seconds. For example, if a user (i.e., an operator) finds a burglar breaking into his vehicle, from a location spaced about 50 meters away from the vehicle the user presses the push button A of the transmitter 1 for more than two seconds. Thereupon, the transmitter 1 transmits the transmission code 15 including a value of "101" as the button code 17a, whereby the pack operation allocated to the function "3" of the function selection code "002 shown in FIG. 17-1 is performed, thereby preventing car theft.

In the second embodiment, the security operation shown in FIG. 12 and the temporary arming-release operation shown in FIG. 13 are performed simultaneously. In other respects, the configuration and operation of the receiver 4 of the second embodiment are the same as those of the receiver 4 of the first embodiment.

(Third Embodiment)

A third embodiment of the present invention will now be described by reference to FIG. 19. The configuration of a transmitter 1 of the third embodiment is analogous to the configuration of the transmitter 1 of the first embodiment shown in FIGS. 1 and 2. The transmission code 15a and the button code 17a are analogous in configuration to the transmission code 15a and the button code 17a of the second embodiment described in connection with FIGS. 14 and 15. In the third embodiment, the button code 17a to be included in the transmission code 15 transmitted from the transmitter 1 is produced in accordance with the number of times the push buttons A and B have been pressed; specifically, when the push button A has been pressed once within a predetermined period of time T31, when the push button A has been pressed twice or more within the predetermined period of time T31, when the push button B has been pressed once within a predetermined period of time T32, and when the push button B has been pressed twice or more within the predetermined period of time T32. Here, the number of times a push button has been pressed means the number of times a push button has been brought into an ON state (i.e., a depressed state) from an OFF state (i.e., a non-depressed state).

Figure 19:
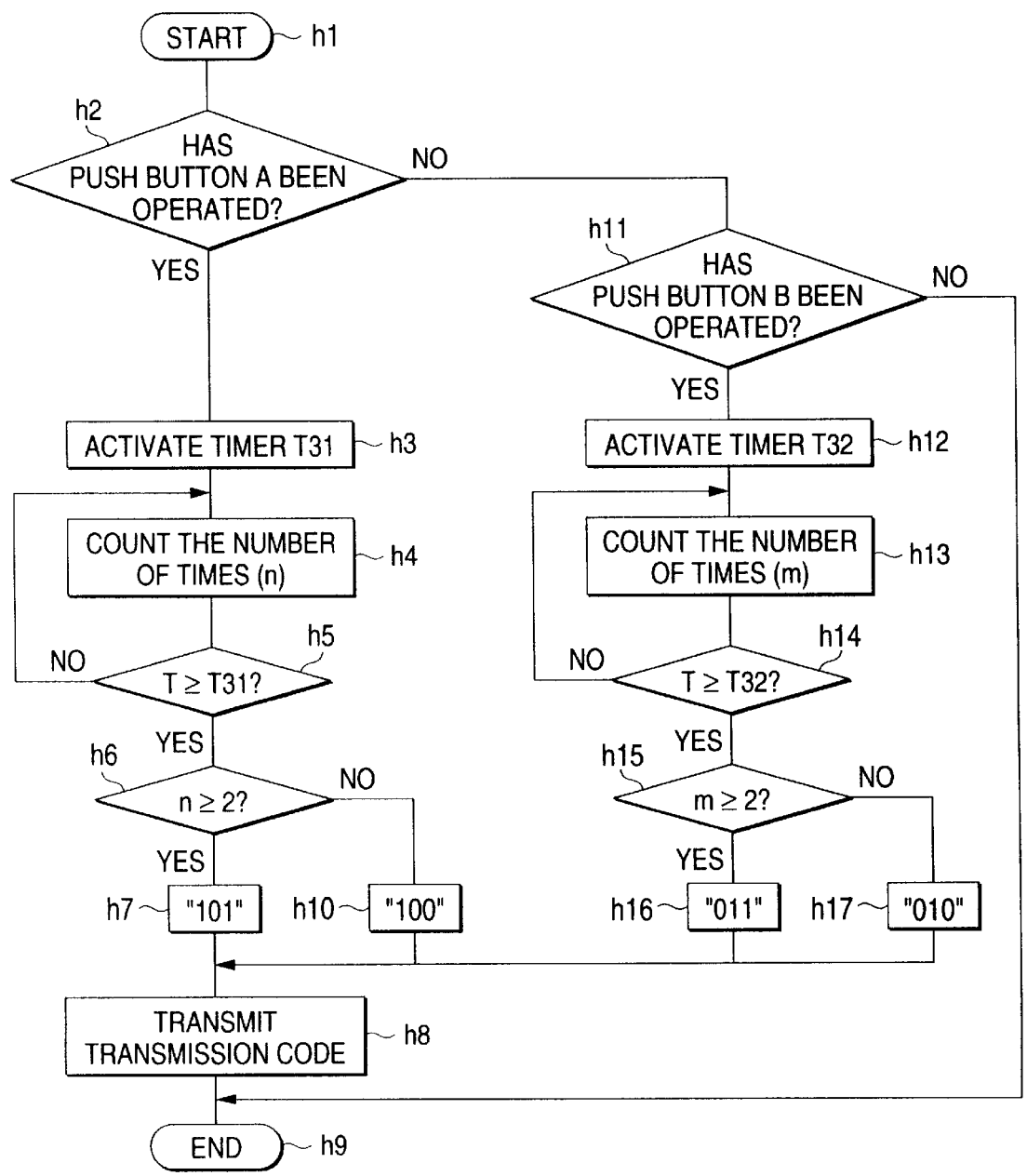
FIG. 19 is a flowchart for describing the operation of the processing circuit 9 of the transmitter 1 according to a third embodiment of the present invention.

FIG. 19 is a flowchart for describing the operation of the processing circuit 9 of the transmitter 1 of the third embodiment. Processing proceeds from step h1 to step h2, where a determination is made as to whether or not the push button A of the transmitter 1 has been pressed. If the push button A has been pressed, in step h3 a timer T31 starts performing a time-of-day counting operation. In step h4, the number of times (n) the push button A has been actuated is counted by the counter 47 (see FIG. 2). In step h5, a determination is made as to whether or not the time T counted by the timer T31 has exceeded a count period T31 (i.e., T≧T31). If the time T is less than the count period T31 (i.e., T<T31), there is performed processing relating to step h4. In this way, the number of times (n) the push button A has been actuated within the count period T31 is calculated.

In a case where in step h2 the push button A is determined to not have been actuated, processing proceeds to step h11, where a determination is made as to whether or not the push button B has been pressed. If the push button B has been pressed, in step h12 the timer T32 starts a time-of-day counting operation. In step h13, the number of times (m) the push button B has been pressed is counted by the counter 48 (see FIG. 2). In step h14, a determination is made as to whether or not the time T counted by the timer T32 exceeds a count period T32 (i.e., T≧T32). In this way, the number of times (m) the push button B has been pressed within the count time T32 is calculated in the same manner as in the case of counting of the number of times (n) the push button A is pressed. Here, for example, T31 and T32 may assume a value of two seconds.

In step h15, a determination is made as to whether or not the number of times (m) the push button B has been pressed within the count period T32, which is counted by the counter 48, exceeds 2. In a case where the number of times (m) the push button B has been pressed assumes a value of 2 or more (i.e., m≧2), in step h16 a value of "011" is produced as a button code 17a. In a case where the number of times (m) the push button B has been pressed is one, in step h13 a value of "010" is produced as a button code 17a.

The button codes 17a produced in steps h7, h10, h16, and h17 constitute a transmission code 15a by combination with the transmitter ID code 16. In step h8, the transmission circuit 11 modulates a carrier wave by use of the thus-obtained transmission code 15a and transmits the thus-modulated carrier wave. A round of processing operations is completed in step h9. In the third embodiment, the button code 17a included in the transmission code 15a transmitted from the transmitter 1 assumes configurations as shown in Table 8.

TABLE 8

| PUSH BUTTON | | BUTTON CODE 17a | | |
|---|---|---|---|---|
| | | THIRD BIT | SECOND BIT | FIRST BIT |
| A | B | 20a | 19a | 45 |
| ONCE | | 1 | 0 | 0 |
| | ONCE | 0 | 1 | 0 |
| TWICE OR MORE | | 1 | 0 | 1 |
| | TWICE OR MORE | 0 | 1 | 1 |

In the third embodiment and the fourth to sixth embodiments to be described later, the configuration and operation of the receiver 4 are the same as those of the receiver 4 of the second embodiment described in connection with FIGS. 6, 7, 9, 10, 12, 13, 17, and 18.

(Fourth Embodiment)

A fourth embodiment of the present invention will now be described by reference to FIGS. 20 to 22. The fourth embodiment is analogous to the previous embodiments, and the same reference numerals are assigned to corresponding elements. In the fourth embodiment, the button code 17a included in the transmission code 15a transmitted from the transmitter 1 is produced in accordance with combination of actuation of the push buttons A to C; namely, when only the push button A of the transmitter 1 has been actuated, when only the push button B has been actuated, when the push buttons A and B have been actuated simultaneously, and when the push buttons A and C have been actuated simultaneously.

Figure 20:
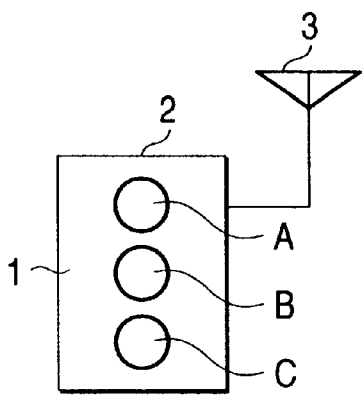
FIG. 20 is a schematic representation showing the transmitter 1 according to a fourth embodiment of the present invention.

FIG. 20 shows a transmitter 1 according to the fourth embodiment. Particularly, in the present embodiment, a housing 2 of the transmitter 1 is provided with a push button C analogous to the push buttons A and B, in addition to the push buttons A and B.

Figure 21:
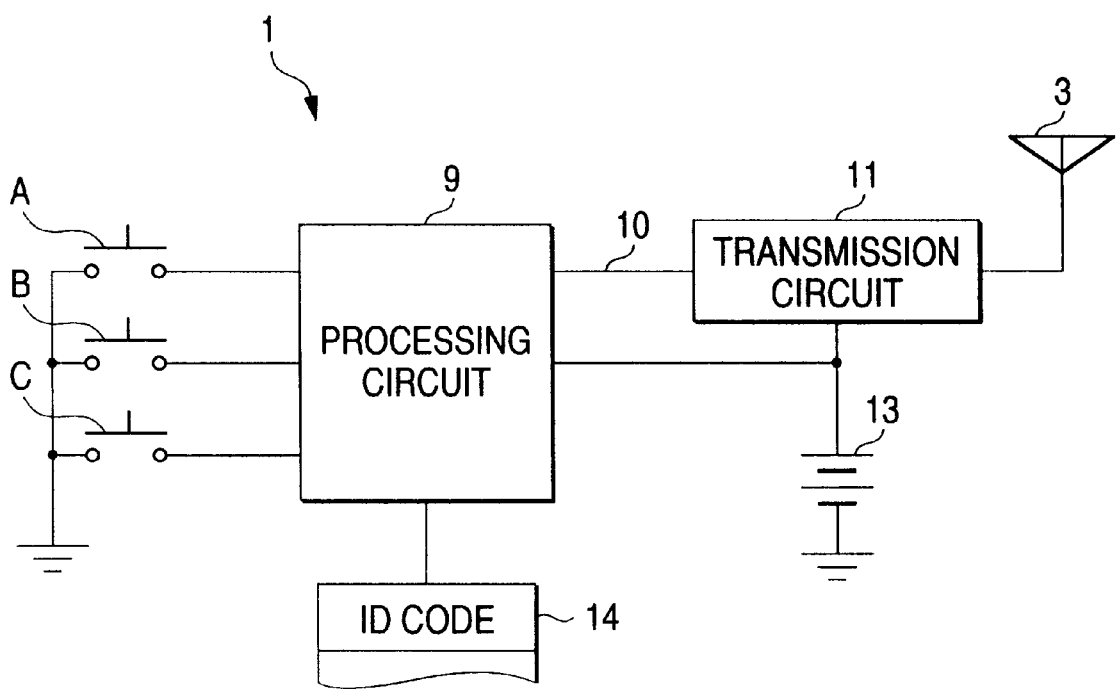
FIG. 21 is a block diagram showing the electrical configuration of the transmitter 1 of the fourth embodiment.

FIG. 21 is a block diagram showing the electrical configuration of the transmitter 1 of the present embodiment. Signals output from the push buttons A, B, and C are delivered to the processing circuit 9 connected to the memory 14. The transmission code 15a transmitted from the transmitter 1 is the same as that of the second embodiment shown in FIG. 14. As shown in FIG. 15, the button code 17a has the first bit 45, the second bit 19a, and the third bit 20a. In the present embodiment, the button codes 17a corresponding to various operation modes are produced in accordance with actuation of the push buttons A to C; namely, when only the push button A has been pressed, when only the push button B has been pressed, when the push buttons A and B have been pressed simultaneously, and when the push buttons A and C have been pressed simultaneously, as shown in Table 9.

TABLE 9

| PUSH BUTTON | | | BUTTON CODE 17a | | |
|---|---|---|---|---|---|
| | | | THIRD BIT | SECOND BIT | FIRST BIT |
| A | B | C | 20a | 19a | 45 |
| ON | OFF | OFF | 1 | 0 | 0 |
| OFF | ON | OFF | 0 | 1 | 0 |
| ON | ON | OFF | 1 | 1 | 0 |
| ON | OFF | ON | 1 | 0 | 1 |

Figure 22:
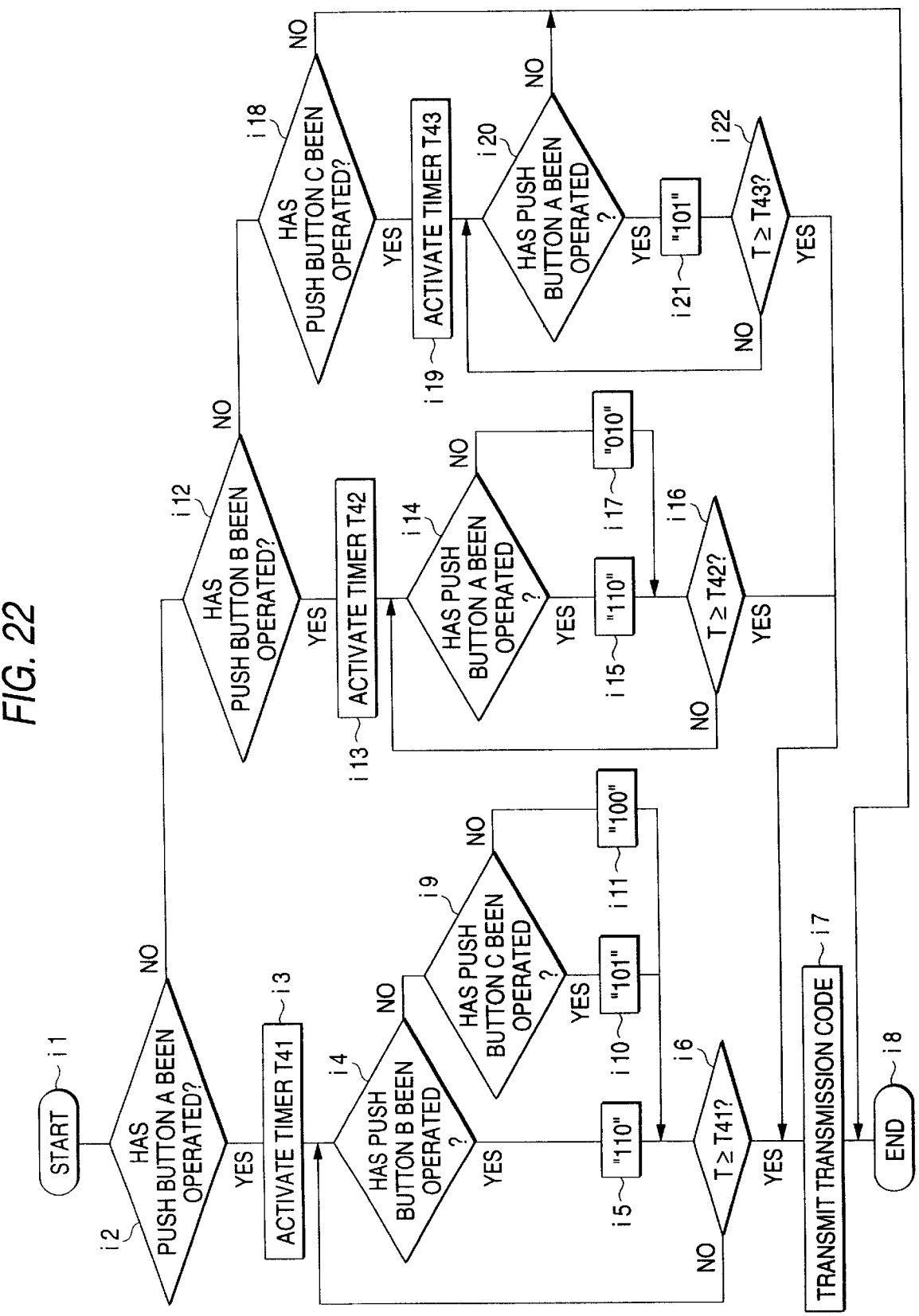
FIG. 22 is a flowchart for describing the operation of the processing circuit 9 of the transmitter 1 of the fourth embodiment.

FIG. 22 is a flowchart for describing the operation of the processing circuit 9 of the transmitter 1 according to the fourth embodiment. Processing proceeds from step i1 to step i2, where a determination is made as to whether or not the push button A has been pressed. If the push button A is determined to have been pressed, in step i3 a timer T41 starts a time-of-day counting operation. In step i4, a determination is made as to whether or not the push button B has been pressed. If the push button B is determined to have been pressed; that is, if the push buttons A and B are determined to have been pressed simultaneously, in step i5 a value of "110" is produced as the button code 17a. In contrast, if in step i4 the push button B is determined to not have been pressed, in step i9 a determination is made as to whether or not the push button C has been pressed. If the push button C is determined to have been pressed; that is, if the push buttons A and Care determined to have been pressed simultaneously, in step i10 a value of "101" is produced as the button code 17a.

In step i9 the push button C is determined to not have been pressed; that is, if only the push button A is determined to have been pressed, in step i11 a value of "100" is produced as the button code 17a.

In step i6, a determination is made as to whether or not the time T counted by the timer T41 remains within a count period T41 (i.e., T≧T41), thereby determining whether or not the push buttons A and B have been pressed simultaneously within the count period T41, whether or not the push buttons A and C have been pressed simultaneously within the count period T41, or whether or not only the push button C has been pressed. A button code 17a corresponding to the push button(s) determined to have been pressed is produced.

If in step i2 the push button A is determined to not have been pressed, processing proceeds to step i12, where a determination is made as to whether or not the push button B has been pressed. If the push button B is determined to have been pressed, in step i13 a timer T42 starts a time-of-day counting operation. In step i14 a determination is made as to whether or not the push button A has been pressed. If the push button A is determined to have been pressed; that is, if the push buttons A and B are determined to have been pressed simultaneously, in step i15 a value of "110" is produced as a button code 17a. If in step i14 the push button A is determined to not have been pressed; that is, only the push button B is determined to have been pressed, in step i17 a value of "010" is produced as a button code 17a. In step i16 a determination is made as to whether or not the time T counted by the timer T42 remains within a count period T42 (i.e., T≧T42). In this way, simultaneous pressing of the push buttons A and B or pressing of only the push button B performed within the count period T42 is detected, and a button code 17a corresponding to the push button B (or the push buttons A and B) is produced.

If in step i2 and i12 the push buttons A and B are determined to not have been pressed, in step i18 a determination is made as to whether or not the push button C has been pressed. If the push button C is determined to have been pressed, in step i19 a timer T43 starts a time-of-day counting operation. In step i20 a determination is made as to whether or not the push button A has been pressed. If the push button A is determined to have been pressed; that is, if the push buttons A and B are determined to have been pressed simultaneously, in step i21 a value of "101" is produced as a button code 17a. In step i22 a determination is made as to whether or not the time T counted by the timer T43 remains within a count period T43 (i.e., T≧T43), Ghus detecting simultaneous pressing of the push buttons A and C performed within the count period T43. As mentioned above, there is produced a button code 17a which assumes a value of "101" and corresponds to the push buttons A and C having been pressed simultaneously.

In step i7, the button code 17a produced in step i5, i10, i11, i15, i17, or i21 constitute a transmission code 15a by combination with the transmitter ID code 16. The transmission circuit 11 modulates a carrier wave by use of the thus-obtained transmission code 15a and transmits the thus-modulated carrier weave. In step i8, a round of processing operations is completed. For example, each of the count periods T41, T42, and T43 may assume a length of two seconds. In the fourth embodiment, the configuration and operation of the receiver 4 are the same as those of the receiver 4 of the second embodiment described in connection with FIGS. 6, 7, 9, 10, 12, 13, and 17.

(Fifth Embodiment)

A fifth embodiment of the present invention will now be described by reference to FIG. 23. A transmitter 1 employed in the fifth embodiment is analogous to that employed in the second embodiment. The operation and configuration of the transmitter 1 are analogous to those of the transmitter 1 described in connection with FIGS. 1, 2, 14, and 15. In the fifth embodiment, the transmitter 1 is provided with a plurality of push buttons; for example, push buttons A and B. In the fifth embodiment, the button code 17a included in the transmission code 15a transmitted from the transmitter 1 is produced so as to correspond to one of four combinations of actuation of the push buttons A and B; namely, when only the push button A of the transmitter 1 has been actuated, when only the push button B has been actuated, when the push buttons A and B have been actuated simultaneously for less than two seconds, and when the push buttons A and B have been actuated simultaneously for more than two seconds, as shown in Table 10.

TABLE 10

| PUSH BUTTON | | BUTTON CODE 17a | | |
|---|---|---|---|---|
| | | THIRD BIT | SECOND BIT | FIRST BIT |
| A | B | 20a | 19a | 45 |
| ON | OFF | 1 | 0 | 0 |
| OFF | ON | 0 | 1 | 0 |
| ON LESS THAN 2 SEC. | ON | 1 | 1 | 0 |
| ON MORE THAN 2 SEC. | ON | 1 | 1 | 1 |

Figure 23:
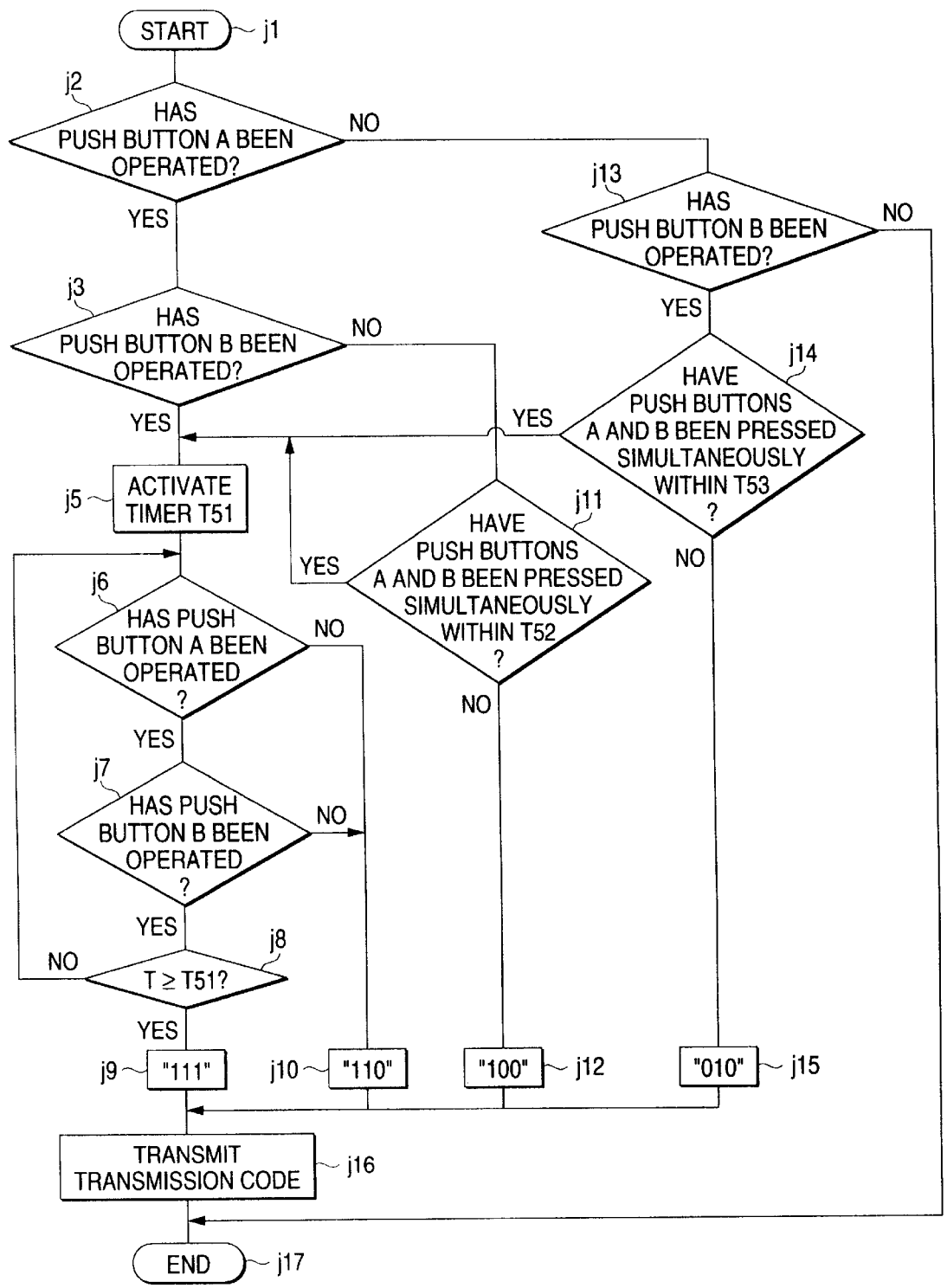
FIG. 23 is a flowchart for describing the operation of the processing circuit 9 of the transmitter 1 according to a fifth embodiment of the present invention.

FIG. 23 is a flowchart for describing the operation of the processing circuit 9 of the transmitter 1 according to the fifth embodiment. Processing proceeds from step j1 to step j2, where a determination is made as to whether or not the push button A has been pressed. If the push button A is determined to have been pressed, processing proceeds to step j3, where a determination is made as to whether or not the push button B has been pressed. If the push button B is determined to have been pressed, in step j5 a timer T51 starts a time-of-day counting operation. If in step j6 it is determined that the push button A is still being pressed and in step j7 it is determined that the push button B is still being pressed, in step j8 a determination is made as to whether or not the time T counted by the timer T51 has exceeded a count period T51 (i.e., T≧T51). If instep j8 the time T is determined to have exceeded the count period T51; that is, the time during which the push buttons A and B have been pressed simultaneously has exceeded the count period T51, in step j9 a value of "111" is produced as a button code 17a. If in step j6 it is determined that the push button A is not being pressed and in step j7 it is determined that the push button B is not being pressed; that is, if the push buttons A and B have been pressed simultaneously for a period of time shorter than the count period T51 (T<T51), processing proceeds to step j10, where a value of "110" is produced as the button code 17a.

If in step j2 the push button A is determined to have been pressed and in step j3 the push button B is determined to not have been pressed, processing proceeds to step j11, where a determination is made as to whether or not the push buttons A and B have been pressed simultaneously within a count period T52 predetermined by a timer T52 (i.e., T<T52). If the push buttons A and B are determined to have been pressed simultaneously, processing proceeds to step j5. In contrast, if the push buttons A and B are determined to not have been pressed simultaneously, processing proceeds from step j11 to step j12, where a value of "100" is produced as a button code 17a corresponding to actuation of only the push button A. For example, each of the count periods T51 and T52 may assume a length of two seconds.

If in step j2 the push button A is determined to not have been pressed and in step j13 the push button B is determined to have been pressed, in step j14 a determination is made as to whether or not the push buttons A and B have been pressed simultaneously within a count period T55 of a timer T53 (i.e., T<T53). If in step g14 the push buttons A and B are determined to have been pressed simultaneously, processing proceeds to step j5. In contrast, if in step j14 the push buttons A and B are determined not to have been pressed simultaneously, in step j15 a value of "010" is produced as a button code 17a corresponding to actuation of only the push button B.

In step j16, the button codes 17a produced in step j9, j10, j12, or j15 constitute a transmission code 15a by combination with the transmitter ID code 16. The transmission circuit 11 transmits the thus-modulated carrier wave, thereby completing a round of processing operations.

The receiver 4 of the fifth embodiment achieves the same configuration and operation as those of the receiver 4 of the second embodiment described previously. In the fifth embodiment, as shown in Table 11, in lieu of Table 7, functions "1" to "4" are allocated to the button codes 17a in each of the cables correlated with the respective function selection codes 00, 01, 10, and 11.

TABLE 11

| BUTTON CODE 17a | | | FUNCTION SHOWN |
|---|---|---|---|
| THIRD BIT 20a | SECOND BIT 19a | FIRST BIT 45 | IN FIGS. 17-1 TO 17-4 |
| 1 | 0 | 0 | 1 |
| 0 | 1 | 0 | 2 |
| 1 | 1 | 0 | 3 |
| 1 | 1 | 1 | 4 |

As mentioned previously, the receiver 4 of the fifth embodiment achieves the same configuration and operation as those of the receiver 4 of the second embodiment shown in FIGS. 6, 7, 9, 10, 12, 13, 17, and 18.

(Sixth Embodiment)

A sixth embodiment of the present invention will now be described by reference to FIG. 24. The sixth embodiment is analogous to the second embodiment. Particularly, in the present embodiment, the transmitter 1 is provided with a plurality of buttons; for example, two push buttons A and B. There are four combinations of operations of the push buttons A and B; that is, pressing of only the push button A, pressing of only the push button B, simultaneous and single actuation of the push buttons A and B, and simultaneous actuation of the push buttons A and B two or more times within a preset time T61. A button code 17a corresponding to the respective combination of actuation is produced.

The configuration and operation of a transmitter 1 of the sixth embodiment is analogous to the configuration and operation of the transmitter 1 described in connection with FIGS. 1, 2, 14, and 15. The transmitter 1 produces button codes 17a, as shown in Table 12.

TABLE 12

| PUSH BUTTON | | BUTTON CODE 17a | | |
|---|---|---|---|---|
| A | B | THIRD BIT 20a | SECOND BIT 19a | FIRST BIT 45 |
| ON | OFF | 1 | 0 | 0 |
| OFF | ON | 0 | 1 | 0 |
| ON ONE TIME | ON | 1 | 1 | 0 |
| ON TWO TIMES OR MORE | ON | 1 | 1 | 1 |

Figure 24:
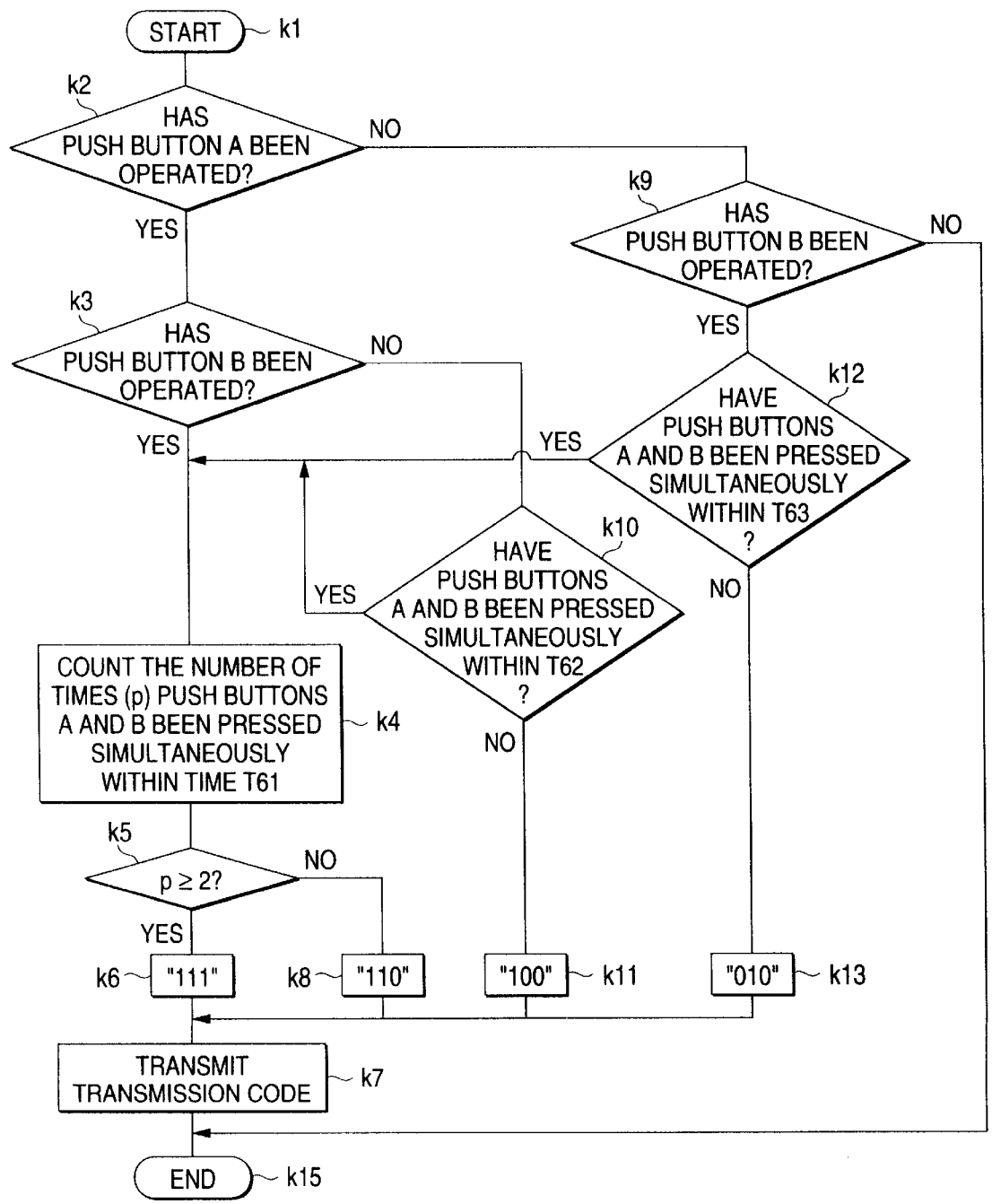
FIG. 24 is a flowchart for describing the operation of the processing circuit 9 of the transmitter 1 according to a sixth embodiment of the present invention.

FIG. 24 is a flowchart for describing the operation of the processing circuit 9 of the transmitter 1 according to the sixth embodiment. Processing proceeds from k1 to k2, where a determination is made as to whether or not the push button A has been pressed. If the push button A is determined to have been pressed, in step k3 a determination is made as to whether or not the push button B has been pressed. If the push buttons A and B are determined to have been pressed, in step k4 a counter 51 (see FIG. 2) counts the number of times (p) the push buttons A and B have been pressed simultaneously within a count period T61 predetermined by a timer T61 (T<T61).

Processing proceeds to step k5, where a determination is made as to whether or not the number of times (p) the push buttons A and B have been pressed simultaneously assumes a value of 2 or more (i.e., P≧2). If the push buttons A and B have been pressed simultaneously twice or more, in step k6 a value of "111" is produced as a button code 17a. In contrast, if the number of times (p) assumes a value of 1, a value of "110" is produced as a button code 17a in step k8.

In a case where in step k2 the push button A is determined to have been pressed and in step k3 the push button B is determined to not have been pressed, in step k10 a determination is made as to whether or not the push buttons A and B have been pressed simultaneously within a count period T62 of a timer T62 (i.e., T<T62). If the push buttons A and B are determined to have been pressed simultaneously, processing proceeds to step k4. In contrast, if in step k10 the push buttons A and B are determined to not have been pressed simultaneously; that is, only the push button A has been pressed, in step k11 a value of "100" is produced as a button code 17a.

If in step k2 the push button A is determined to not have been pressed, in step k9 a determination is made as to whether or not the push button B has been pressed. In a case where in step k9 the push button B is determined to have been pressed, in step k12 a determination is made as to whether or not the push buttons A and B have been pressed simultaneously within a count period T63 of a timer T63 (T<T63). If in step k12 the push buttons A and B are determined to have been pressed simultaneously, processing proceeds to step k4. If in step k12 the push buttons A and B are determined to not have been pressed simultaneously; i.e., only the push button B has been pressed, in step k13 a value of "010" is produced as a button code 17a. For example, each of the count periods T61, T62, and T63 may assume a length of two seconds.

In step k7, the button codes 17a produced in steps k6, k8, k11, or k13 constitutes a transmission code 15a by combination with the transmitter ID code 16. The transmission circuit 11 transmits an electronic wave signal in the same manner as in the case of the previous embodiments. In step k15, a round of processing operations is completed.

The receiver 4 of the sixth embodiment achieves the same configuration and operation as those of the receiver 4 of the second embodiment shown in FIGS. 6, 7, 9, 10, 12, 13, 17, and 18. Table 11 employed in the fifth embodiment is used in lieu of Table 7.

(Seventh Embodiment)

A seventh embodiment of the present invention will now be described by reference to FIGS. 25 through 27. The present embodiment is analogous to the first embodiment, and like reference numerals are assigned to corresponding elements.

Figure 25:
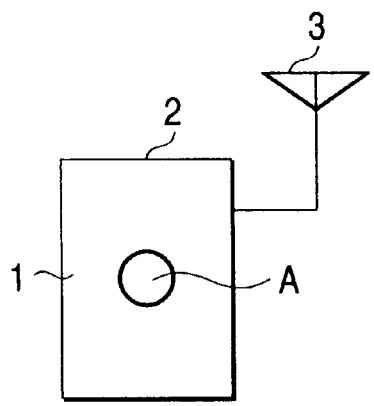
FIG. 25 is a schematic representation showing the transmitter 1 according to a seventh embodiment of the present invention.

FIG. 25 is a schematic representation showing a transmitter 1 of the seventh embodiment. It is to be noted that the housing 2 of the transmitter 1 is provided with a single push button A. In other respects, the transmitter 1 is analogous in configuration to that employed in the first embodiment.

Figure 26:
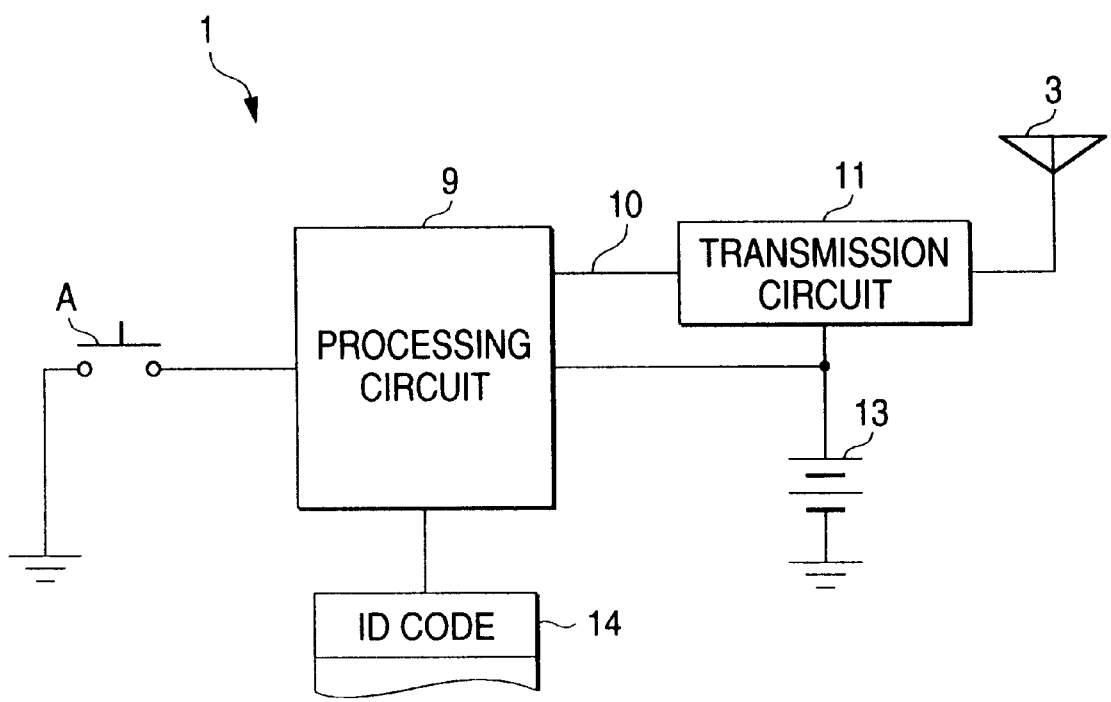
FIG. 26 is a block diagram showing the electrical configuration of the transmitter 1 according to the seventh embodiment shown in FIG. 25.

FIG. 26 is a block diagram showing the electrical configuration of the transmitter 1 of the seventh embodiment shown in FIG. 25. A signal output from the push button A is delivered to the processing circuit 9 which is embodied by a microcomputer of the transmitter 1. In other respects, the transmitter 1 is identical in configuration with the transmitter 1 of the first embodiment. As shown in FIG. 3, the transmission code 15 transmitted by the transmitter 1 includes the transmitter ID code 16 and the button code 17. As mentioned in connection with FIG. 4, the button code 17 consists of two bits 19 and 20. The first bit 19 of the button code 17 assumes a logic value of "1" when the time T during which the push button A has been pressed exceeds a preset time T71 (i.e., $T \geq T71$). Further, the second bit 20 assumes a logic value of "1" when the push button A is pressed.

In the seventh embodiment, as shown in Table 13, the button code 17 is determined according to whether the time T during which the push button A has been pressed is shorter than the preset time T71 (i.e., $T<T71$) or exceeds the preset time T71 ($T \geq T71$).

TABLE 13

| DURATION OF PRESSING PUSH | BUTTON CODE 17a | |
|---|---|---|
| BUTTON A | SECOND BIT 20 | FIRST BIT 19 |
| LESS THAN 2 SEC. | 1 | 0 |
| 2 SEC. OR MORE | 1 | 1 |

Figure 27:
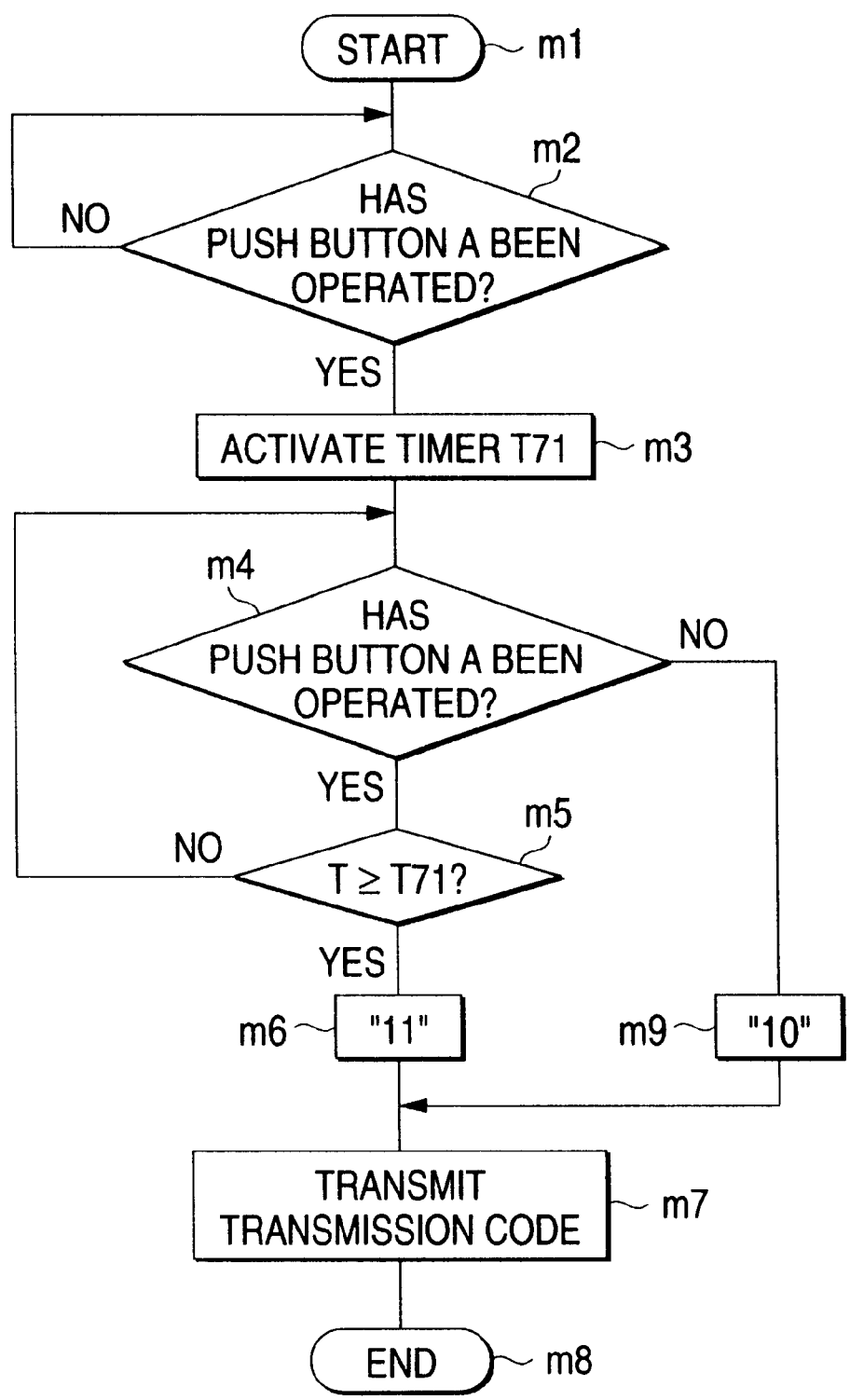
FIG. 27 is a flowchart for describing the operation of the processing circuit 9 of the transmitter 1 of the seventh embodiment shown in FIGS. 25 and 26.

FIG. 27 is a flowchart for describing the operation of the processing circuit 9 of the transmitter 1 according to the seventh embodiment shown in FIGS. 25 and 26. Processing proceeds from step m1 to step m2, where a determination is made as to whether or not the push button A has been pressed. If in stem m2 it is determined that the push button A has been pressed, processing proceeds to step m3, where a timer T71 starts a time-of-day counting operation. In step m4, a determination is made as to whether or not the push button A is still being pressed. If a determination is made that the push button A is still being pressed, in step m5 a determination is made as to whether or not the time T counted by the timer T71 has exceeded a count period T71 (i.e., $T \geq T71$). When the count period T71 has elapsed, processing proceeds from step m5 to step m6. A value of "11" is produced as a button code 17 corresponding to the push button A having been pressed for the count period T71 or longer.

If the time T counted by the timer T71 is shorter than the count period T71 (i.e., $T<T71$) and the push button A is released from a pressed state, processing proceeds from step m4 to m9. A value of "10" is produced as a button code 17 corresponding to the push button A having been pressed for a time shorter than the count period T71. In step m7, the transmission code 15 comprising the button code 17 produced in step m6 or m9 and the transmitter ID code 16 is delivered to the transmission circuit 11, from which an electromagnetic wave signal is transmitted. In step m8, a round of processing operations is completed. Here, the count period T71 may assume a length of, for example, two seconds.

The receiver 4 of the seventh embodiment is analogous to that of the first embodiment described in connection with FIGS. 6 through 13. In the seventh embodiment, as shown in Table 14, in lieu of Table 3 employed in the first embodiment, the functions "1" and "2" shown in FIGS. 8-1 to 8-4 are allocated to the respective button codes 17 beforehand.

TABLE 14

| BUTTON CODE 17 | FUNCTIONS SHOWN IN FIGS. 8-1 TO 8-4 |
|---|---|
| 10 | 1 |
| 11 | 2 |

(Eighth Embodiment)

An eighth embodiment of the present invention will now be described by reference to FIG. 28. The transmitter 1 of the present embodiment is analogous in configuration to that of the first embodiment described in connection with FIGS. 1 and 2. As shown in Table 15, particularly, in the eighth embodiment a button code 17 is produced so as to correspond to one of two combinations of actuation of the push button A; namely, when the push button A is pressed once within a preset count period T81, and when the push button A is pressed two times or more intermittently within the preset count period T81. The first bit 19 of the button code 17 assumes a logic value of "1" when the push button A is pressed two times or more within the predetermined count period T81, and the second bit 20 assumes a logic value of "1" when the push button A is pressed.

TABLE 15

| NUMBER OF TIMES PUSH | BUTTON CODE 17 | |
|---|---|---|
| BUTTON A IS PRESSED | SECOND BIT 20 | FIRST BIT 19 |
| ONE TIME | 1 | 0 |
| TWO TIMES OR MORE | 1 | 1 |

The transmitter 1 of the eighth embodiment is identical in configuration and operation with that of the first embodiment shown in FIGS. 4 and 5, as well as with that of the seventh embodiment shown in FIG. 26.

Figure 28:
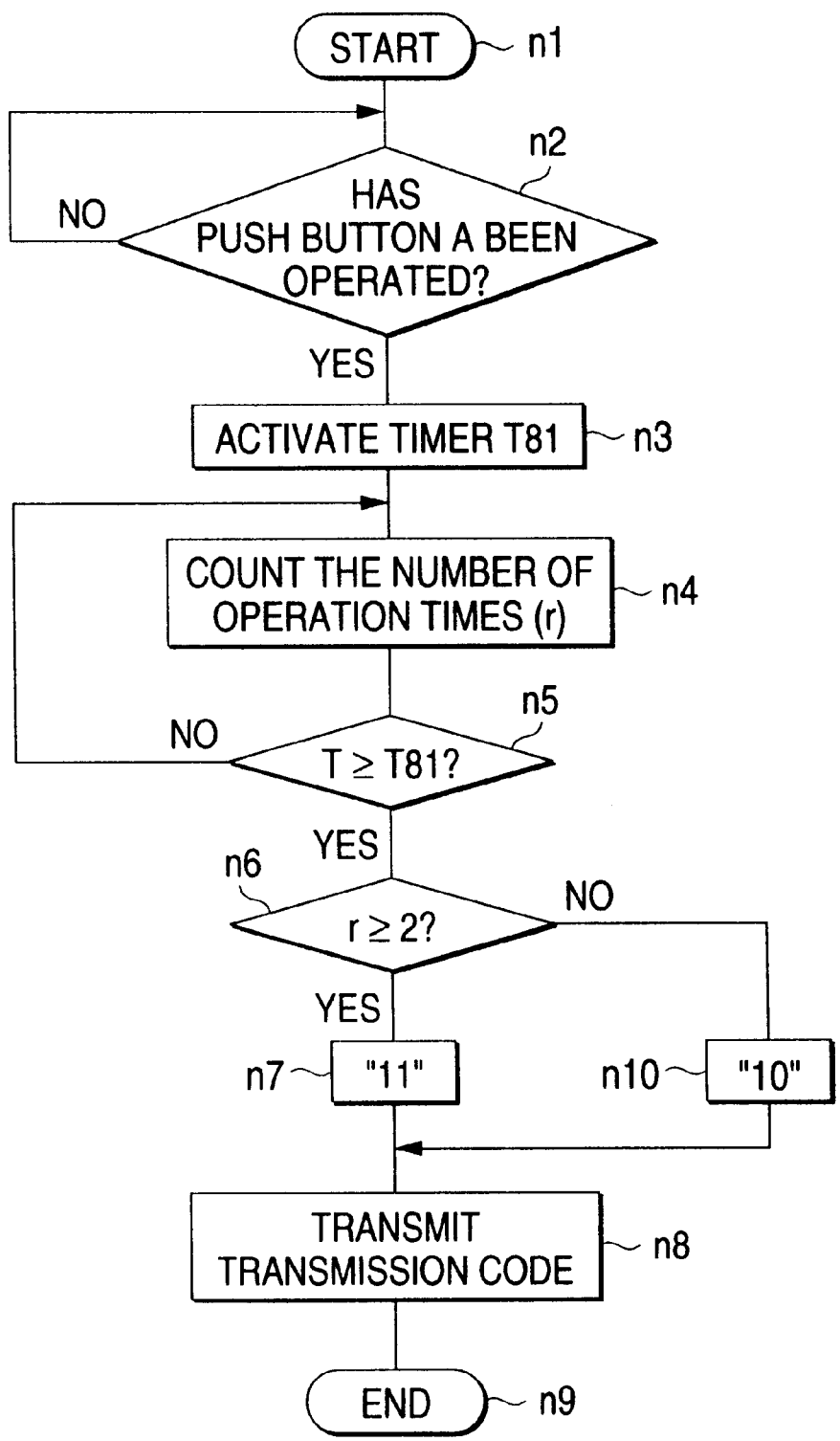
FIG. 28 is a flowchart for describing the operation of the processing circuit 9 of the transmitter 1 according to an eighth embodiment of the present invention.

FIG. 28 is a flowchart for describing the operation of the processing circuit 9 of the transmitter 1 according to the eight embodiment. Processing proceeds from step n1 to step n2, where a determination is made as to whether or not the push button A has been pressed. If the push button A is determined to have been pressed, in step n3 a timer T81 starts a time-of-day counting operation. In step n4, the number of times (r) the push button A has been pressed is counted by a counter 53 (see FIG. 2). Processing proceeds to step n5, where a determination is made as to whether or not the time T counted by the timer T81 has exceeded the count period T81 (i.e., T≧T81). If in step n5 the time T is determined to have exceeded the count period T81, processing proceeds to step n6, where a determination is made as to whether or not the number of times (r) the push button A has been pressed, as counted by the counter 53, is twice or more. If the number of times (r) is determined to be twice or more, in step n7 a value of "11" is produced as a button code 17. If the number of times (r) is determined to be one, processing proceeds to step n10, where a value of "10" is produced as a button code 17.

In step n8, there is produced a transmission code 15 from the button code 17 produced in step n7 or n10 in conjunction with the transmitter ID code 16, and the thus-produced transmission code 15 is transmitted from the transmitter circuit 11. In step n9 a round of processing operations is completed. The receiver 4 of the present embodiment is the same as that employed in the seventh embodiment and is identical in operation and configuration with that of the first embodiment described in connection with FIGS. 6 through 13. Table 14, in lieu of Table 3 employed in the first embodiment, is used in the present embodiment.

In the first through eighth embodiments, when the button A or the buttons A and B provided in the transmitter 1 are pressed, a button code 17 or 17a corresponding to the pressed push button A and/or B is produced. Further, the button code 17 or 17a is produced so as to correspond to one of the combinations of actuation of the push bush A and/or B; for example, the period of time during which the push button A and/or B is pressed continuously, and the number of times the push button A and/or B is pressed within a predetermined period of time. The transmitter 1 transmits a transmission code 15 or 15a including such a button code 17 or 17a. The receiver 4 reads a function selection code corresponding to the transmitter ID code 16 from the first memory location 37. On the basis of the thus-read function selection code, the operation information which is allocated to the button code 17 or 17a and is stored in the second memory location 38 is determined.

In ninth through fifteenth embodiments, which will be described later, the transmitter 1 has a more simplified configuration. In the ninth, tenth, thirteenth, and fourteenth embodiments, the transmission code 15 is transmitted continuously over the period of time during which the push button A and/or B of the transmitter 1 is actuated. In the eleventh through thirteenth embodiments and the fifteenth embodiment, the transmission code 15 is transmitted every time the push button A and/or B is actuated. In the ninth, tenth, thirteenth, and fourteenth embodiments, the receiver 4 determines operation information corresponding to the duration of the received transmission code 15. In the eleventh through thirteenth embodiments and the fifteenth embodiment, the receiver 4 determines operation information corresponding to the number of times the transmission code 15 is received within a predetermined period of time. In the tenth and twelfth embodiments, the transmitter 1 produces a button code 17 or 17a in response to actuation of only the push button A or B, and the receiver 4 determines operation information so as to correspond to the button code 17 or 17a.

(Ninth Embodiment)

A ninth embodiment of the present invention will now be described by reference to FIGS. 29, 30, and 31. The ninth embodiment is analogous to the previous embodiments, and like reference numerals are assigned to corresponding elements. The transmitter 1 of the ninth embodiment is analogous in configuration to that of the first embodiment described in connection with FIGS. 1 through 5.

Figures 1, 29:
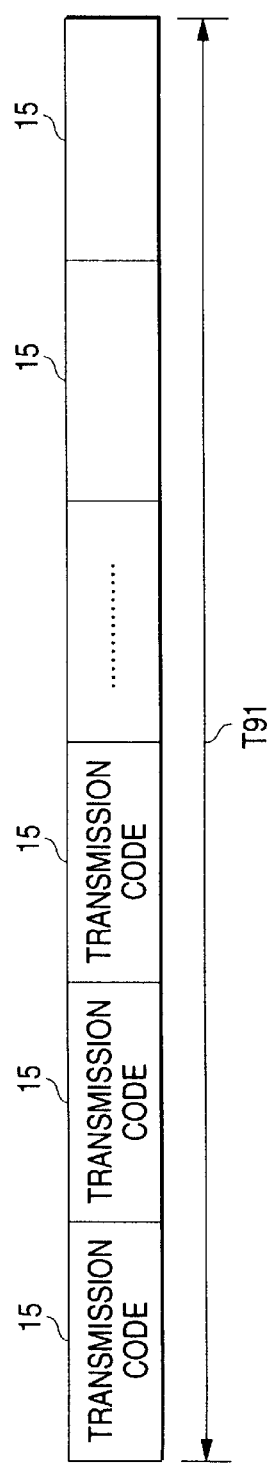
Figures 2, 29:
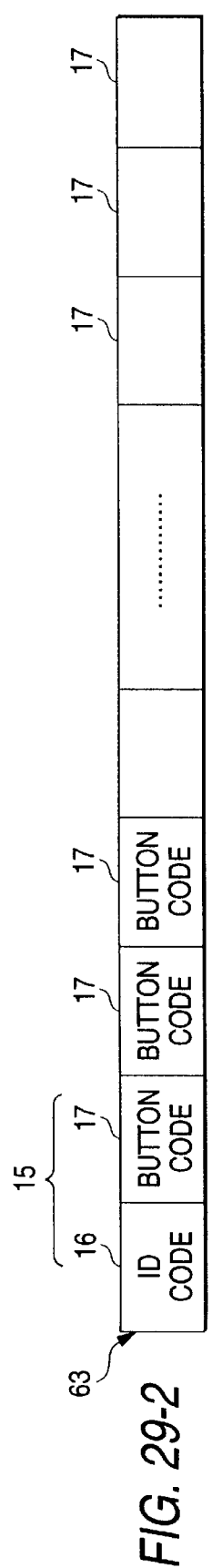
Figures 3, 29:
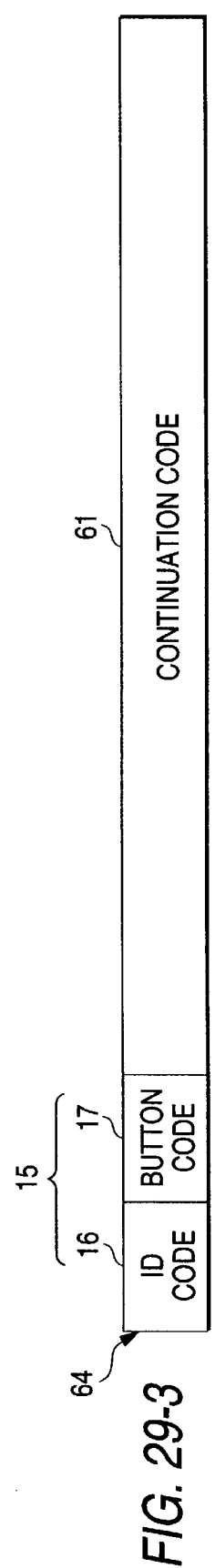

FIGS. 29-1 to 29-3 show the structure of the transmission code 15 transmitted from the transmitter 1 of the present embodiment. The processing circuit 9 of the transmitter 1 iteratively and continuously produces the transmission code 15 over a duration T91 during which the push button A or B is pressed, as shown in FIG. 29-1. The thus-produced transmission codes 15 are transmitted from the transmission circuit 11. Each of the transmission codes 15 comprises a transmitter ID code 16 unique to the transmitter 1 and a button code 17 and has a configuration such as that shown in FIG. 3. As shown in Table 16, the button code 17 is formed in response to the push button A or B which has been pressed. The first bit 19 of the button code 17 assumes a logic value of "1" when the push button B is pressed, and the second bit 20 assumes a logic value of "1" when the push button A is pressed.

TABLE 16

| PUSH BUTTON | | BUTTON CODE 17 | |
|---|---|---|---|
| A | B | SECOND BIT 20 | FIRST BIT 19 |
| ON | OFF | 1 | 0 |
| OFF | ON | 0 | 1 |

A single transmission code 15 may assume a length of 20 μsec, and the duration T91 during which the user actuates the push button A or B may assume a length of 0.1 to 3 seconds. In the present embodiment, in step a4 shown in FIG. 5 the processing circuit 9 iteratively and continuously delivers, to the transmission circuit 11, the transmission code 15 including the button code 17 corresponding to the pressed push button A or B over the duration T91. In another embodiment, as shown in FIG. 29-2, the transmitter 1 may be arranged such that the processing circuit 9 of the transmitter 1 transmits the transmitter ID code 16 once in response to actuation of the push button A or B and such that a button code 17 corresponding to the pressed push button A or B is iteratively and continuously produced until the push button A or B is released from a pressed state. In still another embodiment, as shown in FIG. 29-3, the transmitter 1 may be arranged such that the transmitter 9 transmits the transmitter ID code 16, the button code 17, and a continuation code 61 in response to actuation of the push button A or B and such that the continuation code 61 is iteratively and continuously transmitted until the push button A or B is released from a pressed stake. As shown in FIGS. 29-1 and 29-2, in the present embodiment, the transmission code 15 is iteratively and continuously transmitted over the period of time during which the push button A or B is actuated. In FIG. 29-2, reference numeral 63 denotes a transmission code 15 which is to be transmitted iteratively and continuously over the period of time during which the push button A or B is being pressed. In FIG. 29-3, reference numeral 64 denotes the transmission code 15.

The receiver 4 of the ninth embodiment is analogous in configuration to that of the second embodiment shown in FIGS. 6, 7, 9, 10, and 17.

Figure 30:
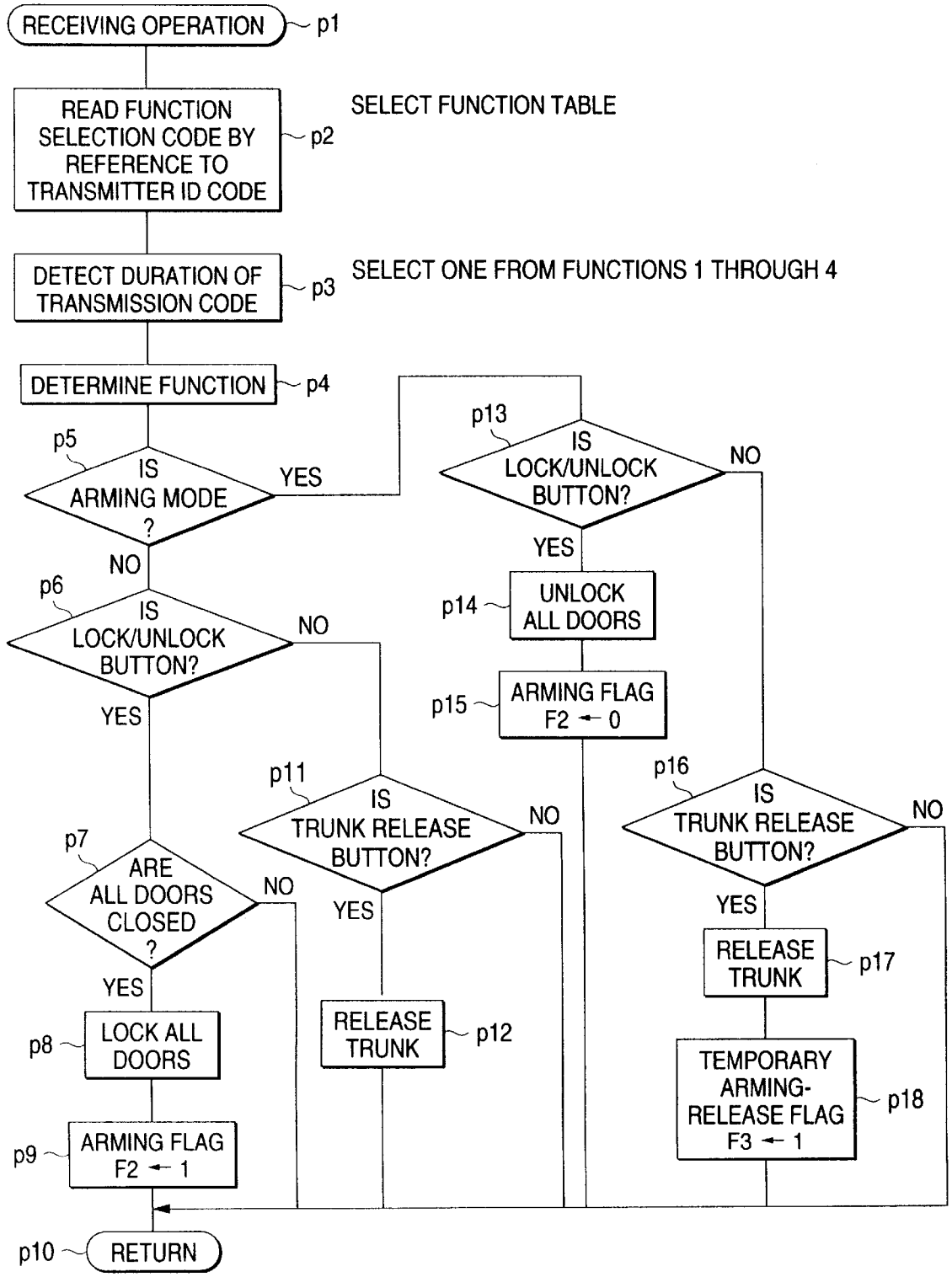
FIG. 30 is a flowchart for describing the operation of the processing circuit 23 of the receiver 4 of the ninth embodiment.

FIG. 30 is a flowchart for describing the operation of a processing circuit 23 of the receiver 4 according to the ninth embodiment. In the ninth embodiment, the processing circuit 23 performs processing operations pertaining to steps p1, p2, and p4 through p18 corresponding to steps d1, d2, and d4 through d18 shown in FIG. 11. It is to be noted that in step p3 the button code 17 included in the received transmission code 15 is read and the duration T91 during which the transmission code 15 is transmitted continuously is measured and detected. In accordance with the thus-read button code 17 and the thus-detected duration T91, a plurality of types of functions "1" to "4" (for example, four types) assigned to the function selection code read in step p2 are selected. Processing proceeds to step p4, where one of the functions "1" to "4" is determined. In other respects, the receiver 4 is identical in configuration and operation with that described in the previous embodiments.

TABLE 17

| BUTTON CODE 17 | DURATION T91 | FUNCTION |
|---|---|---|
| 10 | LESS THAN 2 SEC. | 1 |
| 01 |  | 2 |
| 10 | 2 SEC. OR MORE | 3 |
| 01 |  | 4 |

Figure 31:
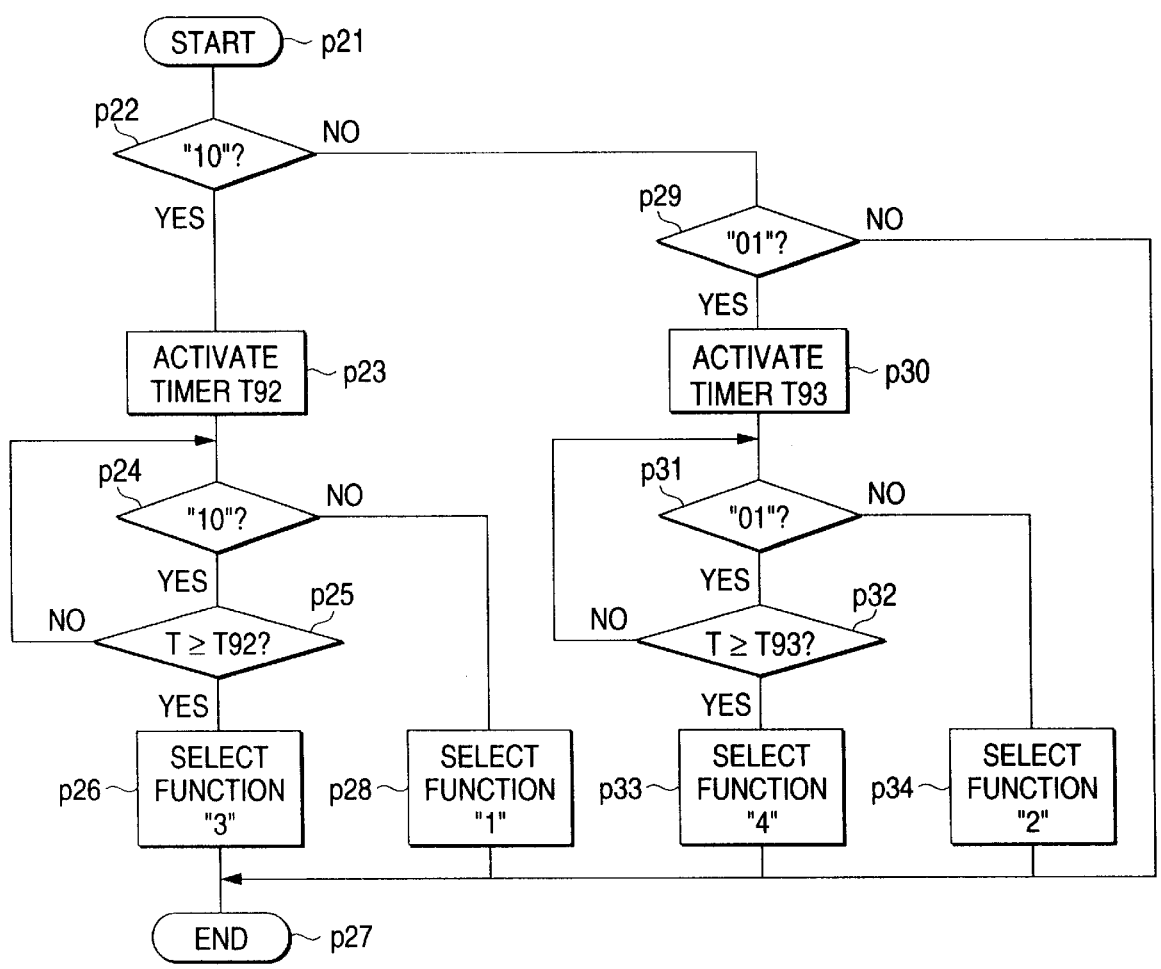
FIG. 31 is a flowchart showing in more detail processing pertaining to step p3 shown in FIG. 30.

FIG. 31 is a flowchart showing in more detail processing pertaining to step p3 shown in FIG. 30. Processing proceeds from step p21 to step p22, where a determination is made as to whether or not the button code 17 corresponding to actuation of the push button A of the transmitter 1 assumes a value of "10." If the button code 17 does assume a value of "10," in step p23 a timer T92 starts a time-of-day counting operation. In step p24, a determination is made as to whether or not the button code 17 still assumes a value of "10"; that is, whether or not the push button A is still being pressed. If the push button A is still been pressed, processing proceeds to step p25, where a determination is made as to whether or not the time T counted by the timer T92 has exceeded a predetermined count period T92 (i.e., $T \geq T92$). If it is determined that the duration T91 during which the button code 17 of value "10" corresponding to actuation of the push button A is received continuously exceeds the count period T92, processing proceeds to step p26, where function "3" is selected and determined. The duration T91 is compared with the count period T92, and if it is determined that the count period T92 is shorter than the duration T91 (i.e., T91<T92), processing proceeds from step p24 to step p28, where function "1" is determined.

If the button code 17 which is received by the receiver 4 as a result of actuation of the push button B of the transmitter 1 assumes a value of "01," processing proceeds from step p22 to step p30 by way of step 29. In step p30, a timer T93 starts a time-of-day counting operation. In step p31, a determination is made as to whether or not the push button B is still being pressed and the button code 17 still assumes a value of "01." If the push button B is still being pressed, processing proceeds to step p32, where a determination is made as to whether or not the time T counted by the timer T93 has exceeded a count period T93 (i.e., $T \geq T93$). If the duration T91 during which the push button B is pressed has exceeded the count period T93, processing proceeds to step p33, where function "4" is determined. In contrast, if the duration T91 of pressing the push button B is shorter than the count period T93, processing proceeds to step p34, where function "2" is determined. Each of the count periods T92 and T93 may assume a length of, for example, two seconds.

Even in the ninth embodiment, the security operation described in connection with FIG. 12 and the temporary arming-release operation described in connection with FIG. 13 are performed in the same manner as described previously.

(Tenth Embodiment)

A tenth embodiment of the present invention will now be described by reference to FIGS. 32 and 33. The tenth embodiment is analogous to the previous embodiments, and like reference numerals are assigned to corresponding elements. The transmitter 1 of the present embodiment is analogous in configuration to that of the ninth embodiment and is identical in configuration with that of the first embodiment described by reference to FIGS. 1 through 4. Particularly, in the tenth embodiment, the transmitter 1 determines a total of three combinations of actuation of the push buttons A and B; that is, pressing of only the push button A, pressing of only the push button B, and simultaneous pressing of the push buttons A and B. The processing circuit 9 of the transmitter 1 produces a button code 17, as shown in Table 18. The transmission code 15, which is iteratively and continuously produced over the period of time during which the push button A and/or B is pressed, is produced and transmitted, as shown in FIG. 29.

TABLE 18

| PUSH BUTTON | | BUTTON CODE 17 | |
|---|---|---|---|
| A | B | SECOND BIT 20 | FIRST BIT 19 |
| ON | OFF | 1 | 0 |
| OFF | ON | 0 | 1 |
| ON | ON | 1 | 1 |

Figure 32:
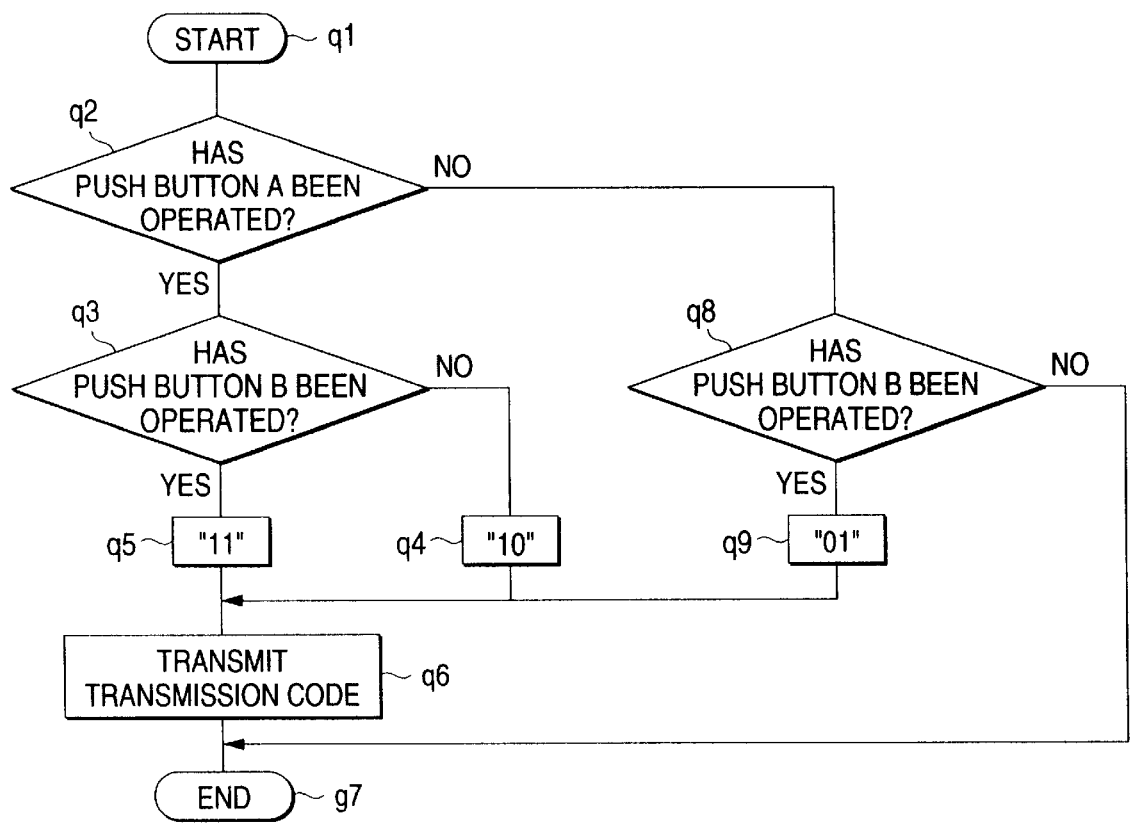
FIG. 32 is a flowchart for describing the operation of the processing circuit 9 of the transmitter 1 according to a tenth embodiment of the present invention.

FIG. 32 is a flowchart for describing the operation of the processing circuit 9 of the transmitter 1 according to the tenth embodiment. Processing proceeds from step q1 to q2, where a determination is made as to whether or not the push button A has been pressed. If the push button A has been pressed, processing proceeds to step q3, where a determination is made as to whether or not the push button B has been pressed. When it is determined that both buttons A and B have been pressed, in step q5 a value of "11" is produced as a button code 17. In contrast, if it is determined that only the push button A has been pressed, processing proceeds from step q3 to q4, where a value of "01" is produced as a button code 17.

If in step q2 a determination is made that the push button A has not been pressed and in step q8 a determination is made that the push button B has been pressed, in step q9 a value of "01" is produced as a button code 17. In step q6, the processing circuit 9 delivers, to the transmission circuit 11, the transmission code 15 including the button code 17 produced in any one of steps q4, q5, q9 and the transmitter ID code 16. Transmission of the transmission code 15 is continuous over the period of time during which the push button A and/or B is pressed, as in the case of the ninth embodiment described in connection with FIG. 29.

The transmitter 1 of the tenth embodiment is analogous to that of the ninth embodiment. Particularly, in the present embodiment, a function is further determined in accordance with the duration T91 during which the push buttons A and B are pressed simultaneously. The receiver 4 of the tenth embodiment is analogous to that of the ninth embodiment and has the same configuration and operation as those of the receiver 4 shown in FIGS. 6, 7, 9, 10, and 17.

Figure 33:
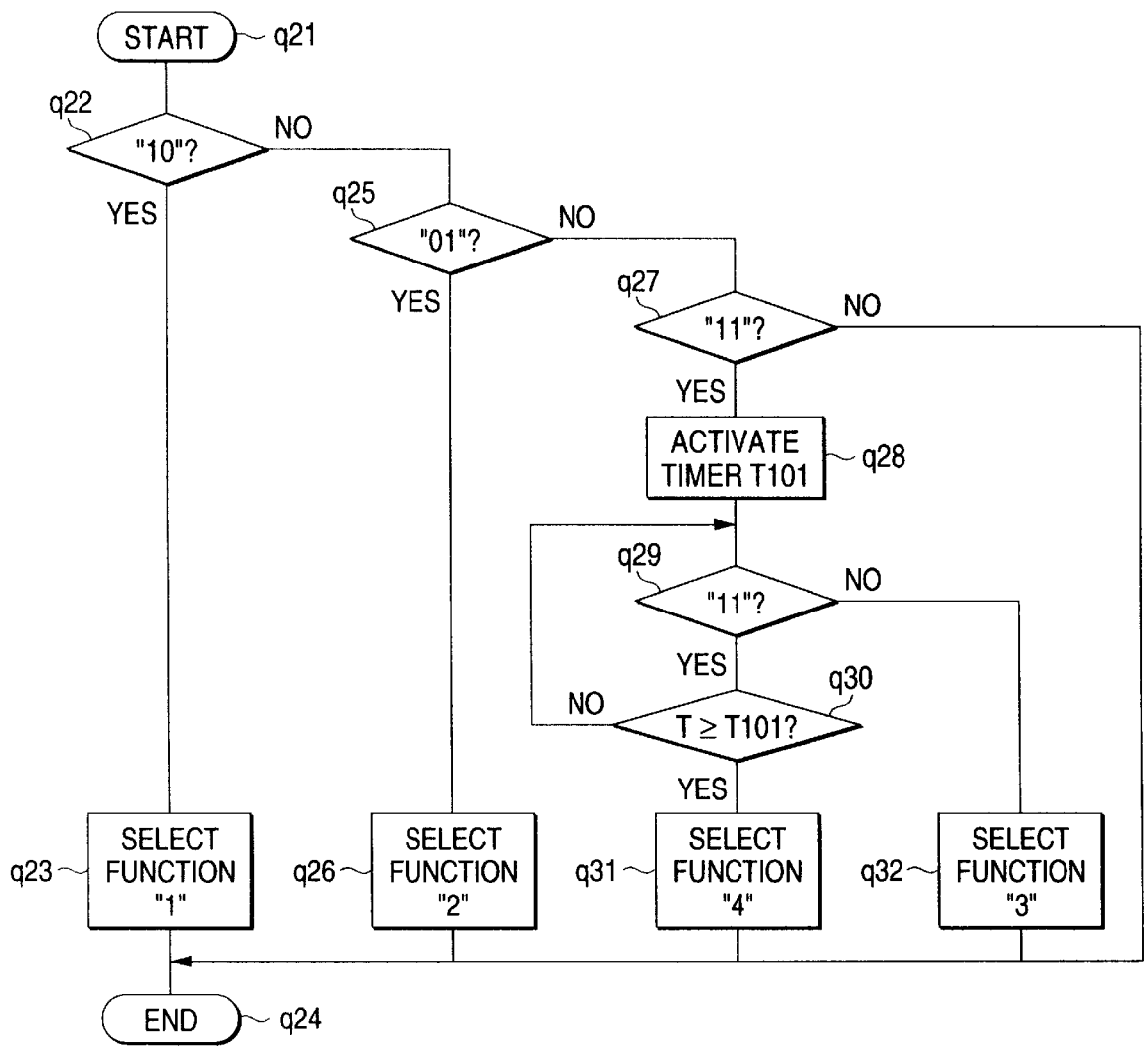
FIG. 33 is a flowchart for describing the operation of the processing circuit 23 of the receiver 4 of the tenth embodiment.

Particularly, in the tenth embodiment, in step p3 shown in FIG. 30, the processing circuit 23 performs processing operations shown in FIG. 33. As shown in Table 19, there are determined a button code 17 and one of functions "1" through "4" corresponding to the duration T91 during which the push buttons A and B are pressed simultaneously.

TABLE 19

| BUTTON CODE 17 | DURATION OF PRESSING PUSH BUTTONS A AND B | FUNCTION |
| --- | --- | --- |
| 10 | | 1 |
| 01 | | 2 |
| 11 | LESS THAN 2 SEC. | 3 |
| 11 | 2 SEC. OR MORE | 4 |

FIG. 33 is a flowchart for describing the operation of the processing circuit 23 of the receiver 4 of the tenth embodiment. The processing operations shown in FIG. 33 are to be processed in step p3 shown in FIG. 30. Processing proceeds from step q21 to q22, where a determination is made as to whether or not the received button code 17 assumes a value of "10"; i.e., whether or not the push button A has been actuated. If the button code does not assume a value of "10," processing proceeds to step q23, where function "1" is selected and determined.

In a case where the push button A has not been pressed, processing proceeds from step q22 to q25. The push button B is pressed, and it is determined that a value of "01" has been received as the button code 17, function "2" is determined in step q26.

In a case where in step q22 it is determined that the push button A alone remains non-pressed and in step q25 it is determined that the pus button B alone remains non-pressed, in step q27 a determination is made as to whether or not a value of "11" is received as the button code 17, corresponding to simultaneous pressing of the push buttons A and B. If a value of "11" is received as the button code 17, in step q28 a timer T101 performs a time-of-day counting operation. If in step q29 a determination is made that the push buttons A and B are still being pressed simultaneously and that a value of "11" is received as the button code 17, in step q30 a determination is made as to whether or not the time T counted by the timer T101 has exceeded a count period T101 (T≧T101). If in step q30 it is determined that the time T of the timer T101 corresponding to the duration T91 during which the push buttons A and B are pressed simultaneously has exceeded the count period T101, function "4" is selected in step q31. If the duration T91 is shorter than the count period T101, processing proceeds from step q29 to step q32, where function "3" is determined. The receiver 4 of the present embodiment has the same configuration and operation as those described in connection with FIGS. 12 and 13. In other respects, the receiver 4 is analogous in configuration and operation to that of the ninth embodiment.

(Eleventh Embodiment)

An eleventh embodiment of the present invention will now be described by reference to FIGS. 34 through 36. The eleventh embodiment is analogous to the previous embodiments, and like reference numerals are assigned to corresponding elements. The configuration of the transmitter 1 of the eleventh embodiment is analogous co that of the transmitter 1 of the first embodiment described in connection with FIGS. 1 through 4. The button code 17 consisting of two bits is produced, as shown in Table 16. The transmission circuit 11 transmits a transmission code 15 including the button code 17 and the transmitter ID code 16. In the present embodiment, without regard to the time during which the push button A or B is pressed, the transmission code 15 is transmitted once or a predetermined number of times each time the push button A or B is pressed. Alternatively, the transmission code 15 is transmitted continuously during a certain period of operation time.

Figure 34:
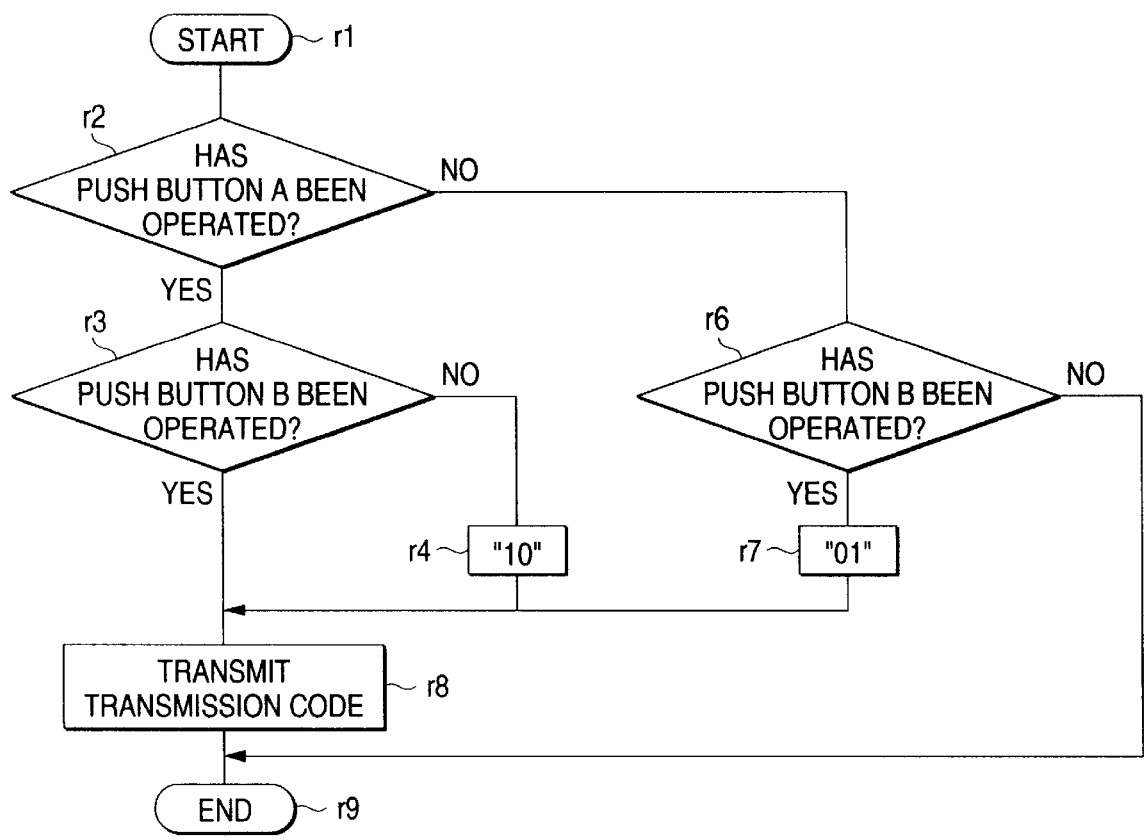
FIG. 34 is a flowchart for describing the operation of the processing circuit 9 of the transmitter 1 of the tenth embodiment.

FIG. 34 is a flowchart for describing the operation of the processing circuit 9 of the transmitter 1 of the present embodiment. Processing proceeds from step r1 to r2, where a determination is made as to whether or not the push button A is being pressed. If the push button A is being pressed, processing proceeds to step r3, where a determination is made as to whether or not the push button B is being pressed. When it is determined that only the push button A is being pressed, in step r4 a value of "10" is produced as a button code 17.

In contrast, when it is determined that only the push button B is being pressed and the push button A is not being pressed, processing proceeds to r7 by way of steps r2 and r6. In step r7, a value of "01" is produced as a button code 17 corresponding to pressing of only the push button B. In step r8, a transmission code 15 including the button code 17 produced in step r4 or r7 and the transmitter ID code 16 are produced each time the push button A or B is pressed, and the transmission code 15 is transmitted from the transmitter 1.

The configuration of the receiver 4 of the present embodiment is analogous to that of the receiver 4 of the ninth embodiment described in connection with FIGS. 6, 7, 9, 10, and 17. The same applies to the receiver 4 employed in the twelfth and thirteenth embodiments, which will be described later.

Figure 35:
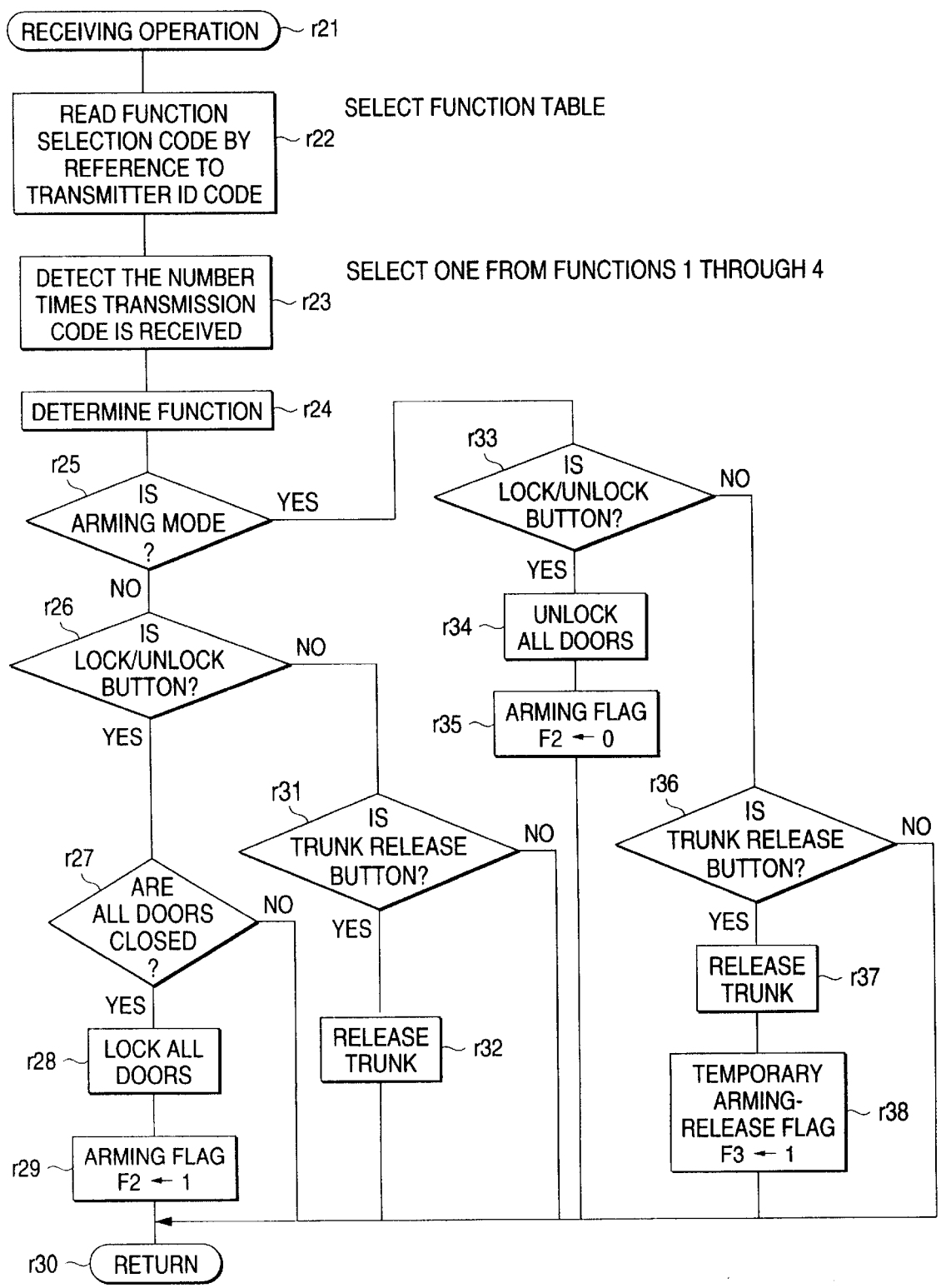
FIG. 35 is a flowchart for describing a receiving operation of the processing circuit 23 of the receiver 4 of the eleventh embodiment.

FIG. 35 is a flowchart for describing a receiving operation of the processing circuit 23 of the receiver 4 of the present embodiment. The processing operations shown in FIG. 35 are analogous to those shown in FIG. 20, and steps r21, r22, and r24 through r38 shown in FIG. 35 correspond to steps p1, p2, and p4 through p18, respectively. It is to be noted that in step r23 the processing circuit 23 counts the number of times the transmission code 15 transmitted from the transmitter 1 is received within predetermined periods of time T111 and T112. The duration from receipt of a transmission code 15 until the transmission code 15 is interrupted is counted as a single receiving operation. As shown in Table 20, one of functions "1" through "4" of the function selection codes is selected on the basis of the type of the received button code 17 and the number of times the transmission code 15 is received. In step r24, the thus-selected function is determined. In a case where a value of "10" is transmitted as the button code 1 as a result of actuation of the push button A of the transmitter 1 and where the number of times the push button A is pressed within a predetermined period of time is one, function "1" is selected. If the number of times the push button A is pressed assumes two or more, function "3" is selected. In a case where the push button B has been pressed and the number of times the push button B is pressed within the predetermined period of time is one, function "2" is selected. If the number of times the push button B is pressed is two or more, function "4" is selected.

TABLE 20

| BUTTON CODE 17 | NUMBER OF TIMES PUSH BUTTON IS PRESSED | FUNCTION |
| --- | --- | --- |
| 10 | ONE TIME | 1 |
| 01 | ONE TIME | 2 |
| 10 | TWO TIMES OR MORE | 3 |
| 01 | TWO TIMES OR MORE | 4 |

Figure 36:
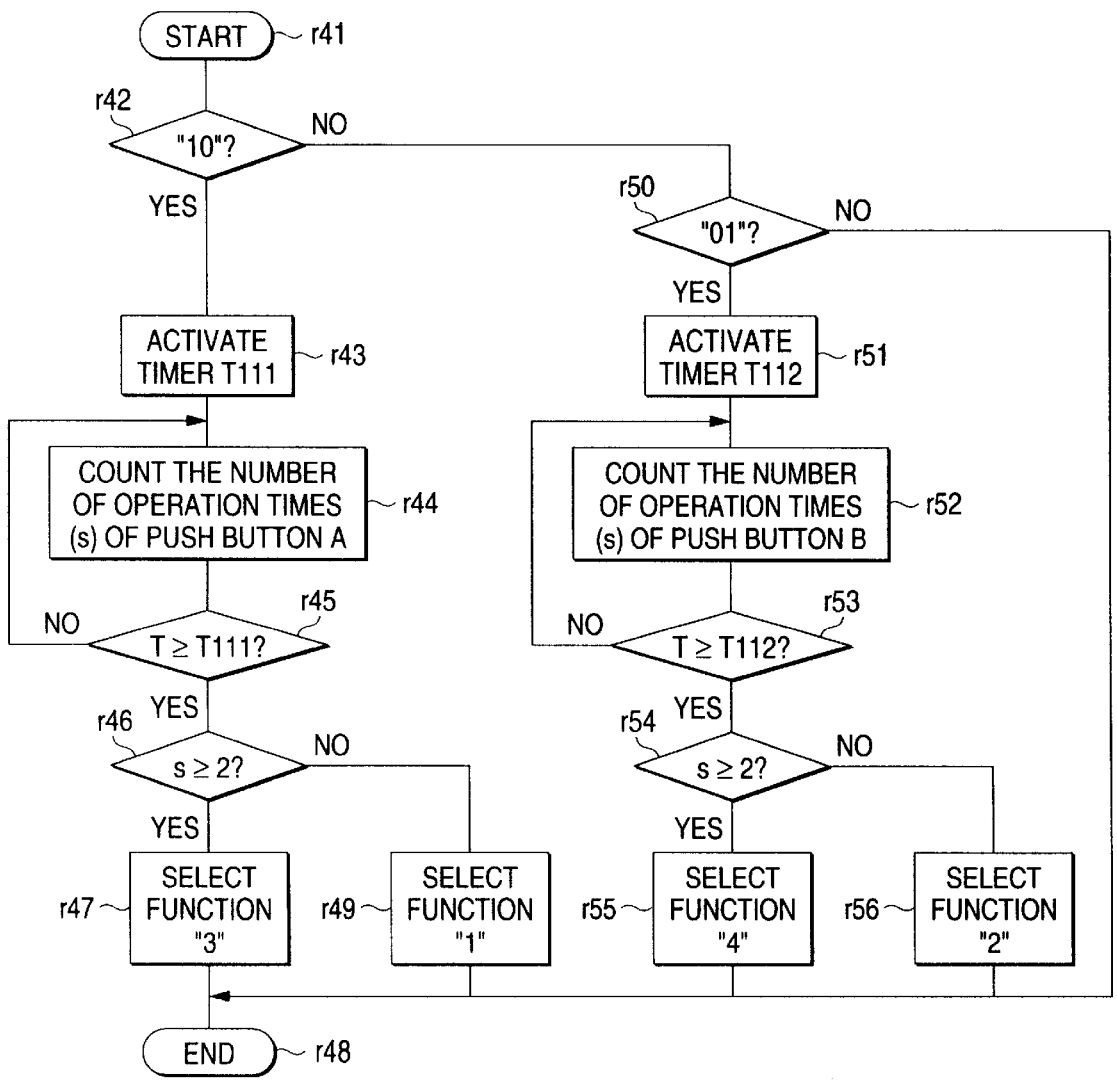
FIG. 36 is a flowchart for describing the operation of the processing circuit 23 of the receiver 4 of the eleventh embodiment performed in step r23 shown in FIG. 35.

FIG. 36 is a flowchart for describing in more detail the processing of the processing circuit 23 of the receiver 4 of the present embodiment in step r23 shown in FIG. 35. Processing proceeds from step r41 to step r42, where a determination is made as to whether or not a value of "10"

has been received as a button code 17 corresponding to actuation of the push button A of the transmitter 1. If the push button code 17 does assume a value of "10," in step r43 the timer T111 starts a time-of-day counting operation. In step r44, a counter 55 (see FIG. 6) counts the number of times (s) (hereinafter also referred to as a "count value (s)") the button code 17 of value "10" is intermittently received in response to actuation of the push button A. In step r45, a determination is made as to whether or not the time T counted by timer T111 has exceeded the count period T111 (i.e., whether or not T≧T111). After lapse of the count period T111, in step r46 a determination is made as to whether or not the count value (s) assumes two or more. If the count value (s) assumes two or more, in step r47 function "3" is selected and determined. If the count value (s) assumes one, in step r49 function "1" corresponding to a single operation of the push button A is selected and determined.

If the push button B of the transmitter 1 has been pressed, processing proceeds from step r42 to step r50. In step r51, a timer T112 starts a time-of-day counting operation. In step r52, the number of times (s) the transmission code 15 is received in response to intermittent actuation of the push button B is counted. If in step r53 it is determined that the time T counted by the timer T112 has exceeded a count period T112 (i.e., T≧T112), in step r54 a determination is made as to whether or not the count value (s) counted in step r52 assumes two or more. In a case where the push button B has been pressed two times or more within the count period T112, processing proceeds from step r54 to step r55, where function "4" is selected. In a case where the push button B has been pressed once, processing proceeds from step r54 to step r56, where function "2" is selected and determined.

(Twelfth Embodiment)

A twelfth embodiment of the present invention will now be described with reference to FIG. 37. The transmitter 1 of the present embodiment is analogous in configuration to that of the eleventh embodiment. In the present embodiment, the transmitter 1 of the present embodiment has the same configuration and operation as those shown in FIGS. 1 through 4 and FIG. 32. Particularly, in the present embodiment, a value of "10" is produced as a button code 17 as a result of pressing of only the push button A of the transmitter 1, and a value of "01" is produced as a button code 17 as a result of pressing of only the push button B. Further, as a result of simultaneous pressing of the push buttons A and B, a value of "11" is produced as a button code 17, as shown in Table 18 of the ninth embodiment The transmission code 15 is iteratively and continuously transmitted in any one of a total of three combinations of actuation of the push buttons A and B; that is, when the push buttons A and B are pressed simultaneously only once, as in the case of the eleventh embodiment, when the push buttons A and B are simultaneously pressed a predetermined number of times, and when the push buttons A and B are pressed iteratively and continuously over a period of operation time. The processing circuit 9 of the transmitter 1 may perform the same processing operations as those performed in the tenth embodiment as described by reference to FIG. 32.

The configuration of the receiver 4 of the present embodiment is analogous to that of the receiver 4 of the first embodiment shown in FIGS. 6, 7, 10, 12, and 13, that of the receiver 4 of the second embodiment shown in FIG. 17, and that of the receiver 4 of the eleventh embodiment shown in FIG. 35. Particularly, in the present embodiment, as shown in Table 21, function "1" or "2" is selected and determined in response to pressing of only the push button A or B of the transmitter 1. When the push buttons A and B are pressed simultaneously, function "3" or "4" is determined in accordance with the number of times a transmission code 15 is received intermittently within a period of operation time T121 which is predetermined for simultaneous pressing of the push buttons A and B.

TABLE 21

| BUTTON CODE 17 | NUMBER OF TIMES TRANSMISSION CODE IS RECEIVED | FUNCTION |
|---|---|---|
| 10 | | 1 |
| 01 | | 2 |
| 11 | ONE TIME | 3 |
| 11 | TWO TIMES OR MORE | 4 |

Figure 37:
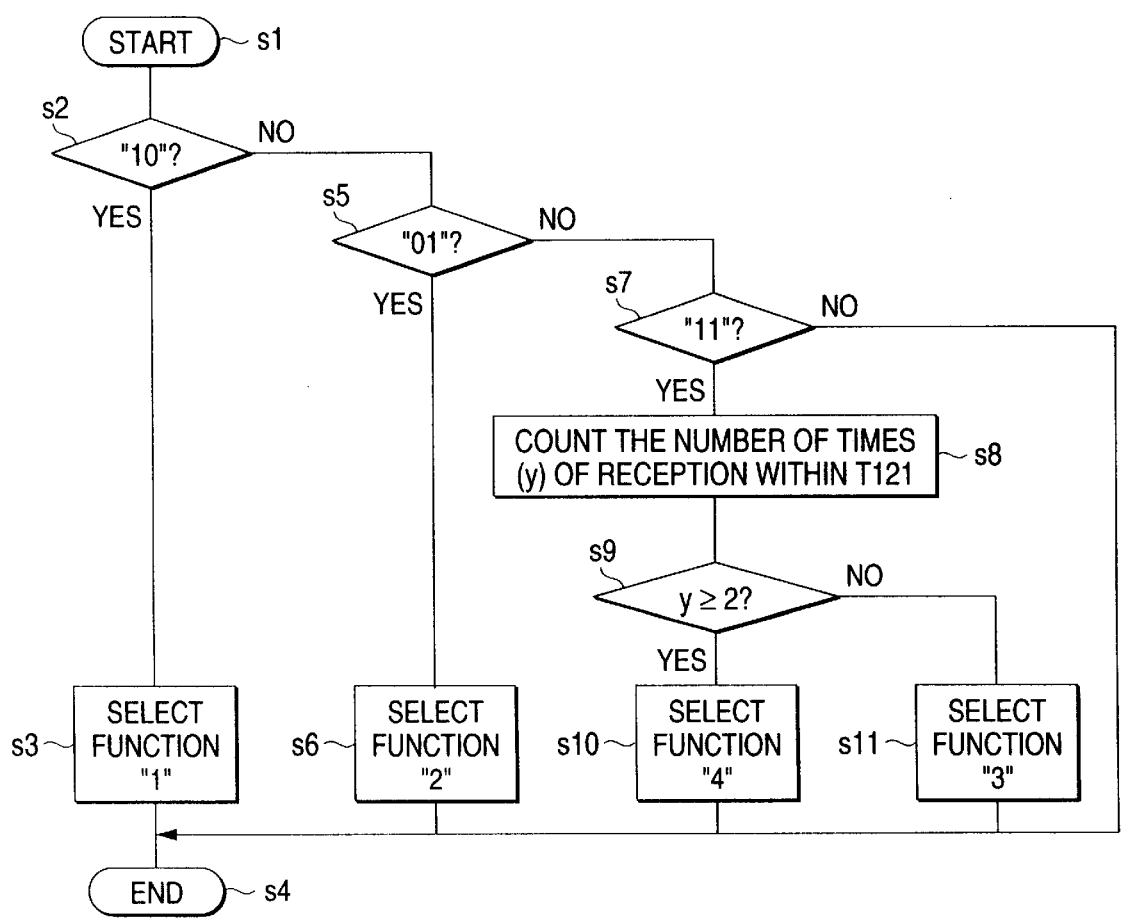
FIG. 37 is a flowchart for describing the operation of the processing circuit 23 of the receiver 4 according to a twelfth embodiment performed in step r23 shown in FIG. 35.

FIG. 37 is a flowchart for describing the specific operation of a receiving circuit 23 of the receiver 4 of the present embodiment to be performed in step r23 shown in FIG. 35. Processing proceeds from step s1 to step s2, where a determination is made as to whether or not the button code 17 of the received transmission code 15 assumes a value of "10"; i.e, whether or not only the push button A of the transmitter 1 has been pressed. If it is determined that the button code 17 assumes a value of "10"; i.e., corresponds to pressing of only the push button A, in step s3 function "1" is selected and determined.

If in step s2 it is determined that the button code 17 assumes a value of "01"; i.e., only the push button B of the transmitter 1 has been pressed, processing proceeds to step s6 by way of steps S2 and S5, thus determining function "2."

If in step s7 it is determined that the button code 17 assumes a value of "11," corresponding to simultaneous pressing of the push buttons A and B of the transmitter 1. In step s8 a timer T121 counts the number of times (y) the transmission code 15 is received as a result of simultaneous pressing of the push buttons A and B within a count period T121 of the timer T121. If in step s9 it is determined that the number of times (y) the transmission code 15 is received assumes two or more, in step s10 function "4" is determined. If in step s9 a determination is made that the number of times (y) the transmission code 15 is received assumes one, in step s11 function "3" is determined. In other respects, the processing circuit 23 of the receiver 4 is analogous in configuration and operation to those employed in the previous embodiments.

(Thirteenth Embodiment)

A thirteenth embodiment of the present invention will now be described by reference to FIGS. 38 and 39. The present embodiment is analogous to the previous embodiments, and like reference numerals are assigned to corresponding elements. The configuration of the transmitter 1 of the present embodiment is analogous to that of the transmitter 1 of the first embodiment shown in FIGS. 1 and 2, that of the transmitter 1 of the second embodiment shown in FIGS. 14 and 15, and that of the transmitter 1 of the fifth embodiment shown in FIG. 23. The transmitter 1 of the thirteenth embodiment transmits the transmission code 15a including the button code 17a shown in Table 10.

A receiver 4 of the present embodiment is analogous in configuration and operation to that of the first embodiment shown in FIGS. 6, 7, 9, 10, 12, and 13, that of the second embodiment shown in FIG. 17, and that of the eleventh embodiment shown in FIG. 35. Particularly, in the thirteenth embodiment, as shown in Table 22, one of functions "1" through "6" is selected and determined in accordance with the number of times the transmission code 15 is received in response to intermittent pressing of only the push button A or B within a preset time T131 or T132, as well as in accordance with the combination of actuation of the push button A and B.

TABLE 22

| BUTTON CODE 17a | NUMBER OF TIMES THE TRANSMISSION CODE 15 IS RECEIVED | FUNCTION |
|---|---|---|
| 100 | ONE TIME | 1 |
| 010 | ONE TIME | 2 |
| 100 | TWO TIMES OR MORE | 3 |
| 010 | TWO TIMES OR MORE | 4 |
| 110 | ONE TIME | 5 |
| 111 | ONE TIME | 6 |

In the present embodiment, in the second memory location 38 is stored operation information pertaining to respective functions "1" through "6" of each of tables assigned to four function selection codes "00" through "11" shown in FIGS. 38-1 through 38-4.

Figure 39:
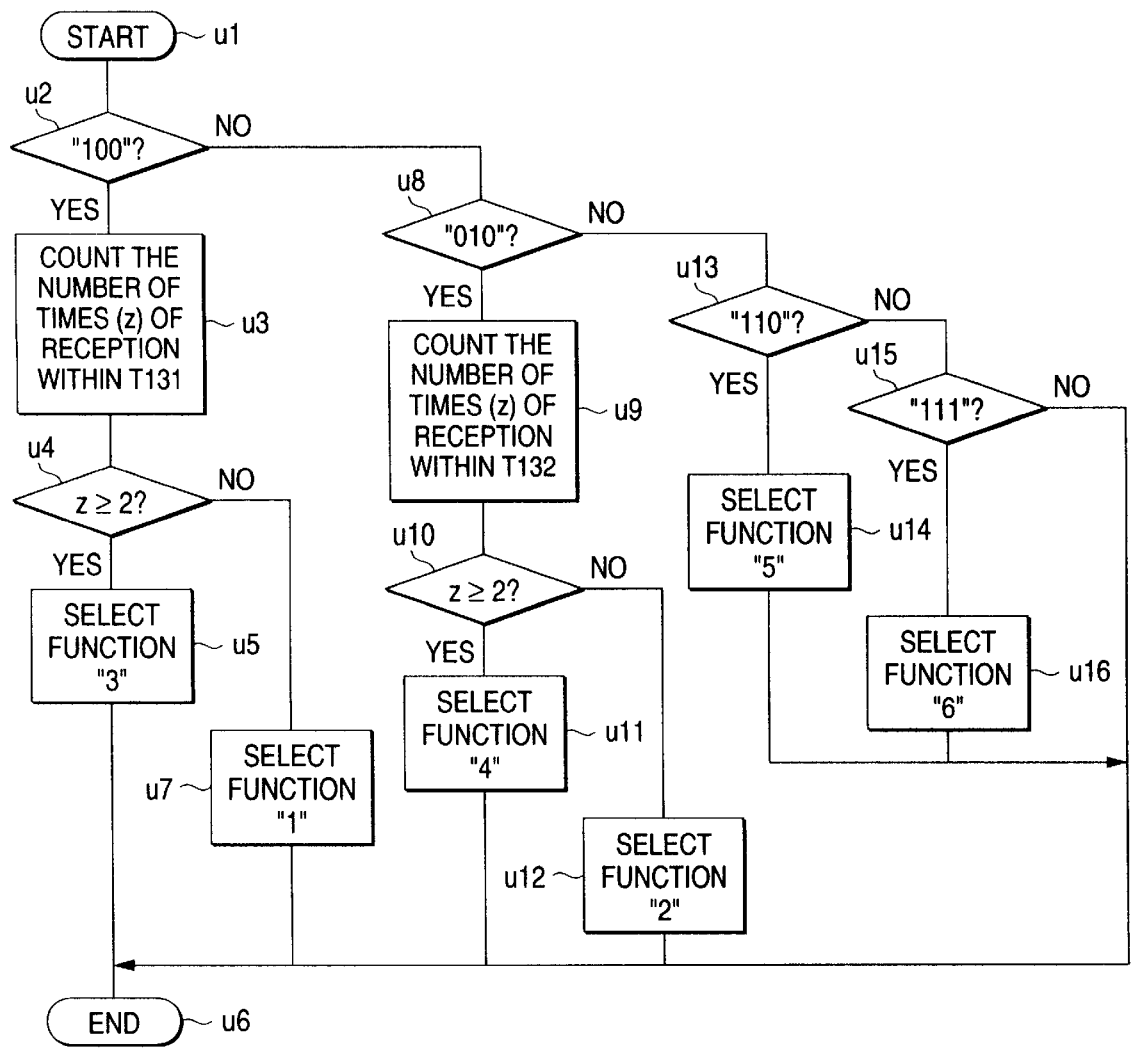
FIG. 39 is a flowchart showing in more detail the operation of the processing circuit 23 of the receiver 4 of the thirteenth embodiment to be performed in step r23 in the flowchart of the eleventh embodiment shown in FIG. 35.

FIG. 39 is a flowchart for describing the specific operation of the processing circuit 23 of the receiver 4 of the present embodiment to be performed in step r23 in the eleventh embodiment shown in FIG. 35. Processing proceeds from step u1 to step u2, where a determination is made as to whether or not a value of "100" has been received as a button code 17a; i.e., whether or not only the push button A of the transmitter 1 has been pressed. If it is determined that value of "100" has been received, processing proceeds to step u3, where a counter 56 (see FIG. 6) counts the number of times (z) the button code 17 of "100" has been intermittently received (hereinafter referred to simply as "the number of times (z)") within a count period T131 of a timer T131 (i.e., T<T131). If in step u4 it is determined that the number of times (z) assumes two or more (i.e., Z≧2), in step u5 function "3" is selected and determined. If in step u4 it is determined that the number of times (z) assumes one, function "1" is determined in step u7.

If in step u8 it is determined that a value of "010" has been received as a button code 17a; i.e., only the push button B of the transmitter 1 has been pressed, in step u9 a counter 57 (see FIG. 6) counts the number of times (Z) a button code 17 of "010" has been intermittently received within a count period T132 of a timer T132 (T<T132) (hereinafter referred to simply as the "number of times (Z)"). If in step u10 a determination is made that the number of times (Z) counted in step u9 assumes two or more, in step u11 function "4" is determined. If in step u10 the number of times (Z) counted in step u9 assumes one, in step u12 function "2" is determined. Each of the count periods T131 and T132 may assume a length of, for example, two seconds.

If in step u13 it is determined that the transmitter 1 has transmitted a value of "110" as a button code 17a, corresponding to simultaneous pressing of the push buttons A and B for less than the count period T51, as in the case of the fifth embodiment shown in FIG. 23. Then, in step u14 function "5" is determined. If in step u15 it is determined that the transmitter 1 has transmitted a value of "111" as a button code 17a; i.e., whether or not the push buttons A and B have been pressed for the predetermined count period T51 or more. If the value of "111" is determined to have been received, then in step u16 function "6" is determined. In the respects, the processing circuit 23 of the receiver 4 is identical in configuration and operation with those employed in the previous embodiments.

(Fourteenth Embodiment)

A fourteenth embodiment of the present invention will now be described by reference to FIGS. 40, 41, and 42. The fourteenth embodiment is analogous to the previous embodiments, and like reference numerals are assigned to corresponding elements. The configuration of the transmitter 1 of the fourteenth embodiment is analogous to that of the transmitter 1 of the seventh embodiment described in connection with FIGS. 25 and 26. The housing 2 of the transmitter 1 is equipped with a single push button A.

Figure 40:
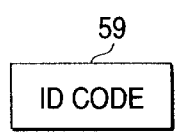
FIG. 40 is a schematic representation showing the configuration of a transmission code signal 59 according to a fourteenth embodiment of the present invention.

FIG. 40 shows the structure of a transmission code 59 of the fourteenth embodiment. The transmission code 59 comprises an ID code consisting of 48 bits. The transmission code 59 may include another code. The ID code constituting the transmission code 59 is a transmitter ID code unique to the transmitter 1.

As in the case of the ninth embodiment shown in FIGS. 29-1 through 29-3, the processing circuit 9 of the transmitter 1 iteratively and continuously transmits the transmission code 59 over the period of operation time during which the push button A is pressed. The period of operation time during which the push button A is pressed continuously is denoted by reference numeral T91, as in the case of the ninth embodiment shown in FIGS. 29-1 to 29-3.

Figure 41:
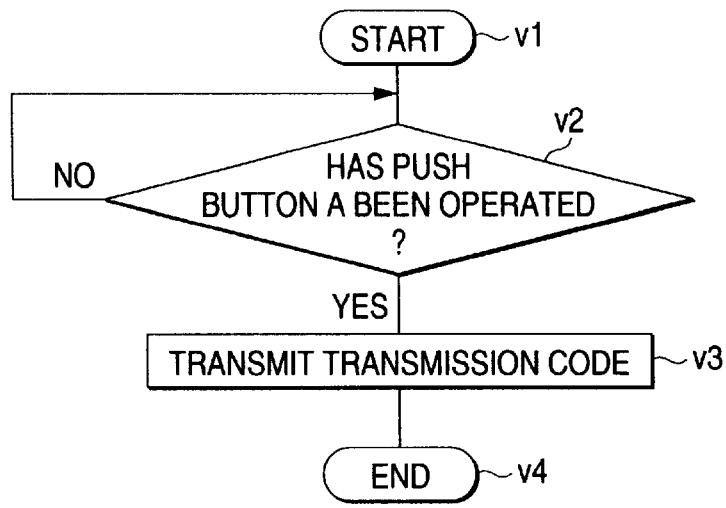
FIG. 41 is a flowchart for describing the operation of the processing circuit 9 of the transmitter 1 of the fourteenth embodiment.

FIG. 41 is a flowchart for describing the operation of the processing circuit 9 of the transmitter 1 of the present embodiment. Processing proceeds from step v1 to step v2, where a determination is made as to whether or not the push button A has been pressed. If the push button A has been pressed, the transmission code 59 shown in FIG. 40 is iteratively and continuously produced over the period of operation time T91, and the thus-produced transmission code 59 is delivered to the transmission circuit 59. In step v3, a carrier-wave signal is modulated through use of the transmission code 59 which is continuous over the period of operation time T59, and the thus-modulated carrier-wave signal is transmitted.

The configuration of the receiver 4 of the present embodiment is analogous to that of the receiver 4 of the first embodiment shown in FIGS. 6 through 10 and FIGS. 12 and 13. The processing circuit 23 of the receiver 4 performs the processing operations shown in FIG. 30 which have been described in connection with the ninth embodiment. Particularly, in the present embodiment, the specific operation of the processing circuit 23 to be performed in step p3 shown in FIG. 30 is illustrated in FIG. 42.

Figure 42:
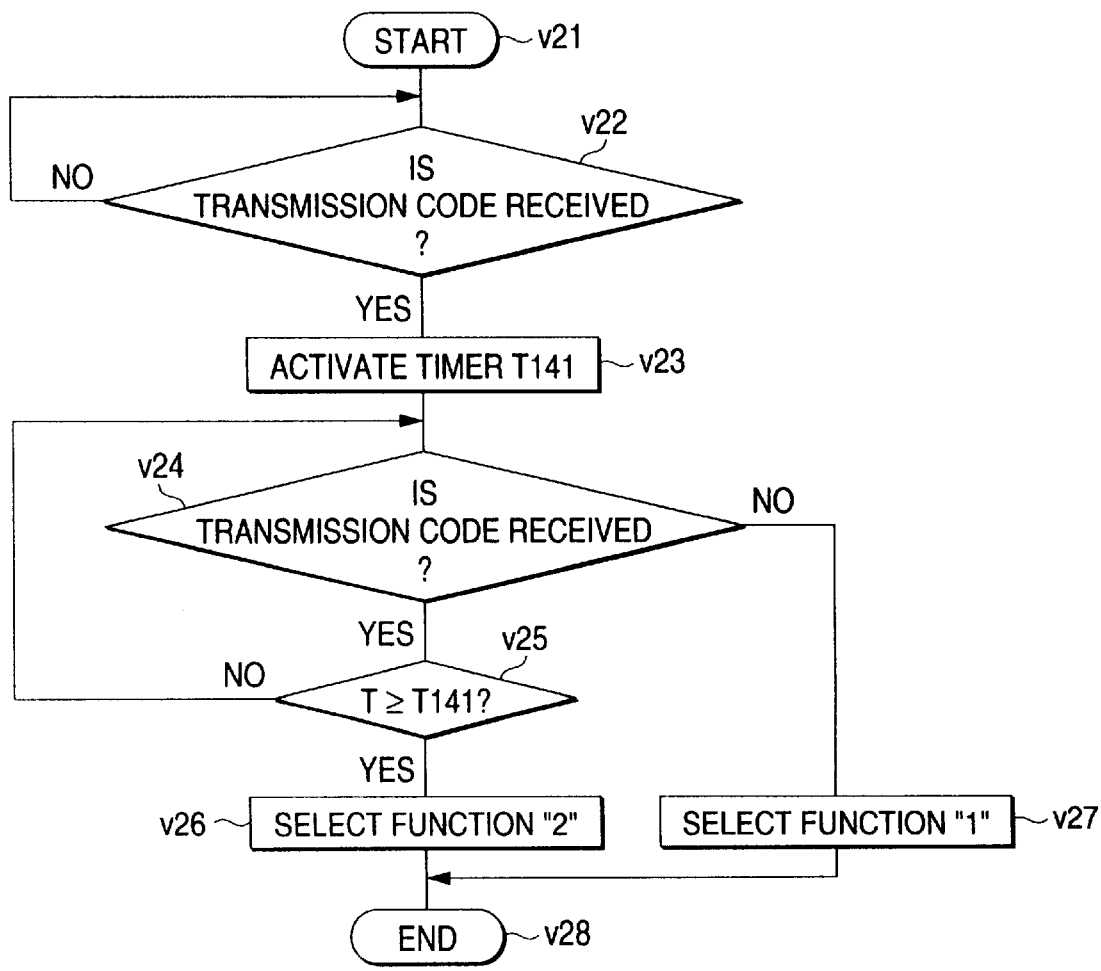
FIG. 42 is a flowchart for describing, in more detail, the operation of the processing circuit 23 of the receiver 4 of the fourteenth embodiment to be performed in step p3 shown in FIG. 30.

FIG. 42 is a flowchart for describing the specific operation of the processing circuit 23 of the receiver 4 of the present embodiment performed in step p3 shown in FIG. 30. Processing proceeds from step v21 to step v22, where a determination is made as to whether or not the receiver 4 has received from the transmitter 1 the transmission code 59 shown in FIG. 40. If it is determined that the receiver 4 has received the transmission code 59, in step v23 a timer T141 starts a time-of-day counting operation. In step v24, a determination is made as to whether or not the receiver 4 is still receiving the transmission code 59. If the receiver 4 is still receiving the transmission code 59, in step v25 a determination is made as to whether or not a period of receiving time T (hereinafter referred to also as a "receiving time T") counted by the timer T141; that is, the duration T91 of the transmission code 59, is shorter than a count period T141. If it is determined that the receiving time T is longer than the count period T141 (i.e., T≧T141), processing proceeds to step v26, where function "2" is selected and determined. In a case where the transmission code 59 is received for only a period shorter than the count period T141, processing proceeds from step v24 to step v27, where function "1" is selected and determined. As shown in Table 23, by means of comparing the receiving time T during which the transmission code 59 is received from the transmitter 1 with the count period T141, function "1" or "2" corresponding to the receiving time T is determined. In other respects, the processing circuit 23 of the receiver 4 of the present embodiment is identical in configuration and operation with those employed in the previous embodiment. The count period T141 may assume a length of, for example, two seconds.

TABLE 23

| RECEIVING TIME | FUNCTION |
|---|---|
| T < T141 | 1 |
| T ≧ T141 | 2 |

(Fifteenth Embodiment)

A fifteenth embodiment of the present invention will now be described by reference to FIG. 43. The fifteenth embodiment is analogous to the previous embodiments, and like reference numerals are assigned to corresponding elements. The configuration of the transmitter 1 of the present embodiment is analogous to that of the transmitter 1 of the seventh embodiment shown in FIGS. 25 and 26 and that of the transmitter 1 of the fourteenth embodiment shown in FIGS. 40 and 41. In the present embodiment, each time the single push button A is pressed, the processing circuit 9 of the transmitter 1 may transmit the transmission code 59 consisting of the ID code shown in FIG. 40 one time or a predetermined number of times. Alternatively, the transmission code 59 may be iteratively and continuously transmitted over the period of time during which the push button A is pressed.

The configuration of the receiver 4 of the fifteenth embodiment is analogous to that of the receiver 4 of the first embodiment shown in FIGS. 6 through 10 and FIGS. 12 and 13. The receiving operation performed by the processing circuit 23 of the receiver 4 according to the present embodiment is analogous to that of the receiving circuit 23 of the eleventh embodiment shown in FIG. 35. As shown in Table 24, in the present embodiment, in step r23 shown in FIG. 35 function "1" or "2" is selected and determined in accordance with the number of times (w) the receiver 4 intermittently receives the transmission code 59 within a predetermined period of time T151 which is assigned to the push button A of the transmitter 1.

TABLE 24

| NUMBER OF TIMES (w) | FUNCTION |
|---|---|
| ONE TIME | 1 |
| TWO TIMES OR MORE | 2 |

Figure 43:
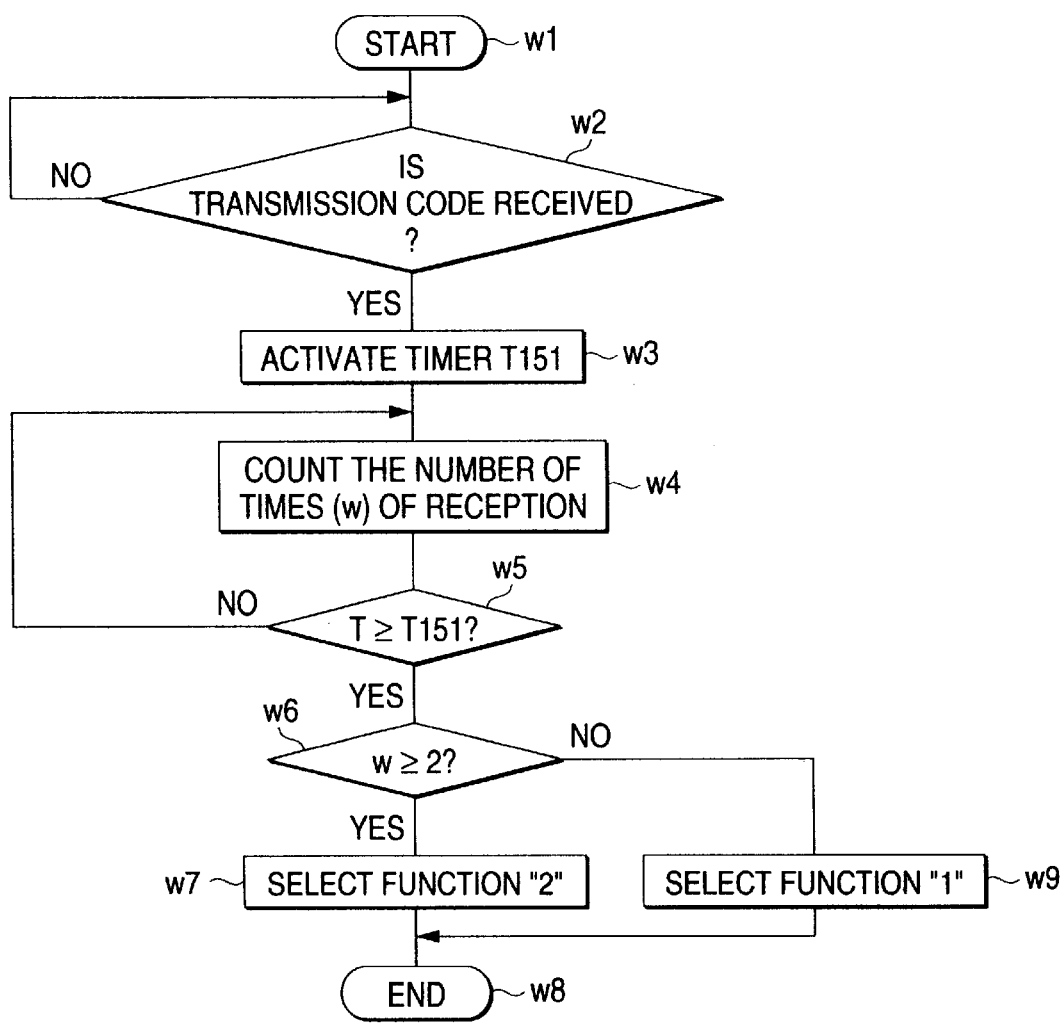
FIG. 43 is a flowchart for describing, in more detail, the operation of the processing circuit 23 of the receiver 4 of the fifteenth embodiment to be performed in step r23 shown in FIG. 35.

FIG. 43 is a flowchart for describing the specific operation of the processing circuit 23 of the receiver 4 of the present embodiment performed in step r23 shown in FIG. 35. Processing proceeds from step w1 to w2, where a determination is made as to whether or not the receiver 4 has received the transmission code 59 from the transmitter 1. If the receiver 4 has received the transmission code 59, then processing then proceeds to step w3, where a timer T151 starts a time-of-day counting operation. In step w4, a counter 61 (see FIG. 6) counts the number of times (w) the receiver 4 has intermittently received the transmission code 59 at intervals. In step w5, a determination is made as to whether or not the timer T counted by the timer T151 is shorter than a count period T151. After lapse of the count period T151, processing proceeds to step w6, where a determination is made as to whether or not the number of times (w) the receiver 4 has received the transmission code 59 within the count period T151 assumes two or more. If the number of times (w) assumes two or more, in step w7 function "2" is selected and determined. If the number of times (w) assumes one, processing proceeds from step w6 to step v9, where function "1" is selected. The count period T151 may assume a length of, for example, two seconds. In other respects, the processing circuit 23 of the receiver 4 is identical in configuration and operation with those employed in the previous embodiments.

In still another embodiment, the receiver 4 according to any of the first through fifteenth embodiments is provided for each of a plurality of vehicles. In each of the plurality of receivers 4, one of a plurality of identifiable transmitter ID codes 16 stored in the first memory location 37 is identical with a preset transmitter ID code 16 of a single transmitter 1. In other words, a common transmitter ID code 16 allocated to respective receiver 4 is set by the user. Function selection codes corresponding to a transmitter ID code identical with the preset transmitter ID code 16 of the single transmitter 1 are set by the user so as to differ from one receiver 4 to another receiver 4. For instance, a function selection code of one receiver 4 corresponding to the preset transmitter ID code 16 of the single transmitter 1 is set to that shown in FIG. 8-3, and a function selection code of another receiver 4 corresponding to the preset transmitter ID code 16 of the single transmitter 1 is set to that shown in FIG. 8-4.

By means of the previous embodiments, the user can cause a plurality of vehicles to perform different operations through use of a single transmitter 1. For example, the user can lock or unlock the doors of a certain vehicle by actuation of the push button A of the single transmitter 1 and can lock or unlock doors of another vehicle by actuation of the push button B of the single transmitter 1. Thus, there is embodied a system worthy of being called a multi-car-operation system.

The present invention enables the user to arbitrary allocate a plurality of types of control operations to a single operation switch or a plurality of operation switches. Particularly, in the present invention, a function selection code is set in accordance with a transmitter ID code while a receiver is in a program mode. Further, operation information is obtained in an operation mode on the basis of a function selection code and a received control code, thereby controlling a device to be controlled.

Transmission means can transmit a control code in accordance with a time during which a operation switch is operated, as well as in accordance with a predetermined number of times the operation switch is operated. As a result, the number of operation switches can be diminished, thereby enabling generation of the largest possible number of types of control codes.

A table is formed for each function selection code such that a control code is correlated with operation information. The control information correlated with a control code can be readily changed by means of changing a table; that is, by changing the function selection code in the manner as mentioned previously.

A transmission code is iteratively and continuously transmitted from a transmitter over a period of time during which a operation switch of the transmitter is operated. A function selection code is read in accordance with the duration of the transmission code. As a result, a control code and operation information are read, to thereby control a device to be controlled. As mentioned previously, it is desirable that the transmitter has a function of iteratively and continuously transmitting a transmission code over a period of time during which a operation switch is operated, thus enabling realization of a comparatively compact transmitter having a comparatively simple configuration. Accordingly, the transmitter can be readily made portable.

For each function selection code, a table is formed by bringing into correspondence a control code, a duration which is a result of comparison with a count period, and operation information. A operation switch, the operation of the operation switch, and operation information corresponding to the duration of an operation can be readily changed by means of changing the function selection code.

So long as the operation switch of the transmitter is intermittently operated once or a plurality of times within a predetermined period of time, the transmitter transmits a transmission code each time the operation switch is operated. The receiver reads, from memory, a function selection code corresponding to the received transmitter ID code. On the basis of a control code corresponding to the operated operation switch and control information corresponding to the number of times the transmission code is received, a device to be controlled is controlled. The control code and the operation information corresponding to the number of times the transmission code is received can be changed by means of changing the function selection code in accordance with the transmitter ID code.

A control code, the number of times a transmission code is received, and operation information are correlated with one another, thereby constituting a table. Operation information can be readily changed in accordance with a operation switch and the number of times the operation switch is operated, by means of changing the function selection code in accordance with the transmitter ID code.

A plurality of transmitter ID codes and function selection codes are stored in a rewritable manner while they are correlated with each other. Accordingly, a combination which consists of a control code and operation information and constitutes a table for each function selection code can be readily changed. Each of the tables assigned to the respective function selection codes may contain the duration of the transmission code and/or the number of times a transmission code is received within a predetermined period of time, in association with the control code and the operation information. In some of the embodiments, a function selection code allocated to the transmitter ID code is stored in memory in a rewritable manner. However, in another embodiment, operation information pertaining to a control code constituting a table may be made rewritable for each function selection code. Alternatively, a control code of the table may be rewritable.

A control code transmitted from the transmitter is produced in association with (a) respective operation switches of a transmitter;

(b) respective operation switches and operation times;

(c) one or more operation switches and the number of times the operation switch is operated within a preset period of time;

(d) a combination of a plurality of operation switches to be operated simultaneously;

(e) a combination of a plurality of operation switches to be operated simultaneously and operation time; or (f) a combination of a plurality of operation switches to be operated simultaneously and the number of times a operation switch is operated within a predetermined period of time. The thus-produced control code constitutes a transmission code together with a transmitter ID code, and the transmission code is transmitted from the transmitter.

A transmitter is equipped with a single operation switch, and a transmission code is iteratively and continuously transmitted over a period of time during which the operation switch is operated. A function selection code corresponding to the transmitter ID code contained in the transmission code transmitted from the transmitter is set in the receiver in a rewritable manner. A duration and operation information corresponding to an output from comparison means are read from memory for each function selection code, thereby controlling a device to be controlled. Accordingly, the user can arbitrarily allocate a plurality of types of operations to a plurality of operation modes of a single operation switch of the transmitter. Further, the present invention enables realization of a transmitter having a facilitated configuration, thus rendering the transmitter compact. As a result, the transmitter can be made more handy.

A table is formed for each function selection code by means of a combination of a duration and operation information. So long as a function selection code allocated to a transmitter ID code is set in memory in a rewritable manner, operation information pertaining to a device to be controlled associated with a period of time during which the operation switch is operated; that is, a duration of the transmission code, can be readily changed.

The transmitter is equipped with a single operation switch, and the receiver counts the number of times a transmission code is received in association with the number of times the operation switch is operated within a predetermined period of time. A function selection code allocated to the transmitter ID code is set in memory in a rewritable manner, and operation information corresponding to the number of times counted for each function selection code is read from memory, thereby controlling a device to be controlled. Accordingly, a plurality of types of operations can be arbitrarily allocated to respective operation modes of the single operation switch. Further, the present invention enables realization of a compact transmitter having a simplified structure. Thus, a transmitter can be made more handy.

A function selection code is set in a rewritable manner so as correspond to a transmitter ID code. A table is formed for each function selection code by a combination of the number of times a transmission code is received and operation information. Operation information corresponding to the number of times a transmission code is received can be readily changed for each function selection code.

At the time of entry of a function selection code, the user operates an article to be operated which is provided for a vehicle in advance and is to be operated by an operator, thus enabling entry of a function selection code. Therefore, the configuration of means for entering a function selection code can be facilitated.

An article to be operated may correspond to vehicle doors, an ignition switch, a door lock mechanism, a brake pedal, or a switch for illuminating/extinguishing a lamp. The operation mode of the article to be operated is detected by means of a corresponding switch, thus facilitating the structure of the article to be operated. The structure of means for detecting the operation mode can be facilitated. The present invention an be applied a wide range of vehicles having various types of structures.

The transmitter acts also as a mode setting switch for use in entering a function selection code. A function selection code can be input by actuation of the mode setting switch in a program mode, thereby facilitating the structure of means for entering a function selection code.

In a program mode of the receiver, in order to enable entry of a function selection code, a function selection code is produced in accordance with a transmission code transmitted from a transmitter, a duration of the transmission code, or the number of times a transmission code is received within a predetermined period of time. The thus-produced function selection code can be set. Thus, the transmitter can also be used for entering a function selection code, thereby facilitating the structure of means for entering a function selection code.

As a result of use of a remote control receiving device of the present invention, a function selection code corresponding to a received transmitter ID code is stored in memory in a rewritable manner while the receiving device is in a program mode. In an operation mode of the receiving device, the transmitter ID code is read, and operation of a device to be controlled is controlled in accordance with a control code, a duration of a transmission code, and the number of times a transmission code is received within a predetermined period of time. Operation information can be arbitrarily allocated to a operation switch or the operation mode of the operation switch.

What is claimed is:

1. A remote control device for controlling a plurality of operations in a multifunction system, the device comprising:

a transmitter having an operation switch, the transmitter for transmitting a transmission code including a transmitter ID code unique to the transmitter and a control code assigned to the operation switch or corresponding to an operation of the operation switch; and a receiver for receiving the transmission code, the receiver comprising:

first memory means for storing the transmitter ID code and one of a plurality function selection codes corresponding to the transmitter ID code;

second memory means for correspondingly and previously setting and storing the control code and operation information to be remotely controlled for each of the plurality of function selection codes, in which the operation information corresponding to the control code differs for each of the plurality of function selection codes;

function selection code input means for inputting the function selection code;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond to the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information corresponding to the received control code of the function selection code read from the first memory means; and the receiving control means performs an operation based on the operation information read from the second memory means.

2. The remote control device as claimed in claim 1, wherein the transmitter comprises a plurality of operation switches, and a plurality of control codes respectively allocated to the plurality of operation switches are transmitted.

3. The remote control device as claimed in claim 1, wherein the transmitter transmits the control code corresponding to an operation of the operation switch or corresponding to a time during which the operation switch is operated or the number of times that the operation switch is operated.

4. The remote control device as claimed in claim 1, wherein the transmitter comprises a plurality of operation switches and the transmitter transmits the control code corresponding to one of combinations of the operation switches operated simultaneously.

5. The remote control device as claimed in claim 1, wherein the transmitter comprises a plurality of operation switches, the transmitter transmits the control code corresponding to one or combinations of the plurality of operation switches operated simultaneously and corresponding to a time during which the operation switches are operated or the number of times that the operation switches are operated.

6. The remote control device as claimed in claim 1, wherein the function selection code input means comprises:

detection means for detecting an operation of an object to be operated by an operator and to be provided in a vehicle in advance; and count output means for counting the number of signals output from the detection means within a predetermined code input time and outputting a count result as the function selection code.

7. The remote control device as claimed in claim 6, wherein the detection means for detecting the operation of the object to be operated corresponds to one selected from the group consisting of:

a courtesy switch for detecting the opening and closing action of a vehicle door;

an ignition switch for applying power to an ignition circuit of a spark ignition internal combustion engine;

a lock switch for detecting that a door lock mechanism has been locked or unlocked;

a switch for detecting the orientation of angular displacement of a removable key which is subjected to angular displacement in accordance with the locking/unlocking operation of the lock mechanism;

a brake switch for detecting pressing of a vehicle brake pedal; and a switch to be operated in order to illuminate/extinguish vehicle light.

8. The remote control device as claimed in claim 1, wherein the function selection code input means detects an operation of the mode setting means switchably setting one of the program mode and the operation mode, and the function selection means outputs the function selection code corresponding to the operation detected.

9. The remote control device as claimed in claim 1, wherein the function selection code input means outputs the function selection code corresponding to the transmission code transmitted from the transmitter when the receiver is in the program mode.

10. A remote control device for controlling a plurality of control operations in a multifunction system, the device comprising:

a transmitter having an operation switch, the transmitter for transmitting a transmission code including a transmitter ID code unique to the transmitter and a control code corresponding to the operation of the operation switch; and a receiver for receiving the transmission code, wherein the receiver comprises:

first memory means for storing the transmitter ID code and a function selection code assigned to the transmitter ID code;

second memory means for correspondingly and previously setting and storing the control code, a transmission mode of the transmission code and operation information to be remotely controlled for each of the plurality of function selection codes, in which the operation information corresponding to the control code differs for each of the plurality of function selection codes;

function selection code input means for inputting the function selection code;

measurement means for measuring the transmission mode of the transmission code;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information corresponding to the received control code of the function selection code read from the first memory means and corresponding to the transmission mode measured by the measuring means; and the receiving control means performs an operation based on the operation information read from the second memory means.

11. The remote control device as claimed in claim 10, wherein the transmission mode of the transmission code corresponds to a time during which the transmission code is transmitted or the number of times that the transmission code is transmitted.

12. The remote control device as claimed in claim 10, wherein the transmitter comprises a plurality of operation switches, the transmitter transmits the control code assigned to each of the plurality of operation switches.

13. The remote control device as claimed in claim 10, wherein the transmitter comprises a plurality of operation switches, and the transmitter transmits a control code corresponding to one of combinations of the plurality of operation switches operated simultaneously.

14. A remote control device for controlling a plurality of operations in a multifunction system, the device comprising:

a transmitter having an operation switch, the transmitter for transmitting a transmission code including a transmitter ID code unique to the transmitter; and a receiver for receiving the transmission code, wherein the receiver comprises:

first memory means for storing the transmitter ID code and a function selection code assigned to the transmitter ID code;

second memory means for correspondingly and previously setting and storing operation information to be remotely controlled and one of the duration of the transmission code and the number of times that the transmission code is received, for each of the plurality of function selection codes, in which the operation information corresponding to the one of the duration of the transmission code and the number of times differs for each of the plurality of function selection codes;

function selection input means for inputting the function selection code;

measurement means for measuring the duration of the transmission code received or the number of times the transmission code is received;

mode setting means for setting the receiver to one of a program mode and an operation mode; and receiving control means for controlling the plurality of operations in response to a signal output from the mode setting means, wherein, during the program mode, the receiving control means stores in the first memory means the function selection code input by the function selection code input means to correspond to the transmitter ID code received; and wherein, during the operation mode, when the transmitter ID code included in the transmission code received corresponds with the transmitter ID code stored in the first memory means, the receiving control means reads from the first memory means the function selection code corresponding to the transmitter ID code;

the receiving control means reads from the second memory means the operation information of the function selection code read from the first memory mean and corresponding to an output of the measurement means; and the receiving control means performs an operation based on the operation information read from the second memory means.

* * * * *